United States Patent
Tamura et al.

(10) Patent No.: US 6,333,951 B1
(45) Date of Patent: Dec. 25, 2001

(54) IMAGE PROCESSING SYSTEM

(75) Inventors: Tsuyoshi Tamura; Toshiki Miyane; Teruhisa Ishikawa, all of Suwa (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 08/797,792

(22) Filed: Feb. 7, 1997

Related U.S. Application Data

(63) Continuation of application No. 08/217,114, filed on Mar. 24, 1994, now abandoned.

(30) Foreign Application Priority Data

Mar. 25, 1993 (JP) .................................................. 5-066828
Mar. 25, 1993 (JP) .................................................. 5-066829

(51) Int. Cl.$^7$ .............................. H04B 1/66; H04N 7/30
(52) U.S. Cl. .................................. 375/240.25; 348/403.1
(58) Field of Search ............................ 348/391.1, 395.1, 348/396.1, 400.1, 401.1, 403.1, 409.1, 415.1, 420.1, 714, 715; 382/232, 233, 235, 236, 238, 244, 245, 246, 248; 345/185, 189, 202; 375/240, 240.1, 240.25, 240.26; H04N 7/30; H04B 1/66

(56) References Cited

U.S. PATENT DOCUMENTS

| | | |
|---|---|---|
| 4,079,458 | 3/1978 | Rider et al. . |
| 4,496,976 | 1/1985 | Swanson et al. . |
| 4,633,296 * | 12/1986 | Cham et al. ........................ 348/403 |
| 4,797,729 | 1/1989 | Tsai . |
| 4,821,119 * | 4/1989 | Gharavi .............................. 348/402 |
| 4,955,061 | 9/1990 | Doi et al. . |
| 5,191,436 | 3/1993 | Yonemitsu . |
| 5,229,864 * | 7/1993 | Moronaga et al. ................. 358/433 |
| 5,267,334 | 11/1993 | Normille et al. . |
| 5,337,087 * | 8/1994 | Mishima ........................... 348/405.1 |
| 5,343,250 * | 8/1994 | Iwamura ............................ 348/564 |
| 5,359,676 * | 10/1994 | Fan ...................................... 382/56 |
| 5,367,385 * | 11/1994 | Yuan .................................. 348/420 |
| 5,438,376 * | 8/1995 | Watanabeq ......................... 348/714 |
| 5,479,211 * | 12/1995 | Fukuda .............................. 348/405 |
| 5,625,714 * | 4/1997 | Fukada .............................. 382/233 |
| 5,801,776 * | 9/1998 | Tamura et al. .................... 348/403 |

OTHER PUBLICATIONS

Kak, Avinash C., & Rosenfeld, Azriel, Digital Picture Processing, Second Edition, vol. 1, pp. 144–160.
Kak, Avinash C., & Rosenfeld, Azriel, Digital Picture Processing, Sec. Ed., vol. 1, pp. 144–160.

* cited by examiner

Primary Examiner—Chris Kelley
Assistant Examiner—Tung T. Vo
(74) Attorney, Agent, or Firm—Beyer Weaver & Thomas, LLP

(57) ABSTRACT

The present invention provides an image decoding and reconstruction system for successively reading out and decoding compression video data constituting one screen page and reconstructing an image with a memory of a small capacity. The system of the invention divides an image of one screen page into 8x8-pixel blocks, compresses video data by discrete cosine transform, successively reads data in the unit of a 2×2 matrix of the 8×8-pixel blocks, and stores the video data along horizontal scanning lines in one of two memories while reading other video data previously stored along the scanning lines out of the other memory. The invention also provides an interblock distortion removal filter for eliminating interblock distortions due to orthogonal transform. The filter eliminates interblock distortions generated on the boundary between vertically adjacent blocks in each 16-line data area before writing video data in the memory, and eliminates distortions between horizontally adjacent blocks in the data area when reading video data out of the memory. The filter also eliminates interblock distortions on the boundary between adjacent 16-line data areas by reading last line data of a first block out of one memory while reading first line data of a second block out of the other memory.

11 Claims, 37 Drawing Sheets

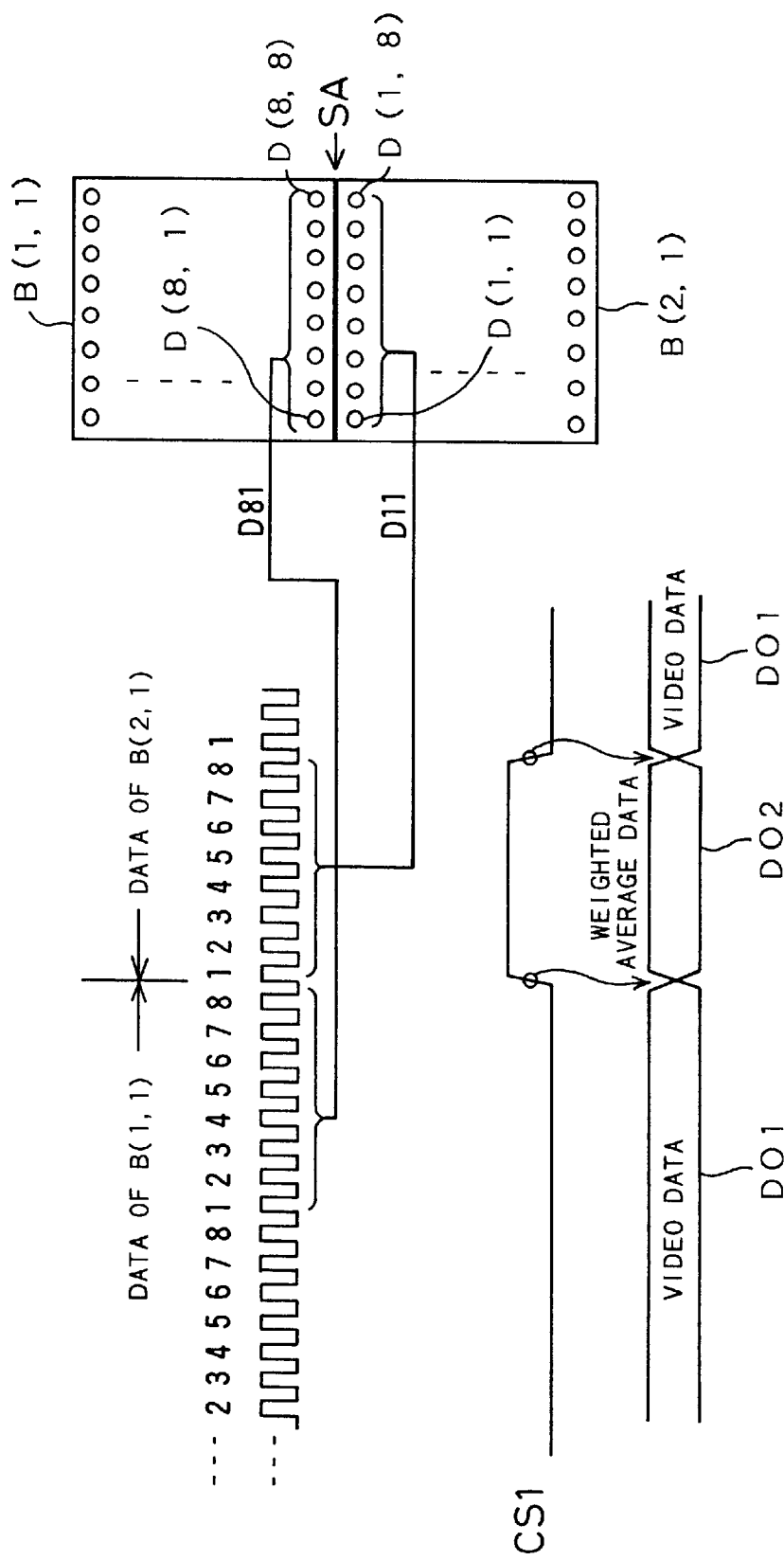

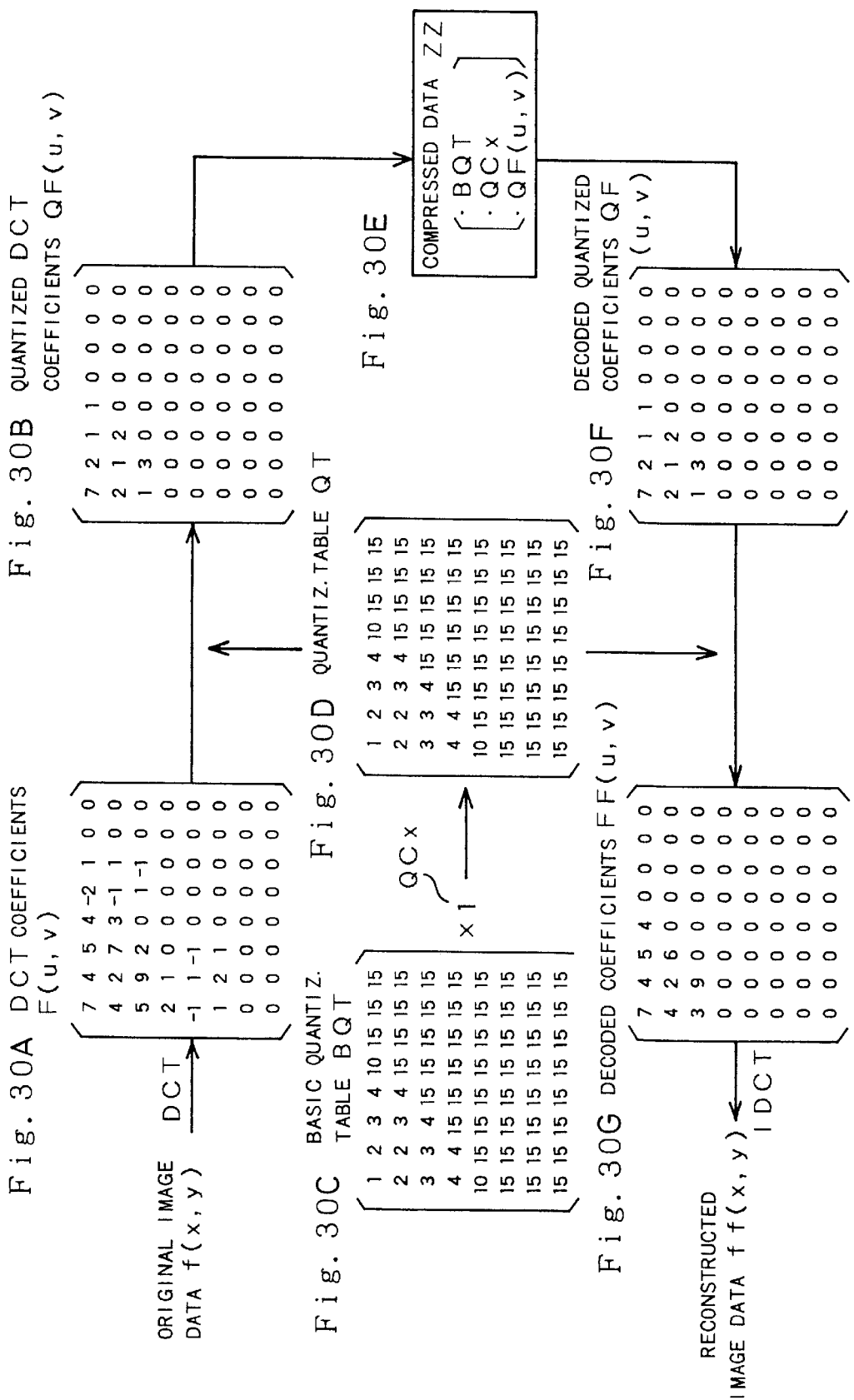

$\Delta DC = DC_i - DC_{i-1}$

Fig. 32

| CATEGORY SSSS | ΔDC/AC | ID BITS |
|---|---|---|
| 0 | 0 | 0 |
| 1 | −1,  1 | 1 |
| 2 | −3..−2,  2..3 | 2 |
| 3 | −7..−4,  4..7 | 3 |
| 4 | −15..−8,  8..15 | 4 |
| 5 | −31..−16,  16..31 | 5 |
| 6 | −63..−32,  32..63 | 6 |
| 7 | −127..−64,  64..127 | 7 |
| 8 | −255..−128,  128..255 | 8 |
| 9 | −511..−256,  256..511 | 9 |

Fig. 33

| CATEGORY SSSS | ΔDC HUFFMAN CODE WORD HFDC ||
| --- | --- | --- |
| | Y SIGNAL | U/V SIGNAL |
| 0 | 000 | 00 |
| 1 | 1110 | 01 |
| 2 | 001 | 10 |
| 3 | 010 | 110 |
| 4 | 011 | 1110 |
| 5 | 100 | 11110 |
| 6 | 101 | 111110 |
| 7 | 110 | 1111110 |
| 8 | 111100 | 11111110 |
| 9 | 1111010 | 11111111 |
| 10 | | |
| 11 | | |
| 12 | | |
| 13 | | |
| 14 | | |
| 15(NRL) | 1111011 | |
| 16(QC0) | 111110000 | |
| 17(QC1) | 111110001 | |
| 18(QC2) | 111110010 | |
| 19(QC3) | 111110011 | |
| 20(QC4) | 111110100 | |
| 21(QC5) | 111110101 | |
| 22(QC6) | 111110110 | |
| 23(QC7) | 111110111 | |
| 24(QC8) | 111111000 | |
| 25(QC9) | 111111001 | |
| 26(QC10) | 111111010 | |
| 27(QC11) | 111111011 | |
| 28(QC12) | 111111100 | |
| 29(QC13) | 111111101 | |
| 30(QC14) | 111111110 | |
| 31(QC15) | 111111111 | |

JIG-ZAG SCANNING

Fig. 36

AC COEFFICIENT
HUFFMAN CODE TABLE

|  |  | CATEGORY SSSS | |
|---|---|---|---|
|  |  | 0 | 1 - - - - - - - - - 9 |
| ZERO-RUN LENGTH NNNN | 0 | EOB | AC COEFFICIENT HUFFMAN CODE WORDS HF AC |
|  | 1 | ZRL | |
|  | 2 | — | |
|  | 15 | — | |

Fig. 37

| NNNN / SSSS | AC COEFFICIENT HUFFMAN CODE WORD HF AC | |
|---|---|---|
|  | Y SIGNAL | U/V SIGNAL |
| 0/0 (EOB) | 11111 | 11111 |
| 0/1 | 00 | 00 |
| 0/2 | 01 | 01 |
| 0/3 | 100 | 1010 |
| 0/4 | 1010 | 11000 |
| 0/5 | 11000 | 1110010 |
| 0/6 | 110110 | 111100010000 |
| 0/7 | 111011100 | 111100010001 |
| 0/8 | 111100010000 | 111100010010 |
| 0/9 | 11101111000 | 11101111000 |
| 1/0 (ZRL) | 111101111111 | 111101111111 |
| 1/1 | 1011 | 100 |
| 1/2 | 11001 | 11001 |
| 1/3 | 1110100 | 1110011 |
| 1/4 | 111100010001 | 111100010011 |
| 1/5 | 111100010010 | 111100010100 |
| 1/6 | 111100010011 | 111100010101 |
| 1/7 | 111100010100 | 111100010110 |
| 1/8 | 111100010101 | 111100010111 |
| 1/9 | 11101111001 | 11101111001 |

Fig. 38A

DCT COEFFICIENTS F(u, v)

| 12 | 0 | 4 | 0 | 0 | 0 | 1 | 0 |
|---|---|---|---|---|---|---|---|
| -4 | 3 | 0 | -2 | 0 | 0 | 0 | 0 |
| 0 | 5 | 3 | 0 | 1 | 0 | 0 | 0 |
| -4 | 0 | 0 | 0 | 0 | 0 | 0 | 0 |
| 0 | 2 | 0 | 0 | 0 | 0 | 0 | 0 |
| 0 | 0 | 0 | 0 | 0 | 1 | 0 | 0 |
| 0 | 0 | 0 | 0 | 0 | 0 | 0 | 0 |
| 0 | 0 | 0 | 0 | 0 | 0 | 0 | 0 |

DCi → (points to 12)

Fig. 38B  DC COEFFICIENT CODING ($DC_{i-1} = 0$)

$\Delta DC = 12 \rightarrow SSSS = 4 \rightarrow HF_{DC} + ID = \underline{011}\underline{1100}$
$\phantom{\Delta DC = 12 \rightarrow SSSS = 4 \rightarrow HF_{DC} + ID = 011}HF_{DC}\phantom{11}ID$ Fig. 38C  AC COEFFICIENT CODING

· JIG-ZAG SCAN : 0, −4, 0, 3, 4, 0, 0, 5

· NNNN/SSSS = 1/3  1/2  0/3  2/3

· $HF_{AC}$ + ID = $\underline{1110100}\underline{011}\underline{1100}\underline{111}$
$\phantom{HF_{AC} + ID = 111}HF_{AC}\phantom{000}ID\phantom{11}HF_{AC}\phantom{0}ID$ Fig. 39A
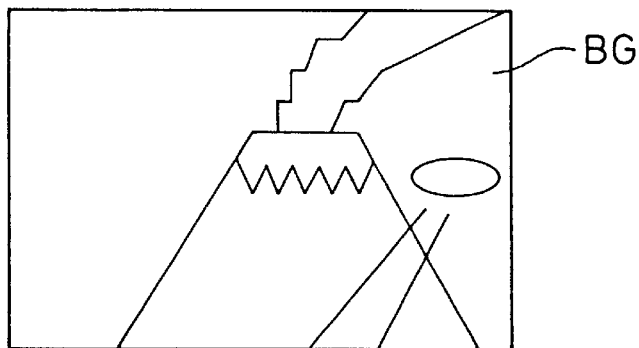
Fig. 39B
ORIGINAL IMAGE DATA
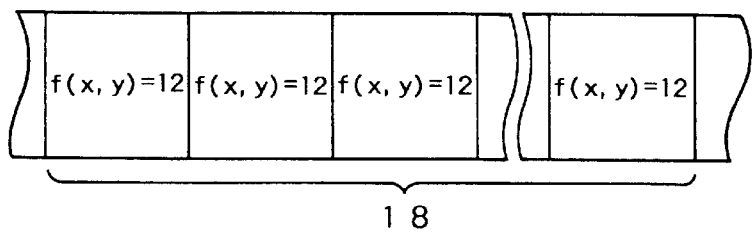
Fig. 39C
NULL RUN DATA
```
              NUMBER OF BLOCKS              NUMBER OF BLOCKS
1 1 1 1 0 1 1  1 1 1 1 0 1 1 0 1 1 1  1 1 1 1 0 1 1  1 0 1 1
    NRL         NNNN/SSSS=15/1        ID    NRL      1/1     ID
   (Fig.12)        (Fig.21)
```
NULL RUN DATA N R D 1     NULL RUN DATA N R D 2
(16 BLOCKS)                (2 BLOCKS)

Fig. 40

| NNNN / SSSS | AC COEFFICIENT HUFFMAN CODE WORD HFAC | |
|---|---|---|
| | Y SIGNAL | U/V SIGNAL |
| 0/1 | 00 | 00 |
| 1/1 | 1011 | 100 |
| 2/1 | 11010 | 1011 |
| 3/1 | 110111 | 11010 |
| 4/1 | 111000 | 11011 |
| 5/1 | 111001 | 111000 |
| 6/1 | 1110110 | 1110101 |
| 7/1 | 111011101 | 1110110 |
| 8/1 | 111100111111 | 111011101 |
| 9/1 | 111101000111 | 111101000111 |
| 10/1 | 111101001111 | 111101001111 |
| 11/1 | 111101010111 | 111101010111 |
| 12/1 | 111101011111 | 111101011111 |
| 13/1 | 111101100111 | 111101100111 |
| 14/1 | 111101101111 | 111101101111 |
| 15/1 | 111101110111 | 111101110111 |

WHEN APPLIED TO NULL RUN DATA :

$NNNN = \left[\begin{array}{c}\text{NUMBER}\\ \text{OF BLOCKS}\end{array}\right] - 1$ $SSSS = 1$

IMAGE PROCESSING SYSTEM

This is a continuation, of application Ser. No. 08/217,114 filed Mar. 24, 1994 now abandoned.

This Application claims the priority of Japanese Application Serial Nos. 5-66828 and 5-66829, which are incorporated herein by reference.

BACKGROUND OF THE INVENTION

1. Field of the Invention

The present invention relates to an image decoding system, an image reconstruction system, an interblock distortion removal filter as well as a method of image compression and a method of image decoding preferably applied to such systems. The present invention pertains to an image processing system for dividing an image of one screen page into a plurality of nxn pixel blocks and coding and decoding data in each block, or more specifically to a system for decoding compression data previously coded to reconstruct video data. The principle of the invention is applicable to image processing steps executed in video game machines, display units for personal computers, multi-media apparatus, and other similar devices.

2. Description of the Related Art

A variety of image processing systems for efficiently compressing video data and quickly decoding compression data to display decoded video data according to the requirements have been proposed with the increased demands for natural images and moving pictures. Extremely high-speed image processing and image reading allows video data recoded in a compressive form to be reconstructed directly without any memory. For a moving picture which requires reconstruction of video data of several tens frames per second, however, conventional image processing systems are provided with a frame buffer having a capacity of at least one screen page.

Known processes of video data compression include orthogonal transform coding, discrete cosine transform (DCT) coding, and Huffman coding. In any process, video data constituting one screen page are previously divided into a plurality of nxn-pixel blocks. An example of DCT compression processes for YUV color images is an image coding method based on a J-PEG (Joint Photographics Expert Group) algorithm d. A known image coding and compressing method by orthogonal transform is an H.261 image coding process of CCITT (Comite Cousultatif International Telegraphique et Telephonique).

In the conventional image compression processes, video data are coded in a block unit according to an irreversible transform where original video data are not reconstructed perfectly by decoding. Continuity of an original image may thus be interrupted undesirably on a boundary of adjacent blocks. An interblock distortion removal filter is conventionally used to eliminate such discontinuity called interblock distortion. The filter stores decoded video data, and executes a filter operation or more concretely, calculates a weighted average of data of adjacent pixels while reading data of adjacent blocks.

Conventional image coding methods are generally divided into two groups according to a sequence of display of a decoded image; a sequential coding process and a progressive coding process. In the sequential coding process, decoded video data having a final picture quality are displayed successively from the top to the bottom. In the progressive coding process, on the other hand, a rough decoded image having the low resolution and tone is first displayed from the top to the bottom, and the resolution and the tone are then improved gradually. Compression data have a triple hierarchical structure of Image/Frame/Scan. While one Image includes compression data of only one Frame (one screen page) in the sequential coding process, one Image includes a plurality of Frames (one screen page) in the progressive coding process where a header code corresponding to each Frame is added to the head of the Frame and is followed by one or a plurality of Scans. The Scan represents compression data corresponding to the top through the bottom of an image. One Frame includes only one Scan when all color components are included in the compression data whereas one Frame includes a plurality of Scans in the other cases. In both the sequential coding process and the progressive coding process, compression data are structured in a unit of one screen page.

The conventional image processing and decoding systems described above have problems below.

(1) The conventional system is provided with a frame buffer having a capacity for storing compression data of at least one screen page. Such a frame buffer requires a relatively large area for installation and raises the cost of the system. A pair of frame buffers or a specific, expensive memory, such as a dual port memory, is required for writing decoded video data during reconstruction of an image to display a moving picture. This further raises the cost of packaging.

(2) In the conventional method, video data are compressed in a unit of one screen page. This allows only one display color mode (for example, 16.77 million color mode, 32,768 color mode, and 256 color modes) to be applied for reconstruction of one screen page. Decoding and simultaneous display in one screen page of a compressed natural image and a compressed animation image with a small number of colors requires separate frame buffers and an additional overlapping process. Such a modification on the hardware structure requires a large memory capacity and a complicated circuit structure including an additional image composition circuit, thus making the whole system undesirably complicated and bulky. This is not substantially applicable to video game machines because of the increased cost and area for packaging.

(3) When video data are compressed by each pixel block according to a transform coding process, compression data thus generated are also decoded in the unit of a pixel block. In such a system, for reading out video data along scanning lines of a display unit such as a CRT (cathode ray tube), a block-line conversion is generally required where video data decoded by each block are first stored in a memory and then successively read out by each line along the scanning lines. For removal of an interblock distortion generated in a direction perpendicular to the scanning lines, video data corresponding to a last line of each block should be stored in a line buffer. While reading video data corresponding to a first line of a next block, the system executes a filter operation between the video data of the first line and the video data of the last line stored in the line buffer. The line buffer should have a capacity corresponding to a number of pixels in the direction of the scanning lines.

SUMMARY OF THE INVENTION

The object of the invention is accordingly to make a memory capacity of a frame buffer extremely small, to cancel the undesirable restriction of a display color mode applied in one screen page, and to remove an interblock distortion with only a little extension of hardware.

The above and other related objects are realized by a first image decoding system according to the invention for decoding compression data to video data, where the compression data are generated by dividing original video data constituting one screen page into a plurality of nxn-pixel blocks and coding the video data by each block. The first image decoding system includes:

compression data input means for inputting the compression data previously coded by each block, along a predetermined direction of an image;

decoding means for decoding the input compression data to video data corresponding to each block at a first timing;

memory means for storing and arranging the decoded video data to make the decoded video data readable in a unit of at least n lines when decoding of the compression data along the predetermined direction is completed; and reading means for successively reading the video data of at least n lines out of the memory means at a second timing different from the first timing for decoding.

In the first image decoding system of the invention thus constructed, the compression data input means inputs compression data, which are previously generated by coding video data representing one screen page by each nxn-pixel block, along a predetermined direction of an image, that is, a horizontal direction or a direction perpendicular to the horizontal direction. The decoding means then decodes the input compression data to video data corresponding to each pixel block at a first timing. The decoded video data are successively stored in the memory means in such a manner that the decoded video data are made readable in a unit of at least n lines when decoding of the compression data along the predetermined direction is completed. The reading means successively reads the video data of at least n lines out of the memory means at a second timing different from the first timing for decoding. The structure of the first image decoding system allows an image of one screen page to be displayed with a memory having a minimum capacity of n lines.

The invention is also directed to a second image decoding system for decoding compression data to video data, where the compression data are generated by dividing original video data constituting one screen page into a plurality of nxn-pixel blocks and coding the video data by each block. The second image decoding system includes:

an input circuit for inputting the compression data previously coded by each block, along a horizontal scanning direction of a display unit;

a decoder for decoding the input compression data to video data corresponding to each block;

a memory for storing and aligning the decoded video data, each consisting of nxn pixels, along the scanning direction to make the video data readable in a unit of at least n lines at a first speed; and a reading circuit for reading data of each pixel along the scanning direction of the display unit out of the video data of at least n lines previously stored in the memory, at a second speed lower than the first speed.

In the second image decoding system of the invention, the input circuit inputs compression data, which are previously generated by coding original video data constituting one screen page by each nxn pixel block, along a horizontal scanning direction of a display unit. The input compression data are decoded to video data corresponding to each block by the decoder. The decoded video data are successively stored in the memory at a first speed. The video data, each consisting of nxn pixels, are aligned along the scanning direction in such a manner that the video data are made readable in a unit of at least n lines out of the memory. The reading circuit then reads data of each pixel along the scanning direction of the display unit out of the video data of at least n lines previously stored in the memory, at a second speed lower than the first speed. The structure of the second image decoding system allows an image of one screen page to be displayed with a memory having a minimum capacity of n lines.

In another aspect, the invention provides an image reconstruction system for reconstructing an image previously stored and making the reconstructed image shown on a display unit as a moving picture. The image reconstruction system includes:

compression data memory means for storing compression data generated by dividing original video data constituting one screen page into a plurality of nxn-pixel blocks and coding the video data by each block;

compression data input means for inputting the compression data stored in the compression data memory means, along a predetermined direction of an image;

decoding means for decoding the input compression data to video data corresponding to each block;

decoded data memory means for storing and arranging the decoded video data to make the decoded video data readable in a unit of at least n lines when decoding of the compression data along the predetermined direction is completed; and reading means for successively reading the video data of at least n lines out of the decoded data memory means at a timing corresponding to a display timing of the display unit.

The invention is further directed to a first interblock distortion removal filter used in a process of decoding compression data to video data, where the compression data are generated by dividing original video data constituting one screen page into a plurality of nxn-pixel blocks and coding the video data by each block according to an irreversible coding method. The first interblock distortion removal filter includes:

a first memory for storing first video data of n lines decoded along a predetermined direction of an image;

a second memory for storing second video data of another n lines adjacent to the first video data; and a computing element for reading out video data of a first line in the second memory or the first memory while reading out video data of a last line in the first memory or the second memory and executing a predetermined filtering process between the video data of the first line and the video data of the last line.

The first interblock distortion removal filter of the invention executes a predetermined filtering process between first video data of n lines decoded along a predetermined direction of an image and stored in the first memory and second video data of other n lines adjacent to the first video data and stored in the second memory. The computing element reads out video data of a first line in the second memory or the first memory while reading out video data of a last line in the first memory or the second memory, and then executes the predetermined filtering process, such as calculating a weighted average of the video data of the last line and those of the first line.

Another aspect of the invention is directed to a second interblock distortion removal filter used in a process of decoding compression data to video data, where the compression data are generated by dividing original video data constituting one screen page into a plurality of n×n-pixel blocks and coding the video data by each block according to an irreversible coding method. In this embodiment, decoded video data are treated in a standard unit of m blocks (m represents an integer equal to or greater than one) along a predetermined direction of an image by at least two lines.

The second interblock distortion removal filter includes:

reading means for reading the video data by each block where a columnar direction perpendicular to the predetermined direction is determined as a preferential reading direction;

last line data memory means for, while the reading means reading video data corresponding to a certain block and a next block adjacent to each other along the columnar direction, storing data of a last line of the certain block; and a computing element for, while the reading means reading data of a first line of the next block, executing a predetermined filter operation in a pixel unit between the data of the first line of the next block and the data of the last line of the certain block stored in the last line data memory means.

The second interblock distortion removal filter of the invention treats decoded video data in a standard unit of m blocks (m represents an integer equal to or greater than one) along a predetermined direction of an image by at least two lines. The standard unit is preferably applied to processes of coding with different compression degrees for luminance signals and color difference signals, such as J-PEG. The reading means reads the video data by each block where a column direction perpendicular to the predetermined direction is determined as a preferential reading direction. While the reading means reads video data corresponding to a certain block and a next block adjacent to each other along the preferential reading direction, the last line data memory means stores data of a last line of the certain block. While the reading means reads data of a first line of the next block, the computing element executes a predetermined filter operation in a pixel unit between the data of the first line of the next block and the data of the last line of the certain block stored in the last line data memory means. In this manner, the second interblock distortion removal filter eliminates interblock distortions in the standard unit of m blocks by at least two lines.

Still another aspect of the invention is directed to a third interblock distortion removal filter used in a process of decoding compression data to video data, where the compression data are generated by dividing original video data constituting one screen page into a plurality of n×n-pixel blocks and coding the video data by each block according to an irreversible coding method. In this structure, decoded video data are treated in a standard unit of m (m represents an integer equal to or greater than one) blocks along a predetermined direction of an image by at least two lines.

The third interblock distortion removal filter includes:

reading means for reading the video data by each block where a columnar direction perpendicular to the predetermined direction is determined as a preferential reading direction;

last line data memory means for, while the reading means reading video data corresponding to a certain block and a next block adjacent to each other along the columnar direction, storing data of a last line of the certain block; and a first computing element for, while the reading means reading data of a first line of the next block, executing a predetermined filter operation in a pixel unit between the data of the first line of the next block and the data of the last line of the certain block stored in the last line data memory means.

The third interblock distortion removal filter further includes:

a first memory for storing first video data of 2×n lines generated by repeating the process by the reading means, the last line data memory means, and the first computing element in the direction of alignment of the m blocks in the standard unit of 2 lines×m blocks;

a second memory for storing second video data of next 2×n lines adjacent to the first video data; and a second computing element for reading out video data of a first line in the second memory or the first memory while reading out video data of a last line in the first memory or the second memory and executing a predetermined filtering process between the video data of the first line and the video data of the last line.

The third interblock distortion removal filter according to the invention has functions of the second interblock distortion removal filter and other additional functions explained below. The first memory stores first video data of 2×n lines generated by repeating the process of the second interblock distortion removal filter in the direction of alignment of the m blocks in the standard unit of 2 lines×m blocks. Second video data of next 2×n lines adjacent to the first video data are then stored in the second memory. The second computing element reads out video data of a first line in the second memory or the first memory while reading out video data of a last line in the first memory or the second memory, and executes a predetermined filtering process between the video data of the first line and the video data of the last line. The third interblock distortion removal filter eliminates interblock distortions on a boundary between images of 2×n lines.

According to another aspect the invention, a method of compressing video data includes the steps of:

dividing original video data constituting one screen page into a plurality of n×n-pixel blocks;

coding the video data by each block according to an irreversible coding method, the coding step being executed for at least two consecutive blocks in a direction different from an image scanning direction; and storing compression data generated in the coding step.

The invention is also directed to a method of decoding compression data to video data, where the compression data are generated by dividing original video data constituting one screen page into a plurality of n×n-pixel blocks and coding the video data by each block according to an irreversible coding method. The decoding method includes the steps of:

reading decoded video data of at least two consecutive blocks in a direction different from an image scanning direction;

executing a filter process for removing an interblock distortion generated on a boundary between the two consecutive blocks;

storing video data after the filter process successively in the image scanning direction; and executing a filter process for removing an interblock distortion generated on a boundary between blocks adjacent to each other in the image scanning direction while reading out the video data stored in the previous step.

These and other objects, features, aspects, and advantages of the present invention will become more apparent from the following detailed description of the preferred embodiment with the accompanying drawings.

BRIEF DESCRIPTION OF THE DRAWINGS

FIG. 9 is a block diagram showing an internal structure of the compression data input block 47a;

FIG. 20 shows a process of removing an interblock distortion on the boundary SA;

FIGS. 30A through 30G shows a fundamental operation of the video data compression unit 100 and the video data decompression unit 200;

FIG. 32 shows a categorizing table used in Huffman coding process;

FIG. 33 shows an example of a Huffman code table HTDC for DC coefficients;

FIG. 36 shows a two-dimensional Huffman code table HTAC for AC coefficients;

FIG. 37 shows exemplified contents in the Huffman code table HTAC;

FIGS. 38A through 38C shows an example of Huffman coding process;

FIGS. 39A through 39C shows an exemplified structure of null run data and an image expressed by the null run data; and FIG. 40 shows part of the AC coefficient Huffman code table HTAC of FIG. 15, which is applied to null run data.

DESCRIPTION OF THE PREFERRED EMBODIMENT

Figure 1:
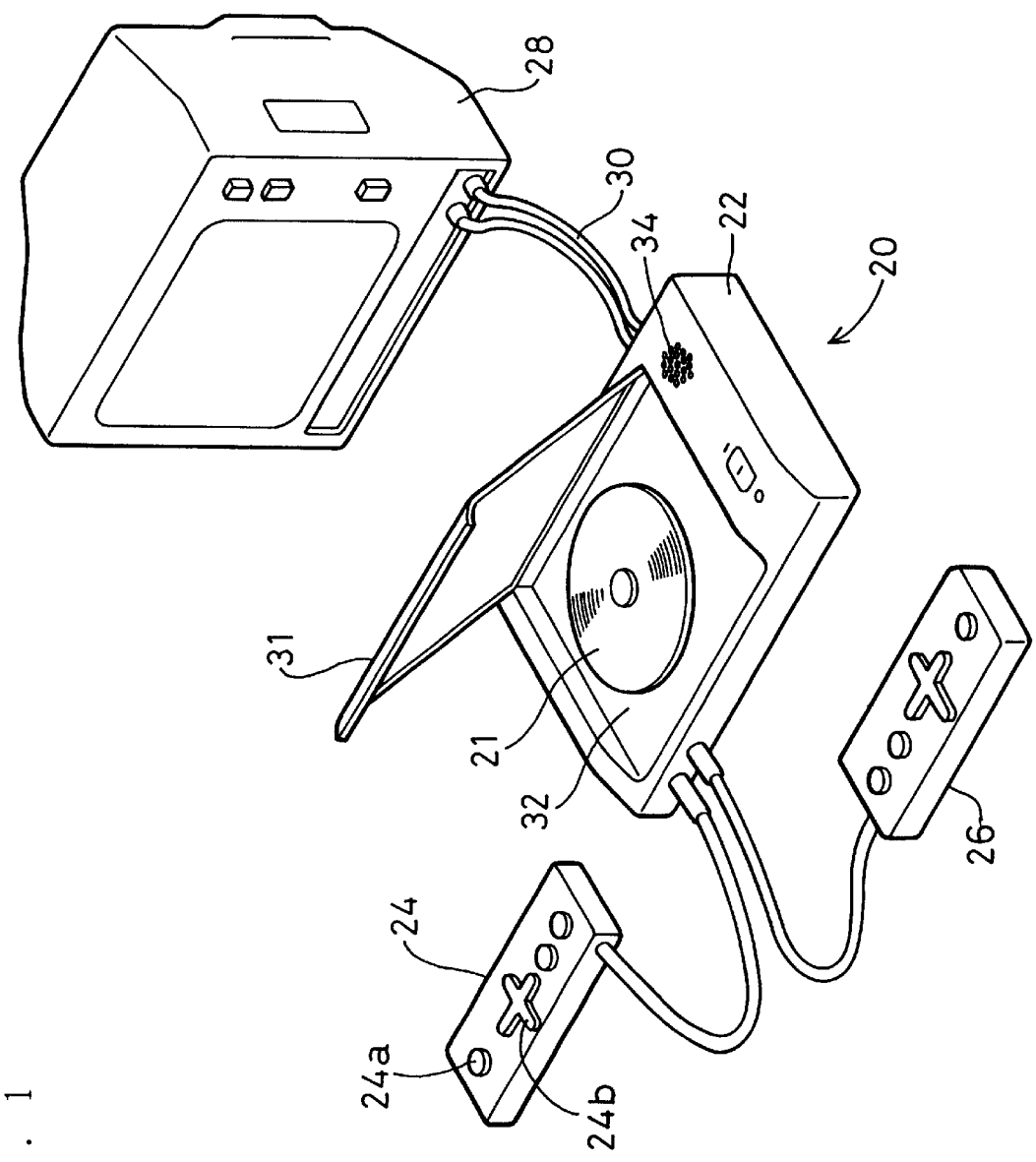
FIG. 1 is a perspective view illustrating a video game machine 20 which includes an image processing apparatus embodying the invention.
Figure 2:
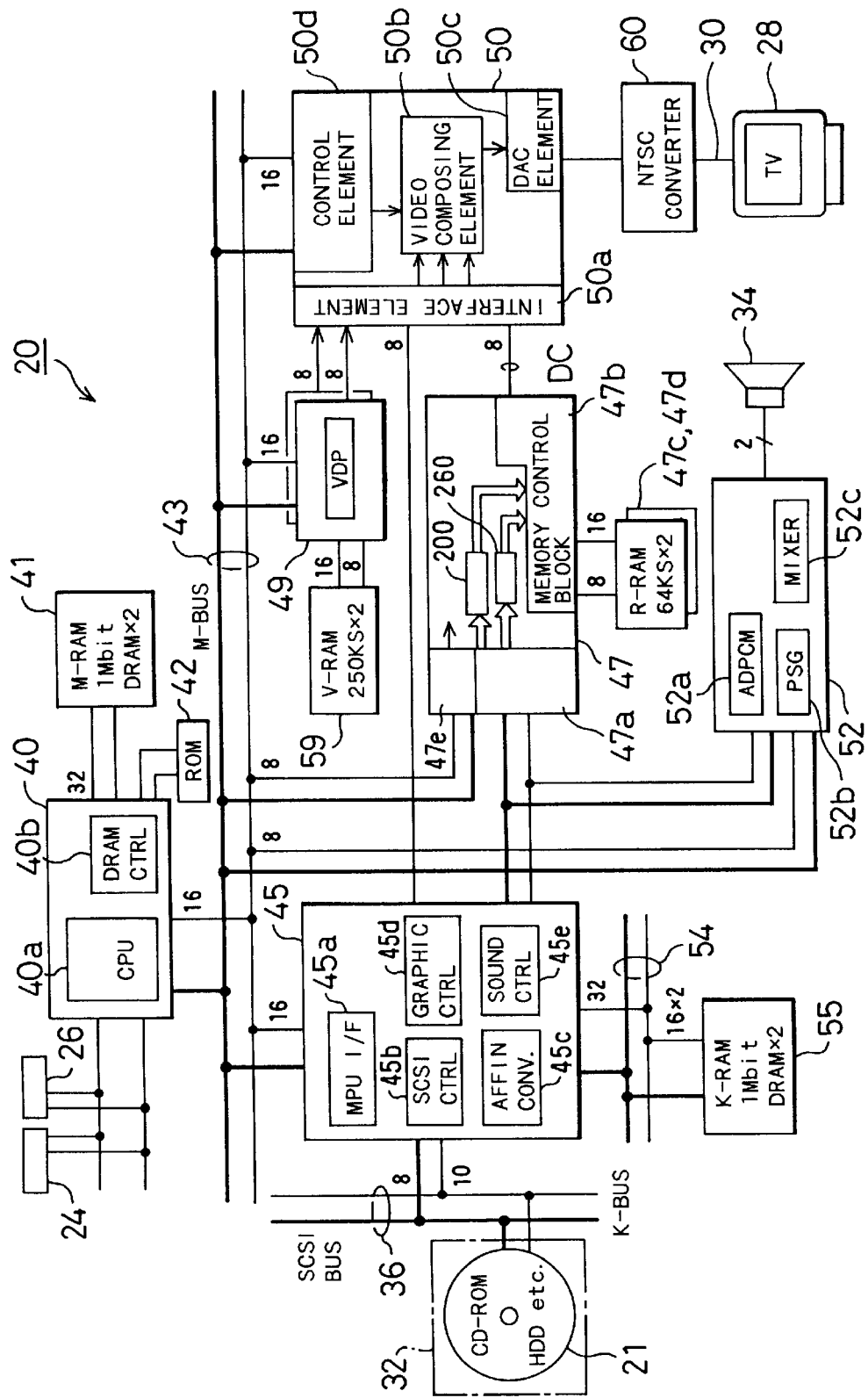
FIG. 2 is a block diagram showing an internal structure of the video game machine 20.

FIG. 1 is a perspective view illustrating a video game machine 20 which includes an image processing apparatus embodying the invention, and FIG. 2 is a block diagram showing an internal structure of the video game machine 20.

The video game machine 20, as shown in FIG. 1, includes a main unit 22 where a CD-ROM (compact disk read-only memory) 21 is removably set, a pair of game pads 24 and 26 connected to the main unit 22, a video signal cable 30 for outputting video signals to a color television 28, and a speaker 34 for outputting audio sound. The main unit 22 has a freely openable cover 31, which is open to allow the CD-ROM 21 to be set on a CD-ROM drive 32 of the main unit 22. The cover 31 is subsequently closed, when a turn table of the CD-ROM drive 32 starts rotation and a micro-processor in the main unit 22 reads a game program and required audio and video information stored in the CD-ROM 21 to start a game. Users can enjoy the game by operating the game pads 24 and 26 each having a switch 24a and a cursor stick 24b.

As clearly seen in the block diagram of FIG. 2, the main unit 22 includes a variety of circuits for reconstructing and displaying a moving picture based on data registered in the CD-ROM 21 and data generated in the machine 20. The video game machine 20 includes the CD-ROM drive 32 connected to a bus SCSI-BUS 36, a micro-processor unit 40

(hereinafter referred to as MPU) for generally executing image processing and other related processing, a main memory unit 41 (hereinafter referred to as M-RAM) directly connected to the MPU 40, and a ROM 42 directly connected to the MPU 40 for storing a BIOS (basic input output systems) program. The video game machine 20 further includes a variety of units connected to a bus M-BUS 43 of the MPU 40; that is, a video signal control unit 45, a video data decompression unit 47, a VDP unit 49 for outputting specified video signals, a video encoder unit 50 for composing video signals and outputting the composed video signals, and an audio data output unit 52 for outputting audio data.

The video game machine 20 also includes a memory K-RAM 55 connected to a local bus K-BUS 54 of the video signal control unit 45, another memory R-RAM 57 connected to a local bus of the video data decompression unit 47, a video memory V-RAM 59 connected to a local bus of the VDP unit 49, an NTSC converter 60 for converting output signals from the video encoder unit 50 to normal video signals (NTSC signals) and outputting the NTSC signals to the color television 28.

The MPU 40 is a high-speed data processing circuit having an operation element 40a for executing arithmetic logic operation including floating point operation, and a dynamic memory controller element 40b. The MPU 40 receives and outputs data from and to the game pads 24 and 26 and the CD-ROM 21 according to a program in the M-RAM 41 using the BIOS program previously stored in the ROM 42, and controls the variety of units to display moving pictures and output audio sound for proceeding of a game.

Each of the video signal control unit 45, the video data decompression unit 47, the video encoder unit 50, and the audio data output unit 52 is composed of an arithmetic and logical operation unit. Structure and functions of each unit will be described briefly.

Video Signal Control Unit 45:

The video signal control unit 45 includes an MPUI/F (MPU InterFace) 45a for receiving and outputting data from and to the MPU 40 via the M-BUS 43, an SCSI controller 45b for receiving and outputting data from and to the CD-ROM drive 32 via the SCSI-BUS 36, an AFFINE transform unit 45c for executing affine transformation of video data input from the CD-ROM 21, a graphic controller 45d for controlling output of video data received from the CD-ROM 21, and a sound controller 45e for controlling output of audio data. The video signal control unit 45 extracts video data and audio data out of all the input data from the CD-ROM 21 and temporarily stores the audio and video data (AV data) in the K-RAM 55. Under control of the MPU 40, the AV data stored in the K-RAM 55 are output at a predetermined timing to the video data decompression unit 47 and the audio data output unit 52 through the graphic controller 45d and the sound controller 45e. When the MPU 40 instructs a predetermined affine transformation of video data, the AFFINE transform unit 45c executes the predetermined affine transformation to implement linear conversion of video data or modification of an image.

Video Data Decompression System 47:

The video data decompression system 47 realizes a method of image decoding according to the invention and works as an image decoding apparatus or an interblock distortion removal filter of the invention. The detailed structure of the video data decompression system 47 including a step of image coding will be described later. In the preferred embodiment, the video data decompression system 47 executes Huffman decoding of input video data, inverse discrete cosine transform (IDCT) of Huffman decoded data, run length decompression of input video data. The decompression system 47 also works as a filter for removing an interblock distortion with respect to inverse discrete cosine transformed video data, and executes a block-line conversion where block data are re-aligned to video data along scanning lines to be displayed on the color television 28. The decompression system 47 includes a variety of processing circuits required for the above processes as well as a controller 47e for controlling the processing circuits.

VDP Unit 49:

The VDP unit 49 has two identical chips mounted thereon. The two chips perform an identical function for generating a background image and a block-unit image generally called a sprite, both having a specific pattern and color. The sprite is a specific image which allows simple display of a certain block frequently generated and erased as well as a moving character used in a game or the like. A plurality of sprites corresponding to block-unit video signals are simultaneously output with a background image according to control signals from the MPU 40. Sprite images including required characters are stored in the V-RAM 59 connected with the VDP unit 49. When the MPU 40 outputs a certain command such as 'Move the character from one plane to another place', the VDP unit 49 analyzes the certain command and easily implements a movement corresponding to the certain command by successively generating and erasing a sprite stored in the V-RAM 59 along a path of the movement.

Video Encoder Unit 50:

The video encoder unit 50 includes an interface element 50a for receiving video data from the video signal control unit 45, the video data decompression unit 47, and the VDP unit 49, a video composing element 50b, including a look-up table for determining a color of each video data and a circuit for setting a priority sequence of a plurality of input video data, for composing the plurality of input video data according to the priority sequence, a DAC (digital/analog converter) element 50c for converting the composite video data to analog signals, and a control element 50d for controlling the video composing element 50b. Details of each element will be described later. The video encoder unit 50 receives one set of video signals from the video signal control unit 45, one set of video signals from the video data decompression unit 47, and two sets of video signals including a background image and a sprite from the VDP unit 49, and composes images corresponding to these video signals according to a predetermined priority sequence. The relationship between two composing images may be varied by a plurality of grades; that is, a higher priority image (an image laid over the other) may vary from transparent to opaque with respect to a lower priority image (an image laid under the other).

Audio Data Output Unit 52:

The audio data output unit 52 outputting sound and music from the speaker 34 includes an ADPCM element 52a for executing sound composition by adaptive differential pulse coding modulation (ADPCM), a sound source generator (PSG) 52b allowing simultaneous generation of predetermined plural sound sources, and a mixer 50c for composing composite sounds by the ADPCM element 52a or sounds from the plurality of sound sources. The audio data output unit 52 composes a sound based on data from the video signal control unit 45 or the MPU 40 or plays a piece of music using one or a plurality of sound sources in order to output the composite sound or the piece of music to the speaker 34. Although only one speaker 34 is installed in the main unit 22 to generate monaural sound, an external speaker, for example, mounted on the color television 28 may be used for generate stereo sound.

Figure 3:
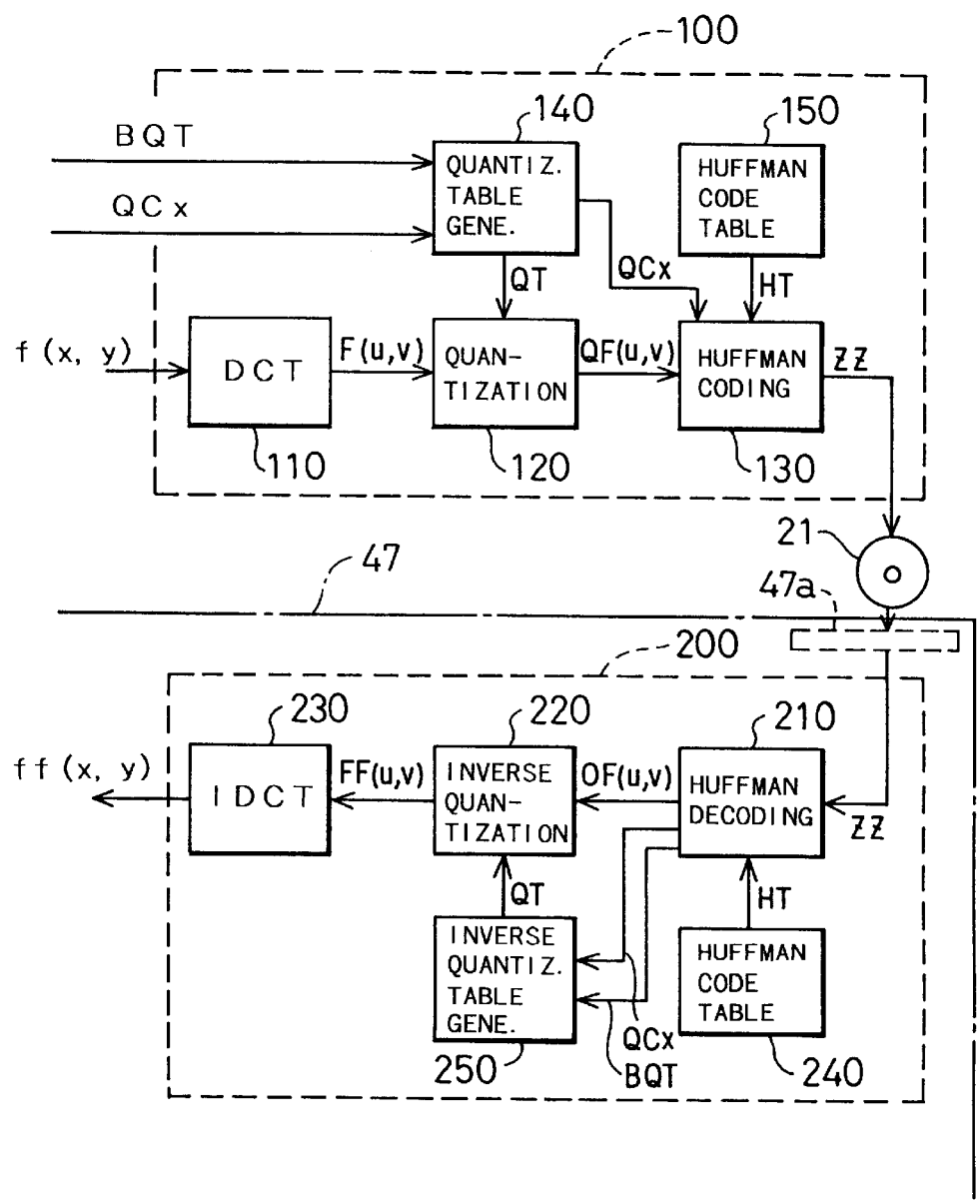
FIG. 3 is a block diagram showing a concrete structure of a video data decompression unit 200 with a video data compression unit 100.

A data compression process for generating compression data stored in the CD-ROM 21 is first described for easier understanding of an image decoding process. FIG. 3 is a block diagram showing functions of a video data compression unit 100 and a video data decompression unit 200.

The video data compression unit 100 for generating data stored in the CD-ROM 21 includes a DCT (discrete cosine transform) element 110 for executing discrete cosine transform with respect to original video data f(x,y), a quantization element 120 for quantizing a discrete cosine transform (DCT) coefficient F(u,v) obtained through the discrete cosine transform, a Huffman coding element 130 for Huffman coding a quantized DCT coefficient QF(u,v) to generate compression video data ZZ, a quantization table generator element 140, and a Huffman code table memory 150. The quantization table generator element 140 creates a quantization table QT based on a basic quantization table BQT and a quantization level coefficient QCx as described later. The compression video data ZZ generated by the video data compression unit 100 are stored in the CD-ROM 21 and supplied to the video game machine 20 of the embodiment.

Compression data stored in the CD-ROM 21 are input into the video data decompression system 47 of the video game machine 20. The video data decompression unit 200 is incorporated in the video data decompression system 47 to function specifically for data decoding. The structure of the video data decompression unit 200 is shown corresponding to the video data compression unit 100 in FIG. 3.

The video data decompression unit 200 includes a Huffman decoding element 210 for Huffman decoding the compression video data ZZ, an inverse quantization element 220 for inversely quantizing the quantized DCT coefficient QF(u,v) decoded by the Huffman decoding element 210, an IDCT (inverse discrete cosine transform) element 230 for executing inverse discrete cosine transform with respect to an inversely quantized DCT coefficient FF(u,v) to generate video data ff(x,y), a Huffman code table memory 240, and an inverse quantization table generator element 250. The inverse quantization table generator element 250 receives from the Huffman decoding element 210 a basic quantization table BQT and a quantization level coefficient QCx decoded from the compression video data ZZ to create a quantization table QT based thereon. The quantization table QT in the video data decompression unit 200 is identical with the quantization table QT used in the video data compression unit 100. An identical Huffman code table HT is stored both in the Huffman code table memory 240 of the video data decompression unit 200 and the Huffman code table memory 150 of the video data compression unit 100.

Figure 4A:
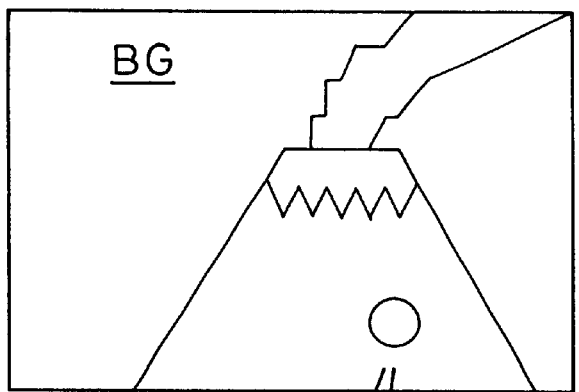
FIG. 4A is a plan view illustrating an exemplified original image.
Figure 4B:
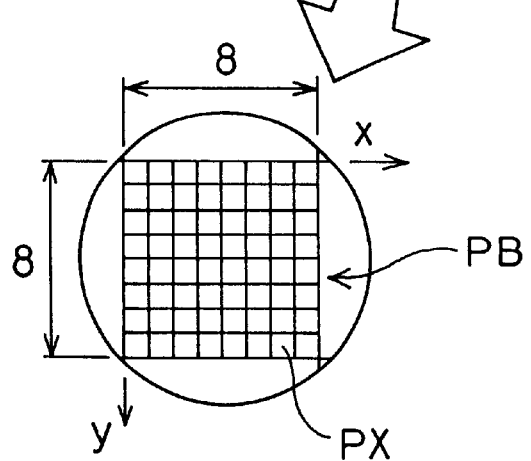
FIG. 4B is an enlarged view illustrating part of the original image.

FIG. 4A is a plan view illustrating an exemplified original image constituting a background image of a game. The original image includes a natural image representing a volcano and a background BG uniformly painted with a certain color. FIG. 4B is an enlarged view showing part of the original image including a predetermined pixel block PB. The predetermined pixel block PB consists of M×N pixels PX (M and N represent integers). Each integer M or N is preferably set equal to a value '8' or '16' (in this example, M=N=8). The integers M and N may be the same values or different values. As described later, a data segment of the compression video data ZZ representing the background BG has a specific data form (null run data) showing continuity of a plurality of pixel blocks PB painted with a uniform color.

A circuit for decompressing run length compression data is also incorporated in the video data decompression system 47. Although a method of data compression and data decompression is not an essential part of the invention, this is closely related to video data processed by the image processing apparatus according to the invention and will thus be described in detail after description of preferred embodiments of the invention. Structure of compression data generated through a coding process is, however, described now for convenience of explanation.

Figure 5:
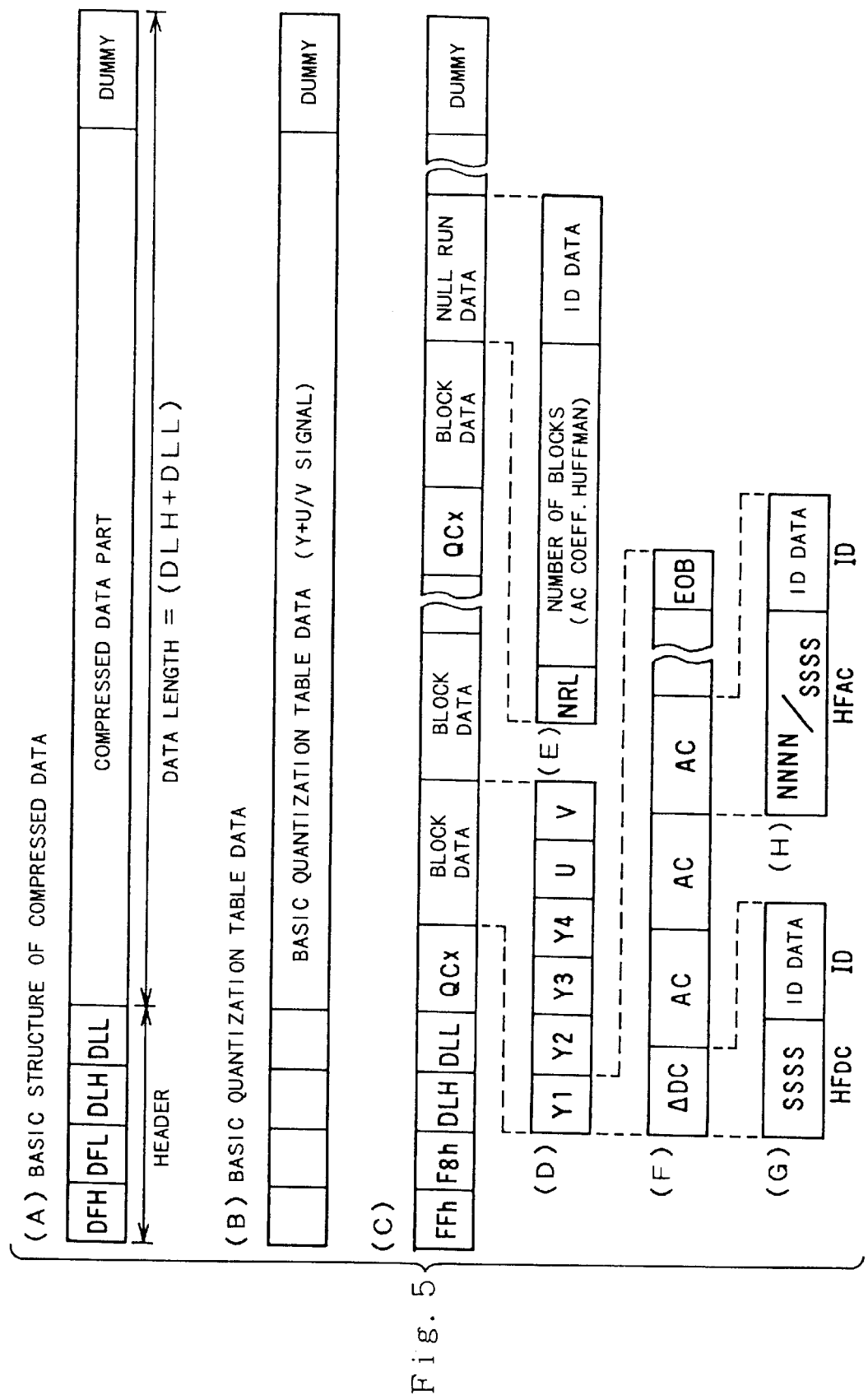
FIG. 5 shows a typical structure of compression data.

FIG. 5 shows a typical structure of compression data. Each compression data (hereinafter may be referred to as a data structure) includes a header element, a compression data element, and a dummy element as shown in FIG. 5A. The header element consists of four 1-byte data, DFH, DFL, DLH, and DLL. The first two data DFH and DFL represent a data type included in the compression data element: for example, data of the basic quantization table BQT, a full-color natural image compression data, and run length image compression data. The data type represents the difference in a number of colors of a natural image and an animation image. The video data decompression system 47 changes a method of internal processing according to the first two data DFH and DFL as described later. The latter 16-bit data in the header element (DLH+DLL) shows a total data length of the compression data element and the dummy element. In other words, the 16-bit data represents a size of the whole compression data. The video data decompression system 47 counts data according to the code (DLH+DLL), and cancels data requirement to the video signal control unit 45 after receiving whole data in number of DLH+DLL.

Figure 6:
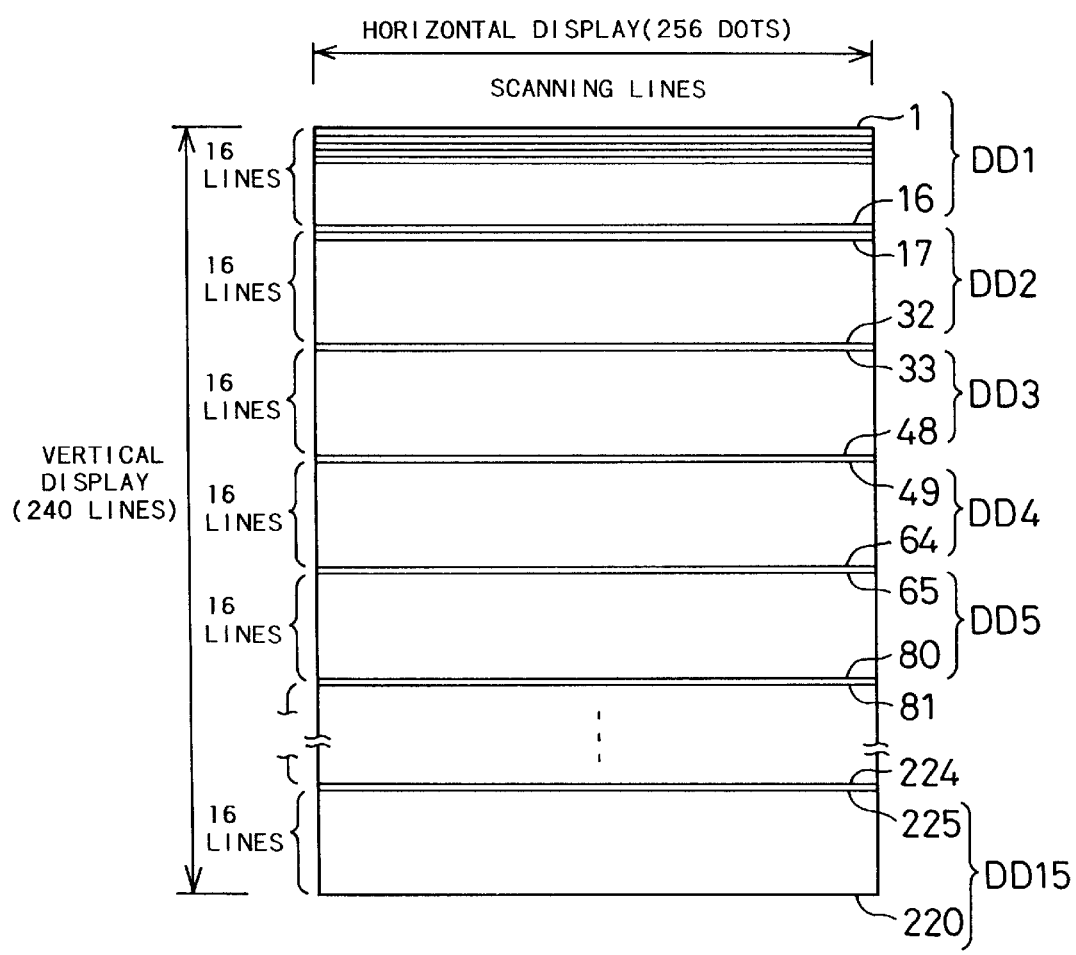
FIG. 6 schematically shows one screen page consisting of a plurality of data structures.

The compression data element represents data generated by compressing original video data. Each data structure includes data of sixteen scanning lines. An image processed in the embodiment consists of 256 pixels in a horizontal direction by 240 scanning lines in a vertical direction. Fifteen data structures shown in FIG. 5 are required for constituting one screen page. FIG. 6 schematically shows fifteen data structures DD1 through DD15 constituting one screen page. Each data structure has only one mode representing a type of compression data included therein. The data type is accordingly common for data of sixteen scanning lines. One screen page may include only one type of video data (that is, the fifteen data structures have an identical data type) or alternatively include different types of video data (that is, the fifteen data structures have a plurality of data types). Again referring to FIG. 5, since the compression data element is variable length data including a Huffman code, the dummy element works to adjust the total data length of the compression data element and the dummy element equal to an integral multiple of a word (=2 byte).

FIG. 5B shows a structure of compression data representing the basic quantization table BQT. A set of compression data element includes a first data element representing a basic quantization table BQT for Y signals and a second data element representing a basic quantization table BQT for U and V signals. Huffman coding is not required for data representing the basic quantization table BQT.

FIG. 5C shows a structure of compression data showing a full-color natural image. A compression data element includes code data representing the quantization level coefficient QCx, block data corresponding to code data of each pixel block, and null run data showing continuity of a plurality of pixel blocks having a uniform color.

Figure 7A:
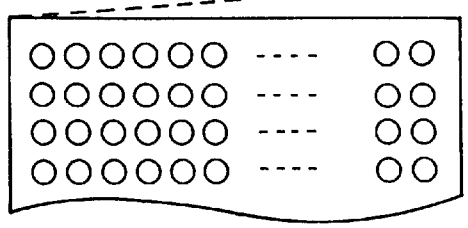
FIGS. 7A through 7C show the relation ship between Y, U, and V signal data.
Figure 7B:
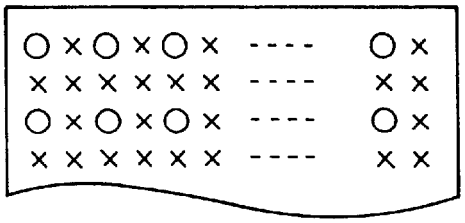
Figure 7C:
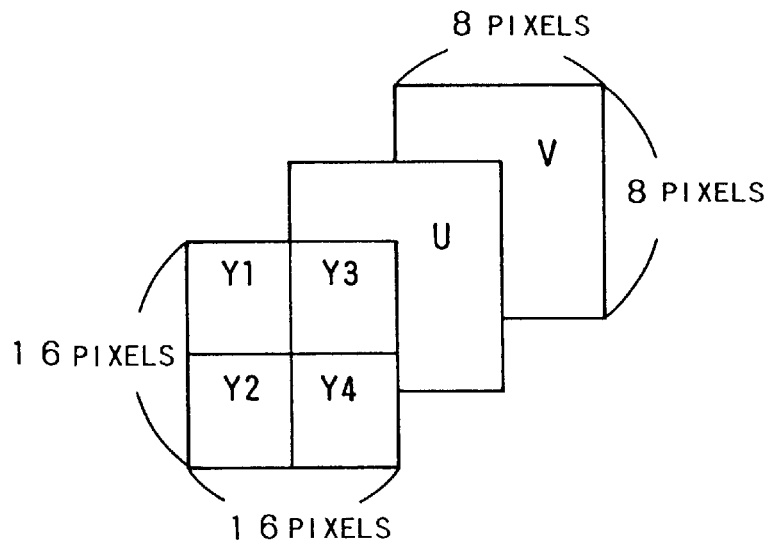

Referring to FIG. 5D, each unit of block data consists of four sets of Y-signal data, one set of U-signal data, and one set of V-signal data. FIG. 7 shows the relationship between Y, U, and V signal data. As shown in FIG. 7A, one screen page in this embodiment has a size defined as 256 pixels by 240 scanning lines. Discrete cosine transform is executed for every pixel block of 8×8 pixels without pixel skipping for Y signals. As for U and V signals, on the other hand, discrete cosine transform is executed for each pixel block of 8×8 pixels after ½ pixel skipping or sub-sampling in a horizontal direction and in a vertical direction as shown in FIG. 7B. An area of four Y-signal pixel blocks Y1 through Y4 thus corresponds to an area of one U-signal or V-signal pixel block as clearly seen in FIG. 7C. The reason of skipping U and V signals while non-skipping Y signals is that the eyes of human beings are relatively sensitive to the variation in luminance, that is, variation of Y signals, but relatively insensitive to the variation in color, that is, variation of U and V signals. Skipping of only U and V signals increases the compression rate without deteriorating the picture quality excessively. A unit of block data shown in FIG. 5D represents an array of Huffman code data of Y, U, and V pixel blocks shown in FIG. 7C. Data structures of FIGS. 5E through 5H will be described briefly after description of the preferred embodiment.

Figure 8:
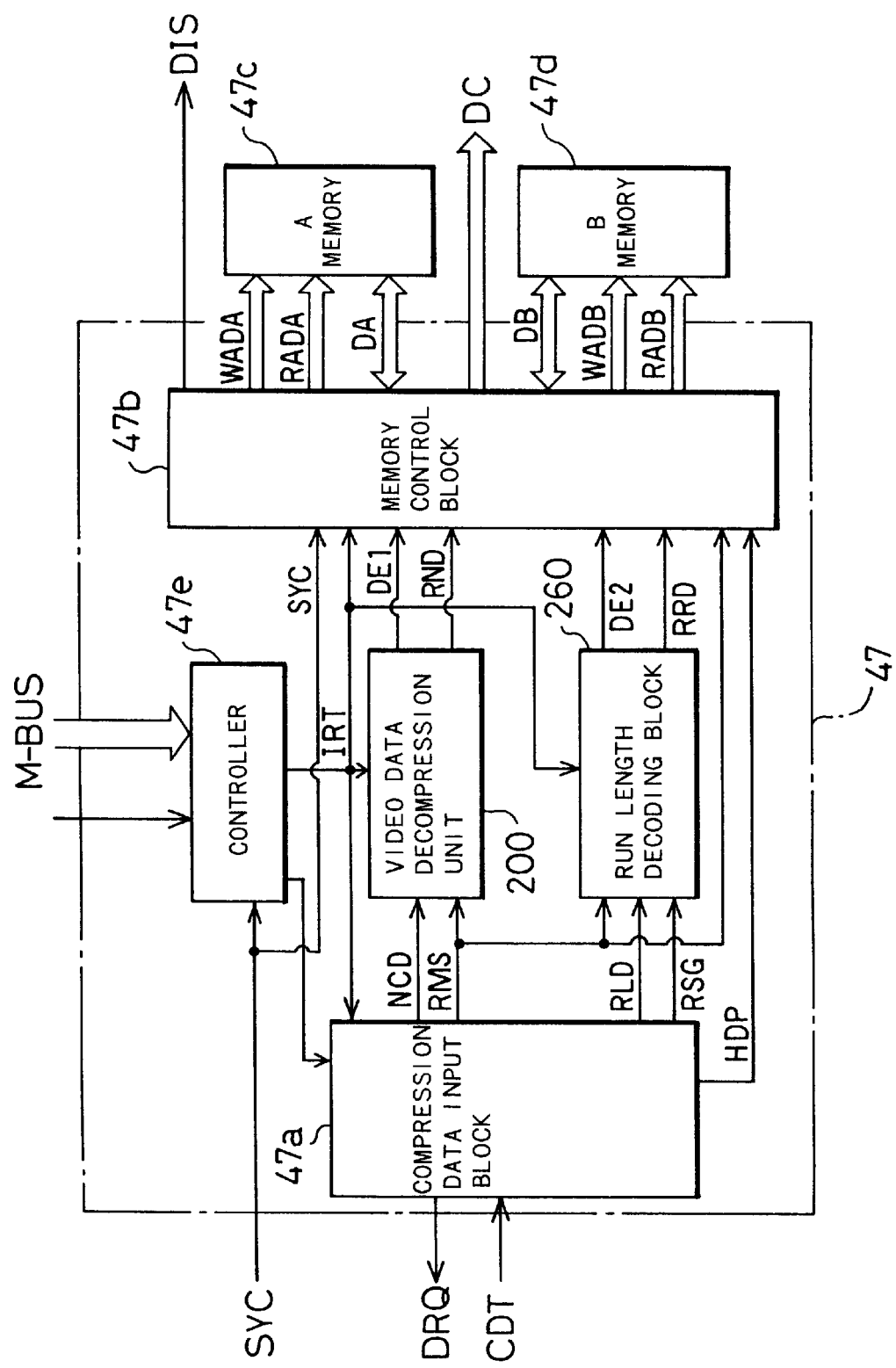
FIG. 8 is a block diagram showing a typical structure of a video data decompression system 47.

The general structure of the video data decompression system 47 is described in detail. FIG. 8 is a block diagram showing an internal structure of the video data decompression system 47. The video data decompression system 47 includes a compression data input block 47a, a run length decoding block 260, a memory control block 47b, a first memory or A memory 47c, and a second memory or B memory 47d as well as the video data decompression unit 200 and the controller 47e.

Figure 9:
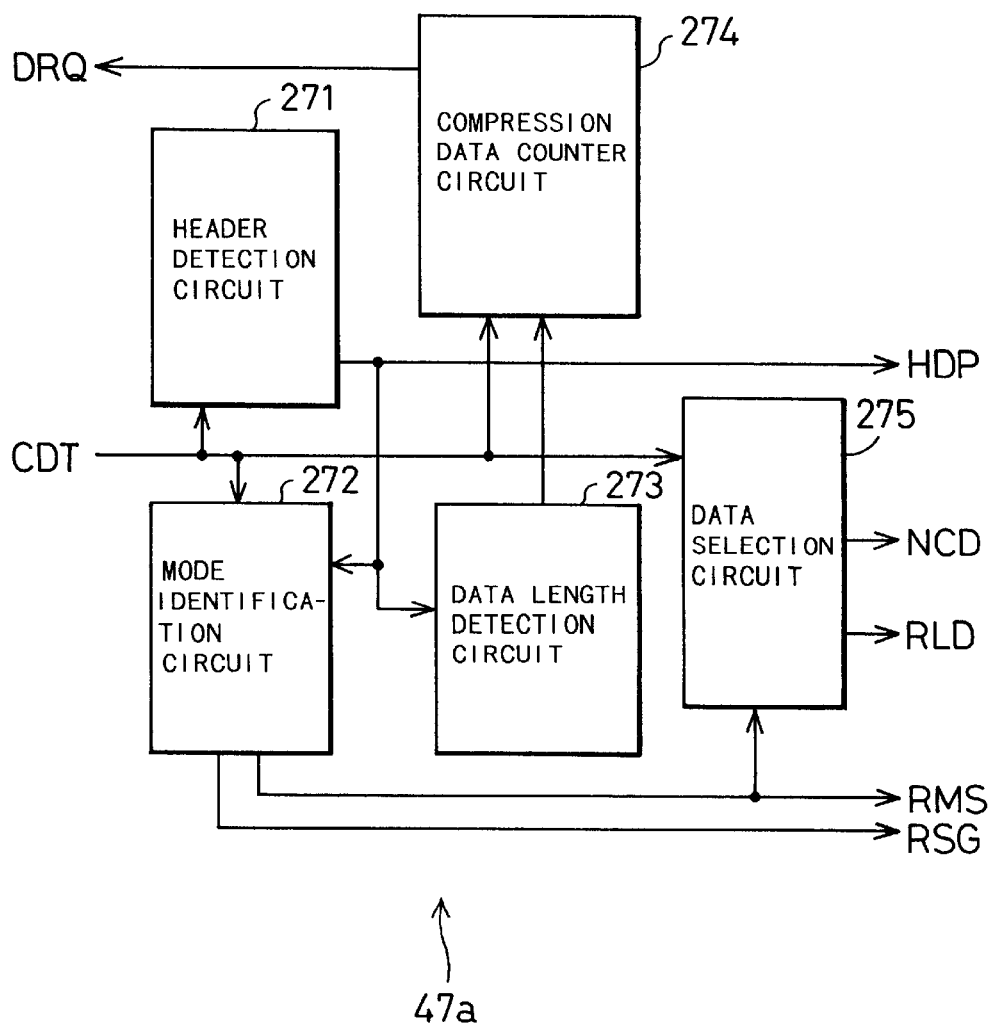

The compression data input block 47a receives data from the video signal control unit 45. FIG. 9 is a block diagram showing an internal structure of the compression data input block 47a. The compression data input block 47a includes a header detection circuit 271, a mode identification circuit 272, a data length detection circuit 273, a compression data counter circuit 274, and a data selection circuit 275. The header detection circuit 271 detects a specific code of the header element of the data structure (see FIG. 5) and outputs a header detection pulse signal HDP. According to this header detection signal HDP, a memory used for storing data is selected in the memory control block 47b. The mode identification circuit 272 identifies a compression mode, that is, (DFH+DFL) of the data structure in FIG. 5, and outputs either a decoding mode signal RMS representing a data mode of orthogonal transform-attributed compression or a discrimination signal RSG representing a data mode of run length-attributed compression. The decoding mode signal RMS is output to the video data decompression unit 200 and the memory control block 47b to activate the video data decompression unit 200 or an interblock distortion removal filter described later. The discrimination signal RSG is output to the run length decoding block 260 to activate the run length decoding block 260.

The data length detection circuit 273 detects the code (DLH+DLL) of the header element representing the total data length and outputs the code to the compression data counter circuit 274. The compression data counter circuit 274 is provided with a counter for setting the code (DLH+DLL) output from the data length detection circuit 273, and counts down the value on the counter on every input of compression data existing in the data structure. When the value on the counter becomes equal to zero, the compression data counter circuit 274 makes a data requirement signal DRQ inactive to cancel data requirement to the video signal control unit 45. Data are transferred from the video signal control unit 45 by every sixteen horizontal scanning lines as shown in FIG. 6. A time period required for data transfer is significantly shorter than a time period required for display of the sixteen scanning lines. The data requirement signal DRQ output from the compression data counter circuit 274 is thus made inactive considerably before completion of the display of the sixteen horizontal scanning lines. On completion of the display of the sixteen horizontal scanning lines, the compression data counter circuit 274 makes the data requirement signal DRQ active to start transfer of compression data from the video signal control unit 45. The video signal control unit 45 having the K-RAM 55 for storing compression data sent from the CD-ROM 21 receives the data requirement signal DRQ output from the compression data counter circuit 274, and starts to transfer a data structure corresponding to next sixteen scanning lines without delay.

The data selection circuit 275 receives the decoding mode signal RMS output from the mode identification circuit 272, and distributes compression data CDT. In the example of FIG. 9, natural image compression data NCD generated by compressing a natural image by orthogonal transform is discriminated from run length compression data RLD generated by run length-attributed compression for convenience of explanation. In this case, the compression data CDT are distributed into the natural image compression data NCD and the run length compression data RLD according to the compression mode.

The compression data input block 47a outputs the various signals described above to the video data decompression unit 200, the run length decoding block 260, the memory control block 47b, and the controller 47e as shown in FIG. 8. The video data decompression unit 200 having an internal structure as previously described receives the decoding mode signal RMS and executes IDCT (inverse discrete cosine transform) to decode and decompress the natural image compression data NCD. Each decoded video data represents a 16×16 (256 dots) image consisting of four 8×8 pixel blocks. The video data decompression unit 200 decompresses the natural image compression data NCD according to an algorithm of Huffman coding, executes IDCT for Y, U, and V signal components of 8×8 dots, and outputs the decoded data as reconstructed natural image data RND. The video data decompression unit 200 also outputs a first data effective signal DE1 representing that the output data are effective decoded data while outputting the reconstructed natural image data RND.

The run length decoding block 260 receives the discrimination signal RSG, decodes the run length compression data RLD each constructed as a combination of a numeral representing a color and a length of continuity of the color, and outputs the decompressed data as reconstructed run length video data RRD together with a second data effective signal DE2 representing that the output data are effective decoded data. The reconstructed run length video data RRD are numeral data representing pixel colors. The run length compression data RLD has a high compression efficiency attained by varying the length of continuity of a certain color according to a display color mode, for example, 256 colors or 16 colors. The run length decoding block 260 receives the discrimination signal RSG representing the display color mode output from the mode identification circuit 272 of the compression data input block 47a, and changes the decoding process according to the display color mode. Although run length-attributed data compression allows coding of video data for each scanning line, run length coding for every sixteen horizontal scanning lines is applied in the embodiment to be compatible with natural image compression of every sixteen scanning lines.

Figure 10:
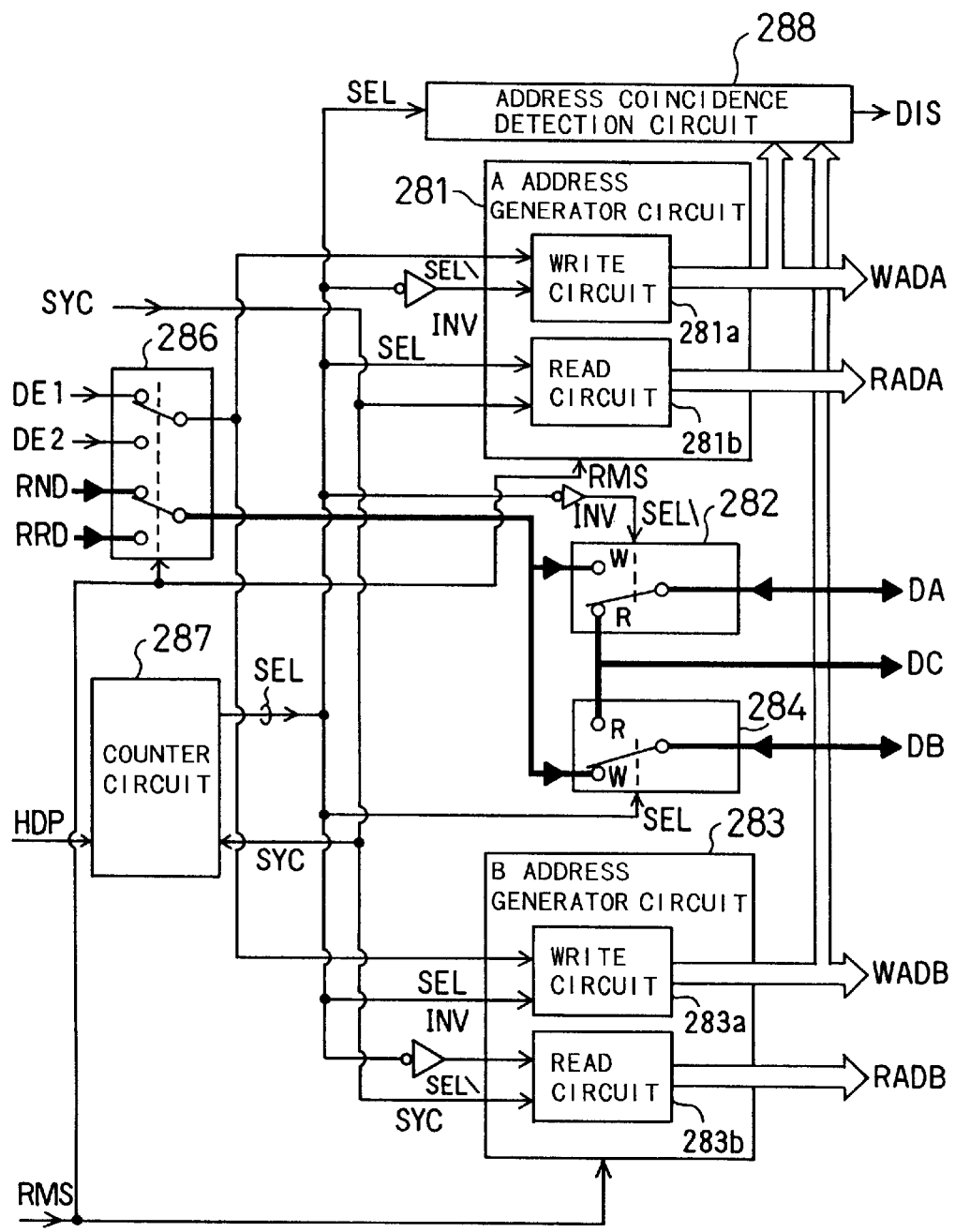
FIG. 10 is a circuit diagram showing a typical structure of the memory control block 47b.

Outputs of the video data decompression unit 200 and the run length decoding block 260 are input into the memory control block 47b, which composes the input data according to the requirement, executes the block-line conversion, and outputs video data constituting one screen page. FIG. 10 is a circuit diagram showing a typical structure of the memory control block 47b. The memory control block 47b is connected to both the A memory 47c and the B memory 47d to successively store video data output from the video data decompression unit 200 and the run length decoding block 260 in one of the A memory 47c and the B memory 47d while successively reading video data out of the other of the A memory 47c and the B memory 47d. These storing and reading processes are alternately executed in the A memory 47c and the B memory 47d.

The memory control block 47b includes an A address generator circuit 281 for generating addresses WADA or RADA for the A memory 47c, a B address generator circuit 283 for generating addresses WADB and RADB for the B memory 47d, an A switcher circuit 282 for alternately switching the data bus from reading out of the A memory 47c to writing in the A memory 47c or vice versa, a B switcher circuit 284 for alternately switching the data bus from reading out of the B memory 47d to writing in the B memory 47d or vice versa, a switcher circuit 286 for switching between the reconstructed data RND and RRD and between the first and second data effective signals DE1 and DE2, a counter circuit 287 for counting horizontal synchronizing signals SYC, and an address coincidence detection circuit 288 for determining coincidence of addresses and outputs a coincidence signal.

The signals output from the video data decompression unit 200 and the run length decoding block 260 are input into the switcher circuit 286, which selects signals according to the decoding mode signal RMS. When the decoding mode signal RMS represents effective natural image compression data NCD, the switcher circuit 286 selects and outputs the reconstructed natural image data RND and the first effective signal DE1. When the decoding mode signal RMS represents ineffective natural image compression data NCD and effective run length compression data RLD, the switcher circuit 286 selects and outputs the reconstructed run length video data RRD and the second effective signal DE2. The first effective signal DE1 or the second effective signal DE2 thus selected is input into either a write circuit 281a of the A address generator circuit 281 or a write circuit 283a of the B address generator circuit 283. While the video data decompression unit 200 or the run length decoding block 260 decodes the corresponding compression video data and successively outputs effective reconstructed data by the unit of pixels, either the write circuit 281a of the A address generator circuit 281 or the write circuit 283a of the B address generator circuit 283 generates a writing address WADA or WADB according to a selection signal SEL.

The counter circuit 287 receives the header detection signal HDP and outputs the selection signal SEL according to the process below. Under initial conditions, an initial value '16' is set in an internal counter of the counter circuit 287. The counter circuit 287 counts down the value on the counter on every input of a horizontal synchronizing signal SYC, and maintains the selection signal SEL at a high level. When the value on the counter becomes equal to zero, the counter circuit 287 inverts the selection signal SEL and sets the initial value '16' again in the internal counter. The counter circuit 287 then re-starts counting down in response to the horizontal synchronizing signal SYC while maintaining the selection signal SEL at a low level. The selection signal SEL is inverted on every input of sixteen horizontal synchronizing signals SYC.

Either the reconstructed natural image data RND or the reconstructed run length video data RRD selected in the switcher circuit 286 are input into either the A switcher circuit 282 or the B switcher circuit 284. Contacts of the A switcher circuit 282 and the B switcher circuit 284 are exclusively switched according to the selection signal SEL. Functions of the A switcher circuit 282 and the B switcher circuit 284 are described with operation of the A address generator circuit 281 and the B address generator circuit 283.

Referring to FIG. 10, the A address generator circuit 281 has the write circuit 281a for generating the writing address WADA and a read circuit 281b for generating a reading address RADA whereas the B address generator circuit 283 has the write circuit 283a for generating the writing address WADB and a read circuit 283b for generating a reading address RADB. These circuits 281a, 281b, 283a, and 283b are constructed to execute reading or writing exclusively in the A memory 47c or the B memory 47d. The selection signal SEL output from the counter circuit 287 is inverted by means of inverters INV. The signals input into the write circuit 281a of the A address generator circuit 281 and into the read circuit 283b of the B address generator circuit 283 are inversion of the signals input into the read circuit 281b of the A address generator circuit 281 and into the write circuit 283a of the B address generator circuit 283. The selection signal SEL is input into the B switcher circuit 284 whereas an inverted selection signal SEL\ is input into the A switcher circuit 282 as a switching signal.

When the selection signal SEL is at the high level, the read circuit 281b of the A address generator circuit 281 is activated to output the reading address RADA which is synchronized with the horizontal synchronizing signal SYC and updated on every input of the horizontal synchronizing signal SYC. A contact in the A switcher circuit 282 is accordingly switched to an R (reading) side as shown in FIG. 10. Data DA read out of the A memory 47c according to the reading address RADA from the read circuit 281b are output to the video encoder unit 50 via the A switcher circuit 282 and a signal path DC. Under such conditions, the selection signal SEL also activates the write circuit 283a of the B address generator circuit 283, which successively updates and outputs the writing address WADB on every output of the first effective signal DE1 or the second effective signal DE2. A contact in the B switcher circuit 284 is accordingly switched to a W (writing) side as shown in FIG. 10. The reconstructed natural image data RND output from the video data decompression unit 200 or the reconstructed run length video data RRD output from the run length decoding block 260 are output as writing data DB to the B memory 47d via the B switcher circuit 284, and written at an address of the B memory 47d specified by the writing address WADB output from the write circuit 283a of the B address generator circuit 283.

When the selection signal SEL is at the low level, the write circuit 281a of the A address generator circuit 281 is activated to successively update and output the writing address WADA on every output of the first effective signal DE1 or the second effective signal DE2. The contact in the A switcher circuit 282 is accordingly switched to the W (writing) side. The reconstructed natural image data RND output from the video data decompression unit 200 or the reconstructed run length video data RRD output from the run length decoding block 260 are output as writing data DA to the A memory 47c via the A switcher circuit 282, and written at an address of the A memory 47*c* specified by the writing address WADA output from the write circuit 281*a* of the A address generator circuit 281. Under such conditions, the inversion of the selection signal SEL activates the read circuit 283*b* of the B address generator circuit 283 to output the reading address RADB which is synchronized with the horizontal synchronizing signal SYC and updated on every input of the horizontal synchronizing signal SYC. The contact in the B switcher circuit 284 is accordingly switched to the R (reading) side. Data DB read out of the B memory 47*d* according to the reading address RADB from the read circuit 283*b* are output to the video encoder unit 50 via the B switcher circuit 284 and the signal path DC.

Figure 11:
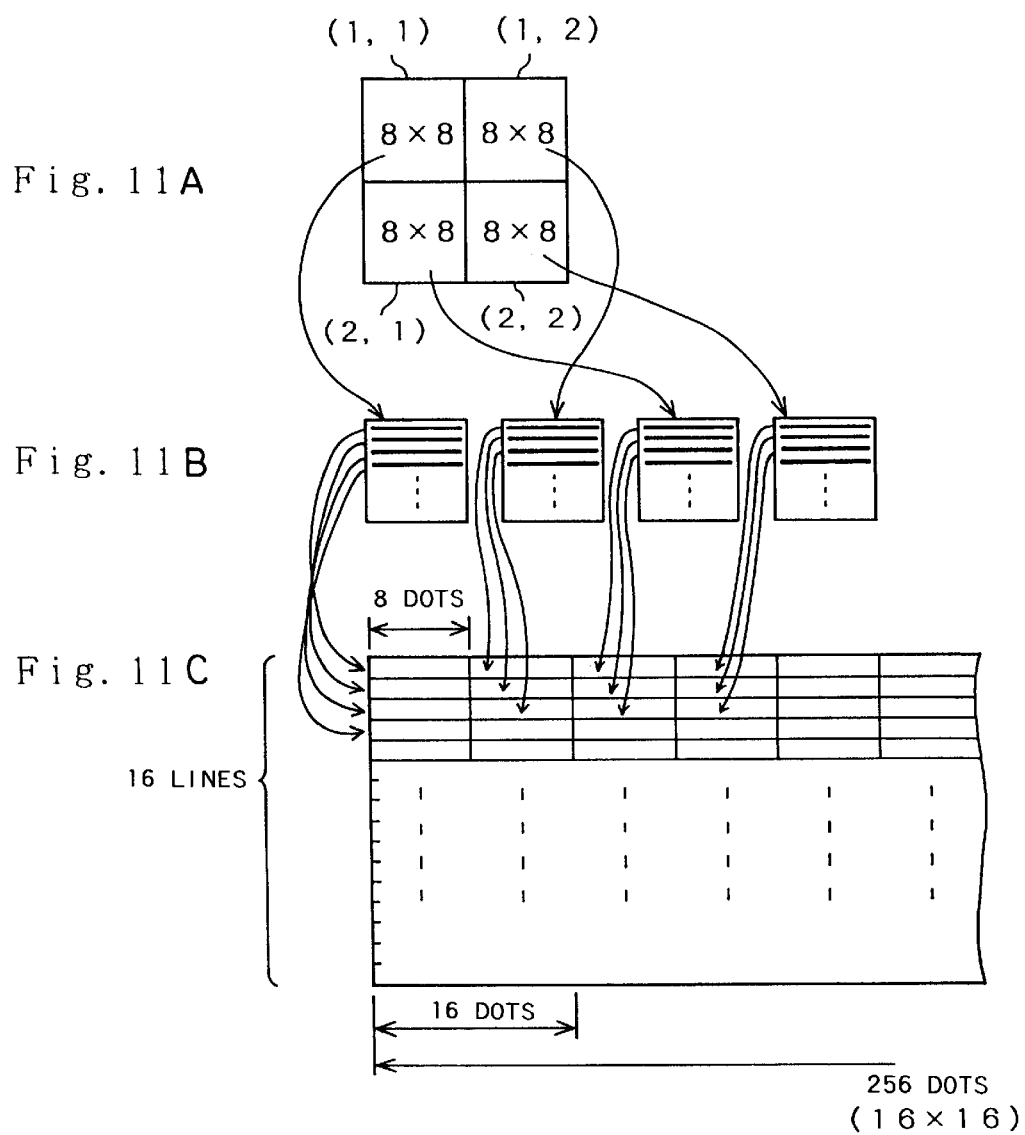
FIGS. 11A through 11C show the relationship between decoded block data and line data.

The decoding mode signal RMS is input into both the A address generator circuit 281 and the B address generator circuit 283, which change updating of the writing or reading address output from the write circuit or the read circuit thereof according to the type of decoded data. The reconstructed natural image data RND taken out of the CD-ROM 21, for example, has a form of 2×2 matrix of 8×8 pixel blocks as shown in FIG. 11A. These data once stored in the memory should be read out in serial along sixteen horizontal scanning lines according to a timing of display. The memory control block 47*b* receives data in the order of the left upper 8×8 pixel block (1,1), the right upper pixel block (1,2), the left lower pixel block (2,1), and the right lower pixel block (2,2) as shown in FIG. 11B. These data are then converted to arrays of sixteen scanning lines as shown in FIG. 11C.

The reconstructed run length video data RRD has a form of color numeral data and reconstructed in the unit of 16×16 (256 dots) area. This also requires different arrays for writing and reading. In order to realize such different writing and reading arrays, there may be a variety of combinations of the reading address and the writing address; that is, the discrete writing address and continuous reading address, the continuous writing address and discrete writing address, the discrete writing and reading addresses converted to a predetermined array for writing and reading. The writing circuit may generate two writing addresses for the reconstructed natural image data RND and for the reconstructed run length video data RRD to allow both data to be stored successively in the memory while the reading address is common for RND and RRD, or vice versa.

Figure 12:
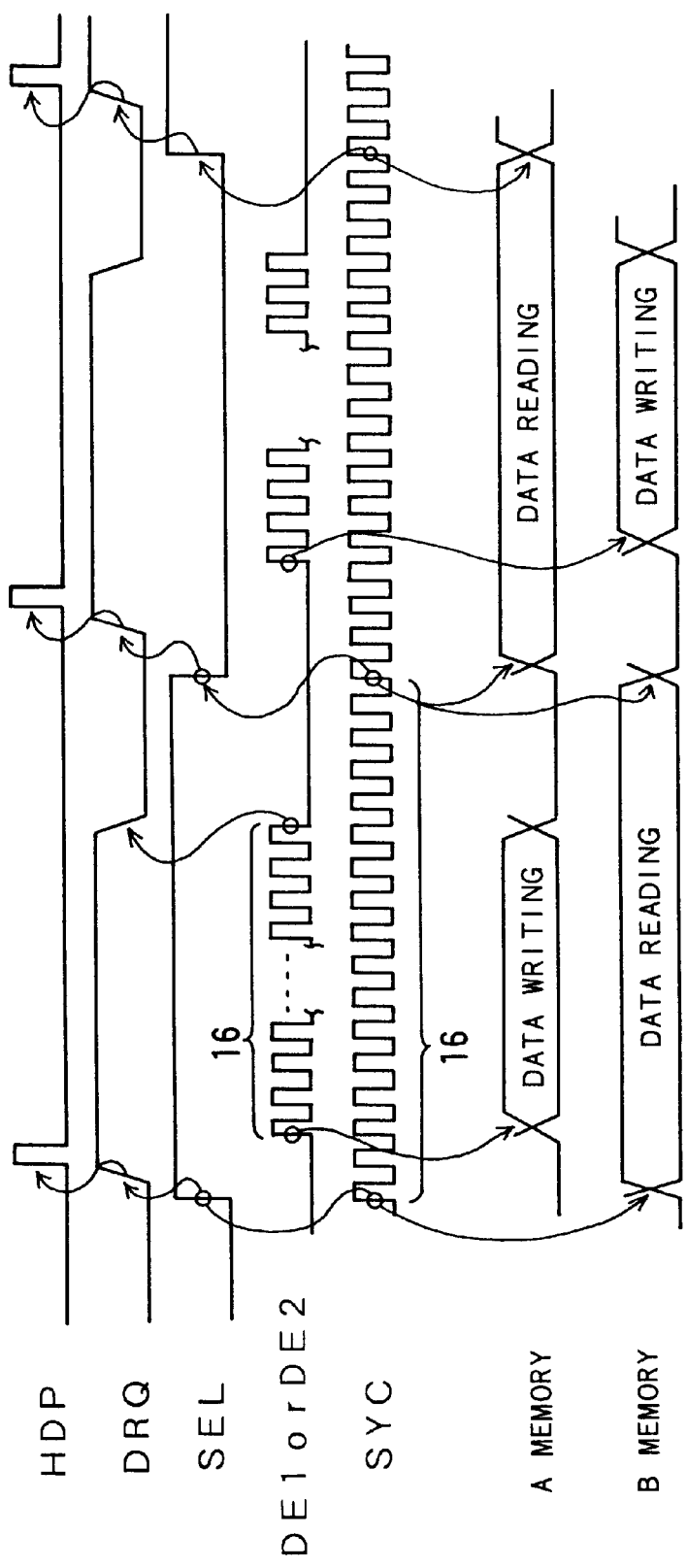
FIG. 12 is a timing chart showing operation of the memory control block 47b.

FIG. 12 is a timing chart showing operation of the memory control block 47*b*. The A memory 47*c* and the B memory 47*d* are switched alternately to the reading side or the writing side on output of every sixteen horizontal synchronizing signals SYC. While data are read synchronously with the horizontal synchronizing signals SYC, writing of data is executed on every output of the first effective signal DE1 or the second effective signal DE2 accompanied with decoding and reconstruction of video data. Under normal conditions, decoding of data for sixteen scanning lines is completed in a time period for outputting sixteen synchronizing signals SYC. Data decoding may, however, be not completed, for example, when there is an error in reading data out of the CD-ROM 21. The address coincidence detection circuit 288 shown in FIG. 10 detects occurrence of such abnormality. The address coincidence detection circuit 288 calculates a final address of data written in inversion of the selection signal SEL and sets the final address in an internal register. The address coincidence detection circuit 288 then monitors the writing address WADA output from the write circuit 281*a* of the A address generator circuit 281 and the writing address WADB output from the write circuit 283*a* of the B address generator circuit 283, and determines whether the writing address WADA or WADB coincides with the final address. When the writing address WADA or WADB coinciding with the final address is not output prior to inversion of the selection signal SEL, the address coincidence detection circuit 288 outputs a data ineffective signal DIS. The data ineffective signal DIS shows that data of next sixteen scanning lines output to the video encoder 50 are ineffective. In the embodiment, the video encoder unit 50 takes data of the next sixteen scanning lines as transparent data according to the data ineffective signal DIS. In other preferable structures, the video encoder unit 50 skips the data as ineffective data or takes the data as a signal for inactivating the video encoder unit 50.

The video data decompression system 47 thus constructed receives fifteen compression data or data structures shown in FIG. 5, each data structure consisting of data for sixteen scanning lines, for one screen page shown in FIG. 6, and reconstructs the screen page based on the compression data.

The video data decompression system 47 receives compression data of first sixteen scanning lines, detects the compression mode based on the header information of the compression data, and activates either the video data decompression unit 200 or the run length decoding block 260 for data decompression. Decoded data output from the video data decompression unit 200 or the run length decoding block 260 are successively stored in the A memory 47*c* according to the first effective signal DE1 or the second effective signal DE2.

The video data decompression system 47 then receives compression data for next sixteen lines, when the selection signal SEL is inverted to switch the memory for storing data to the B memory 47*d*. In the same manner as storing decoded data in the A memory 47*c*, decoded data are stored in the B memory 47*d*. At the same time, data of each scanning line is read synchronously with the horizontal synchronizing signal SYC out of the A memory 47*c* having the decoded data previously stored therein, and output to the video encoder unit 50. The video encoder unit 50 displays an image corresponding to data of each horizontal scanning line on the color television 28.

In reading video data synchronously with the horizontal synchronizing signal SYC, a delay corresponding to an interval of a horizontal retrace line may be required for the appropriate timing of display on the color television 28. Such a delay may be realized by adjusting a timing when the read circuit 281*b* of the A address generator circuit 281 or the read circuit 283*b* of the B address generator circuit 283 outputs the corresponding reading address. In another preferred structure, the video encoder unit 50 may be provided with a delay for adjusting the timing of display.

Under normal conditions, a process of decoding compression video data read out of the CD-ROM 21 via the video signal control unit 45 and storing decoded video data for sixteen scanning lines in one memory is faster than a process of reading the equivalent video data out of the other memory. When video data for sixteen scanning lines are read out of one memory in response to the horizontal synchronizing signal SYC, video data for next sixteen scanning lines have already been prepared in the other memory. The selection signal SEL inverted on every count of sixteen horizontal synchronizing signals SYC alternately switches the A memory 47*c* and the B memory 47*d* for storing video data in one memory and reading video data out of the other memory. This structure allows successive reading of video data in the unit of sixteen scanning lines.

Repetition of the above process reconstructs one screen page, and more specifically, repetition of 60 frames per second allows a moving picture to be reconstructed as a normal television. Under such an assumption that the resolution of the luminance signal Y is 8 bit or 1 byte and the resolution of the color difference signals U and V is 2 bit, that is, one fourth that of the signal, a memory required for reconstructing one screen page of 256×240 is 16×256×1.5 byte=6144 byte=49152 bit. In the structure of the embodiment, two 64 K bit-memories are thereby sufficient as the A memory 47c and the B memory 47d. A conventional system, on the other hand, requires one megabit-memory for reconstruction of the same size of the screen page (256× 240×1.5 byte=92160 byte=737280 bit).

In case that an interval of a horizontal retrace line is 85 dots and an interval of a vertical retrace line is 22.5 lines, a time period allowed for reading data of one dot or pixel is determined as 1/{60×(256+85)×(240+22.5)} second =186 nanosecond. Since the color difference signals U and V are sub-sampled as shown in FIG. 7B, four data, that is, luminance signals Y1 and Y2 and color difference signals U and V correspond to two byte. A time period required for reading one byte of data out of the memory is thus equal to 186×2/4=93 nanosecond. The structure of the embodiment does not require any specific high-speed memory, but a conventional dynamic RAM having standard capacity and operating speed is sufficiently used. The embodiment requires two sets of thirteen address lines and eight data lines for the A memory 47c and the B memory 47d. A circuit structure is, however, extremely simple since the A memory 47c and the B memory 47d can be identical. A conventional structure having a memory for one screen page, on the other hand, requires seventeen address lines and eight data lines. A total of fifty signal lines are required for separate writing screen and reading screen, accordingly.

The embodiment described above allows a moving picture of 256×240 pixels to be reconstructed only with a pair of 64K bit-memories for storing video data of sixteen scanning lines. Data compressed by a method according to the type of an image are stored in the CD-ROM 21, and decoded and reconstructed by a decoding process corresponding to the compression method. The compression method may be changed by every data area of sixteen scanning lines. This allows efficient compression and reconstruction of video data even when one screen page includes both a natural image and an animation image. Efficient data compression and reconstruction for different types of images existing in one screen page does not need a complicated process or any specific circuit for separate decoding and subsequent composition of the different types of images, thus making the whole system considerably simple. The resultant down-sizing and cost reduction are highly desirable for the video game machine 20.

In the embodiment, each screen page is divided into areas of sixteen scanning lines as shown in FIG. 6. When consecutive numbers 1 through 240 are assigned to the horizontal synchronizing signals SYC, each area starts from a fixed number, that is, 1, 17, 33, . . . , 1+16×n (n represents a whole number between zero and fourteen). The area may, however, start from another number of horizontal synchronizing signal SYC. Such setting is given from the MPU 40 via the controller 47e of the video data decompression system 47 in the embodiment. Based on an instruction from the controller 47e, the compression data input block 47a shifts a timing for inputting compression data by one or a plurality of horizontal synchronizing signals SYC. For example, a shift of the timing by five synchronizing signals SYC sets the starting position of each area equal to 6, 22, . . . , (1+5)+16×n. When the timing is shifted by a number m (m=−15 to 15) of synchronizing signals SYC, a starting position BS of each area is expressed in general as:

BS=(1+m)+16×n.

An image of sixteen scanning lines may start from any desirable position of the corresponding area through an instruction of the shift m via the controller 47e. Such an instruction of shifting the timing is given for each block.

This allows the whole image to scroll up and down arbitrarily. When the timing of data reading is advanced by one line for every block, the whole image moves up by one horizontal scanning line. Advance of another line at the next timing moves the whole image up by another scanning line. This procedure is repeated until the image moves up by fifteen horizontal scanning lines. In a next step, the timing of reading a block of video data is shifted by all the sixteen lines. Namely, the timing of data reading is returned to the initial state, the shift m=0. The timing is then advanced again by one line, and the above procedure is repeated. This allows the whole image to scroll up smoothly. The downward scroll of the whole image is also implemented in a similar manner. A shift of the timing for a specific part of an image allows only the specific part to scroll up or down. A combination of upward scroll and downward scroll or scroll at various speeds by varying the shift of the timing may be realized in one screen page. This structure of the embodiment does not require video data of the whole scrolling image to be stored in the CD-ROM 21, thus increasing substantially effective data stored in the ROM.

Display of an image of sixteen scanning lines may be interrupted according to the process below. Since data are decoded for every sixteen scanning lines, data stored in the A memory 47c or the B memory 47d correspond to all the sixteen scanning lines. The video signal control unit 45 monitors the display and outputs an instruction of initialization to the controller 47e at an appropriate timing. The controller 47e receives the instruction of initialization, and outputs a reset signal IRT into the video data decompression system 47 synchronously with a next horizontal synchronizing signal SYC to initialize the whole video game machine 20.

Figure 13:
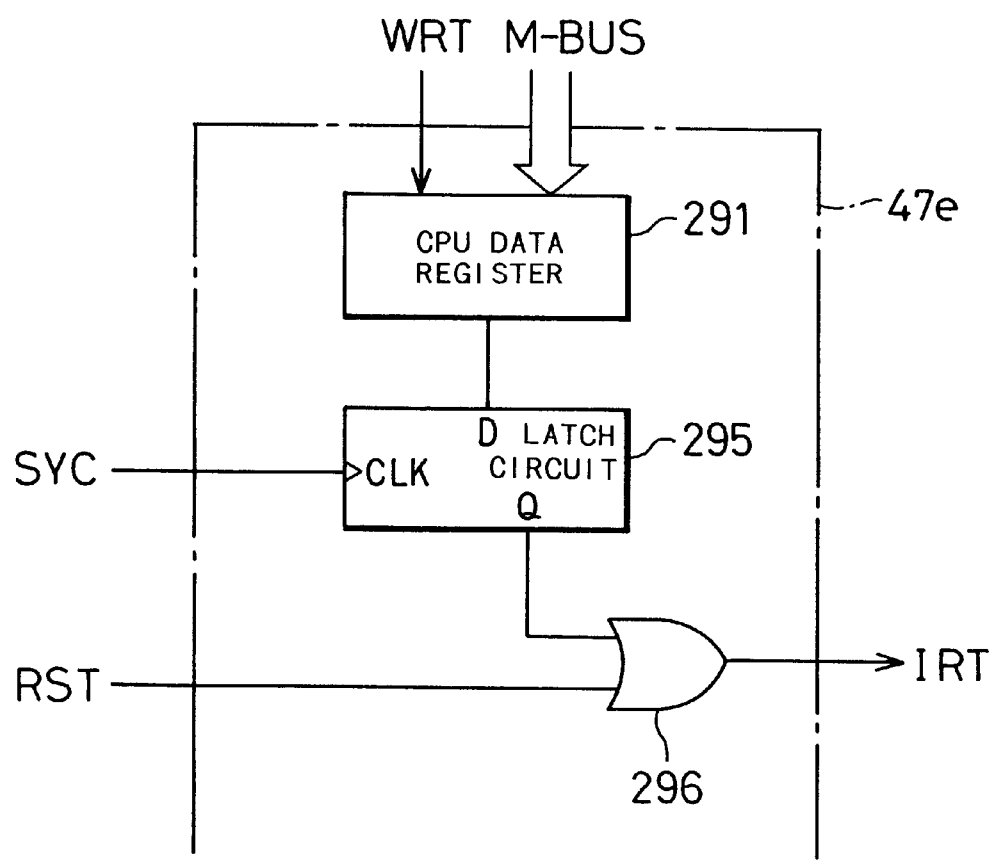
FIG. 13 is a block diagram illustrating a typical structure of the controller 47e.

FIG. 13 is a block diagram showing an internal structure of the controller 47e executing the above process. The controller 47e includes a CPU data register 291, a latch circuit 295, and an OR gate 296. The register 291 is connected to the M-BUS of the video signal control unit 45 and receives a writing control signal WRT. The video signal control unit 45 writes an instruction of initialization in the register 291, which then sets an output thereof at a high level. The latch circuit 295 receives the output from the register 291 and sets an output Q thereof at a high level at a timing of input of a next horizontal synchronizing signal SYC, when the reset signal IRT is output via the OR gate 296. A reset signal RST of the whole video game unit 20 is connected to another input of the two-input OR gate 296.

The video signal control unit 45 monitors the current state of display and writes an instruction of initialization in the controller 47e, for example, at a time of display of the eighth horizontal scanning line in a specific display area. The controller 47e outputs the reset signal IRT into the video data decompression system 47 at a timing of input of a next horizontal synchronizing signal SYC, so as to interrupt display of the ninth and the subsequent horizontal scanning lines. In this embodiment, the reset signal IRT is output to all the blocks and circuits in the video data decompression system 47, which initializes decoding and storing data. For resume of the display, specific data for canceling the reset signal IRT should be written in the CPU data register 291 at least sixteen lines prior to a desirable display resuming position. The latch circuit 295 latches the specific data synchronously with an input of a next horizontal synchronizing signal SYC and cancels the reset signal IRT. Cancellation of the reset signal IRT returns the video data decompression system 47 to normal operating conditions to start decoding and storing of an image to be displayed. When the selection signal SEL is inverted after elapse of a time period corresponding to sixteen horizontal synchronizing signals SYC, video data stored are read by every horizontal synchronizing signal SYC out of the corresponding memory and displayed under the normal conditions.

As described above, the system of the embodiment can give an instruction of initialization at an arbitrary position in a specific area of sixteen scanning lines to interrupt display of video data immediately after the arbitrary position, and resume the display from a desirable position except the specific area and a next area. The system of the embodiment implements a requirement of increasing or decreasing a number of line data to be displayed. This function is generally called software reset. The software reset function resets all the circuits and blocks in the video data decompression system 47 in the structure of the embodiment. Another preferable structure includes a gate placed in the signal path DC for outputting video data from the A switcher circuit 282 and the B switcher circuit 284 to the video encoder unit 50, where the reset signal IRT masks the gate. In this alternative structure, a variety of processes, such as decoding compression data, storing decoded data in a memory, and reading decoded data out of the memory, are performed normally even during interruption of display. This allows display of an image to be resumed at any desirable position and timing.

Figure 14:
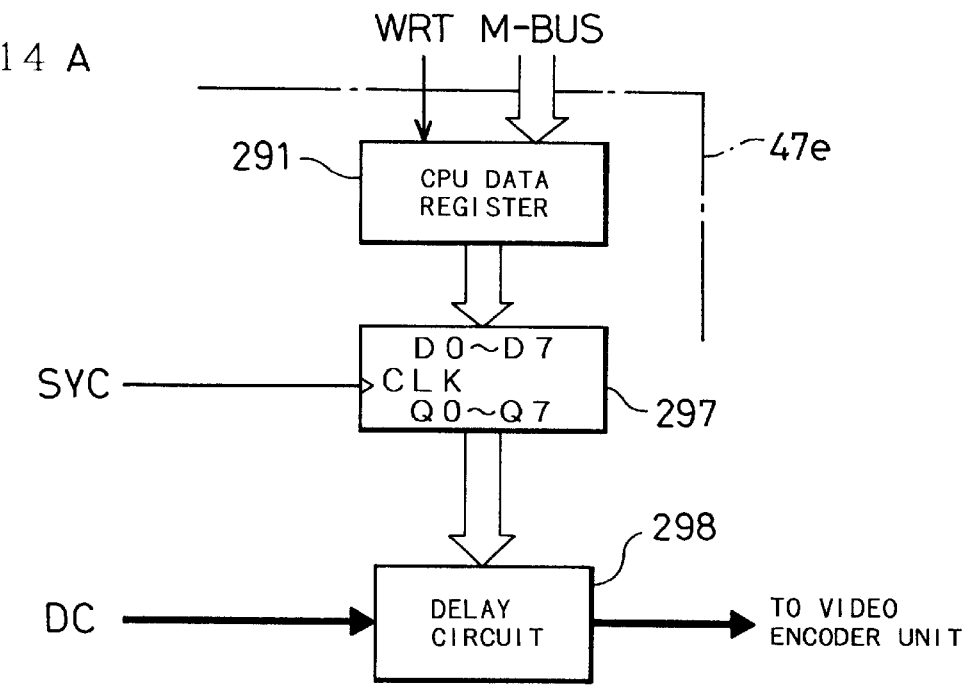
FIG. 14A is a block diagram showing another structure of the controller 47e.
FIG. 14B shows a function of the structure.
Figure 14:
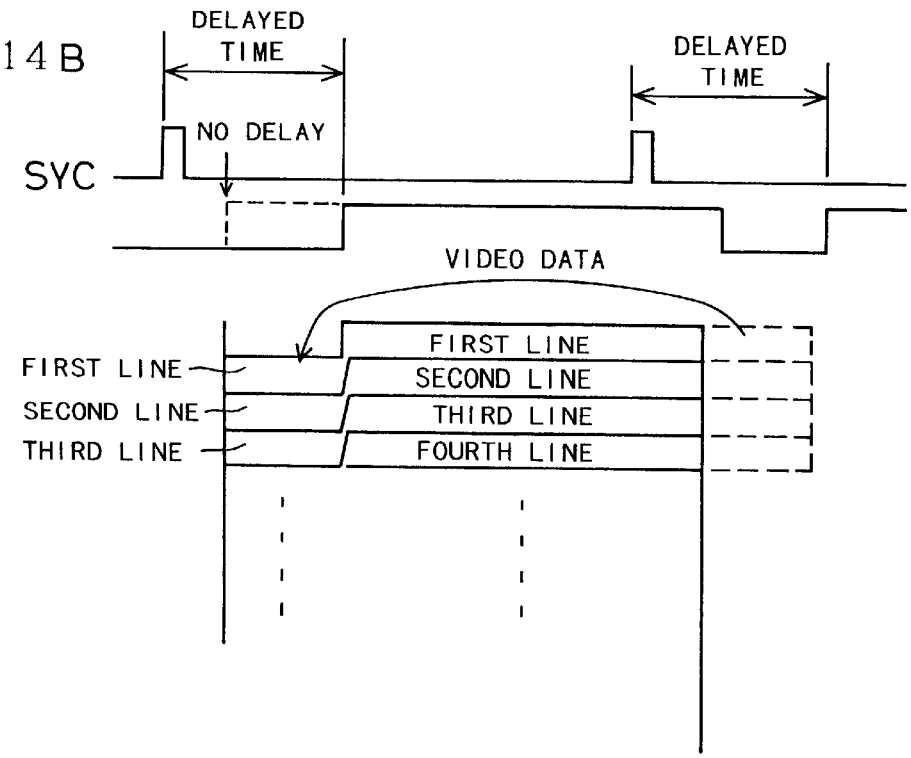

The CPU data register 291 of the controller 47e is not exclusively used for the software reset function but also used for control of the timing of decoding compression data and the timing of reading video data previously stored in the A memory 47c or the B memory 47d. Setting the timing of data reading in a horizontal direction allows an image to scroll in the horizontal direction. FIG. 14A is a block diagram showing a circuit structure allowing the horizontal scroll. This alternative structure includes a delay circuit 298 placed in the signal path DC for outputting video data read out of the memory to the video encoder unit 50. A delay time of the circuit 298 is determined according to an output of an 8-bit latch 297 for latching outputs of the CPU data register 291. Since video data are read out of the memory synchronously with the horizontal synchronizing signal SYC, delay of data reading delays a start timing of display of the video data. As shown in FIG. 14B, the starting position for displaying video data of a first scanning line is shifted in the horizontal direction, and a last part of the video data is displayed in the begging of a second scanning line. This scrolls the whole image rightward.

Figure 15:
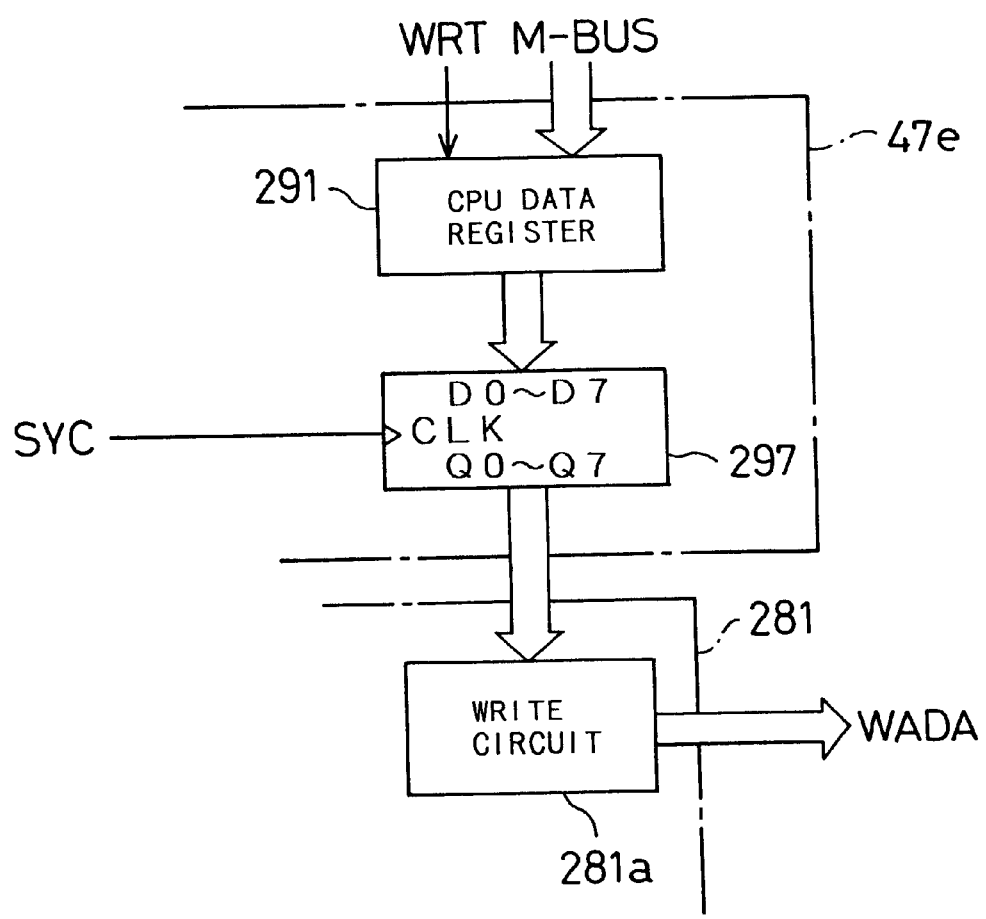
FIG. 15 is a block diagram showing still another structure of the controller 47e.

The structure of FIG. 14A can delay reading of video data corresponding to only one scanning line to scroll the image only rightward. Another structure shown in FIG. 15, however, allows the image to scroll both rightward and leftward. In this structure, the CPU data register 291 outputs an instruction of shifting a timing of data reading via the 8-bit latch 297 to the read circuit 281b of the A address generator circuit 281 and the read circuit 283b of the B address generator circuit 283. Each read circuit 281b or 283b receives the instruction and shifts the timing of reading video data out of the A memory 47c or the B memory 47d forward or backward with respect to the horizontal synchronizing signals SYC. There is a certain time interval between a rise of the horizontal synchronizing signal SYC and display of video data. Reading video data immediately after input of the horizontal synchronizing signal SYC thereby allows the image to scroll leftward by a certain amount. Off-set of specific head addresses for reading video data in each read circuit 281b or 283b allows the starting position of an image display to be varied arbitrarily, and scrolls the image leftward and rightward by every area of the sixteen scanning lines.

Figure 16:
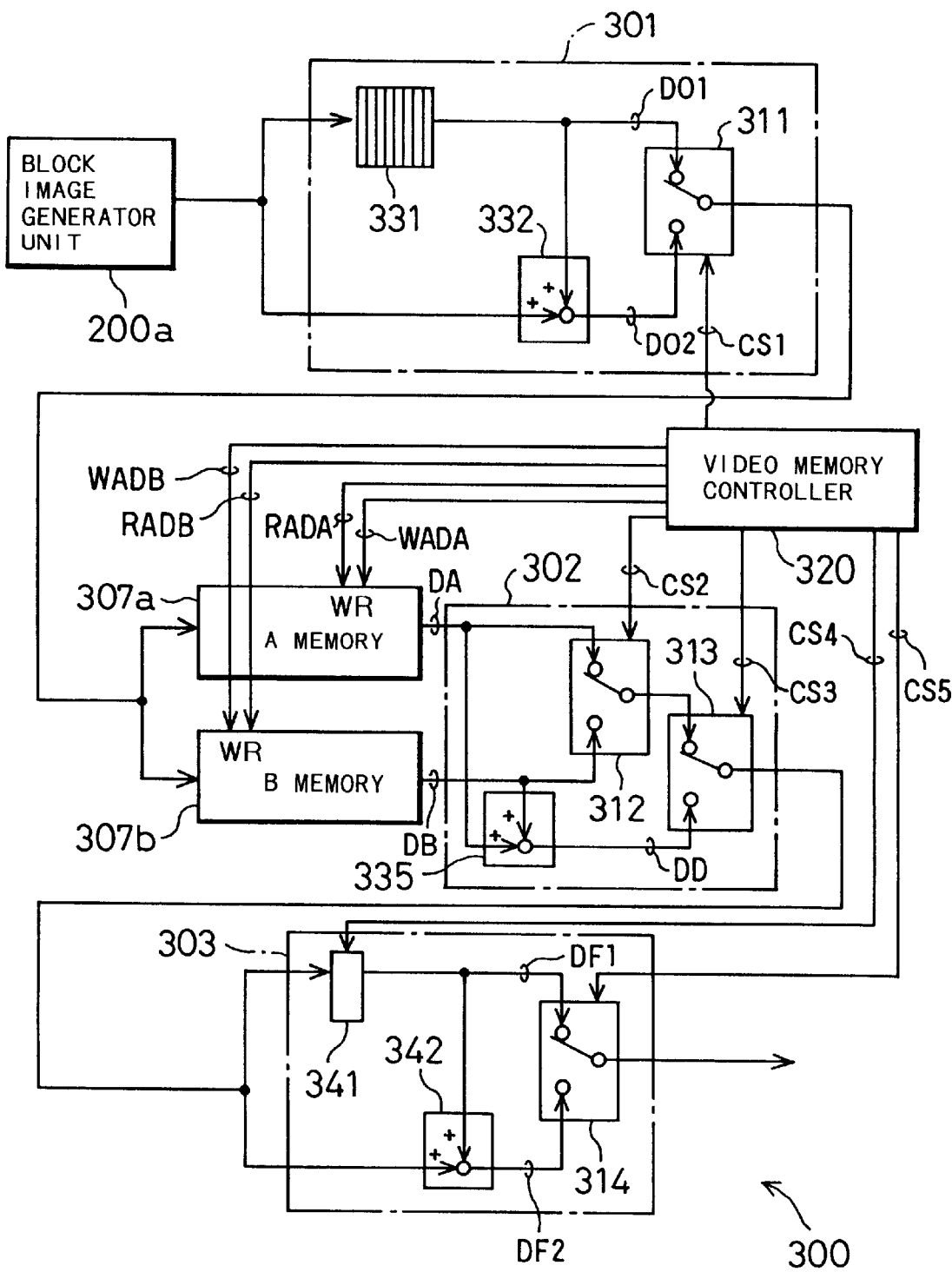
FIG. 16 is a block diagram schematically showing a structure of an interblock distortion removal filter 300.

An interblock distortion removal filter 300 is described as a second embodiment according to the invention with the accompanying drawings. FIG. 16 is a block diagram schematically illustrating a structure of the interblock distortion removal filter 300. The interblock distortion removal filter 300 may be incorporated in the video data decompression system 47 of the first embodiment as described later. An independent structure of the filter 300 is, however, described here for clarity of explanation. The interblock distortion removal filter 300 is placed after a block image generator unit 200a for decoding blocks of video data compressed by orthogonal transform, which corresponds to the video data decompression unit 200 of the first embodiment.

The interblock distortion removal filter 300 includes first, second, and third filters 301, 302, and 303, an A memory 307a and a B memory 307b for storing decoded video data for every sixteen scanning lines, and a video memory controller 320 for controlling the first through the third filters 301, 302, 303, the A memory 307a, and the B memory 307b. Outputs of the third filter 303, that is, outputs of the interblock distortion removal filter 300, are connected to a video circuit (not shown) for converting digital data to analog data and displaying the analog data on a CRT or another equivalent device. The video circuit corresponds to the video encoder unit 50 and the NTSC converter 60 of the first embodiment.

All the first through the third filters 301, 302, and 303 store adjacent video data and calculate a weighted average of target video data for a filtering process and the adjacent video data. The first filter 301 includes an 8-bit serial-serial shift register 331, a first computing element 332 for calculating a weighted average, and a first switcher circuit 311. The second filter 302 includes a second computing element 335 for calculating a weighted average, and second and third switcher circuits 312, 313. The third filter 303 includes a one-bit latch 341, a third computing element 342 for calculating a weighted average, and a fourth switcher circuit 314.

The shift register 331 of the first filter 301 receives video data of every dot or pixel, output from the block image generator unit 200a, synchronously with a dot clock signal DCL and outputs the video data after a delay of eight dots. The first computing element 332 receives an output of the shift register 331 and video data directly from the block image generator unit 200a, calculates a weighted average of the video data and the output of the shift register 331, and continuously outputs the results of the weighted average. An output of the shift register 331 and that of the first computing element 332 are respectively connected to contacts of the first switcher circuit 311. One of the outputs selected in response to a first control signal CS1 from the video memory controller 320 is transferred to the A memory 307a and the B memory 307b.

Video data output from the block image generator unit 200a pass through the first filter 301 and are stored in the order of scanning lines in either the A memory 307a or the B memory 307b. Switching the two memories and varying an array of video data are implemented in the same manner as the first embodiment. The video memory controller 320 outputs writing addresses WADA, WADB and reading addresses RADA, RADB in the same manner as the first embodiment. Video data DA and DB along the scanning lines are read out of the A memory 307a and the B memory 307b and input into the second filter 302, where the second computing element 335 determines a weighted average of the video data DA and DB and outputs the weighted average as average video data DD.

The video data DA and DB are input into the second switcher circuit 312, which selects either the video data DA or DB according to a second control signal CS2 output from the video memory controller 320. The third switcher circuit 313 receives the average video data DD and either the video data DA or DB thus selected, and selects either of the input video data according to a third control signal CS3 output from the video memory controller 320. The video data thus selected are output to the third filter 303.

The one-bit latch 341 of the third filter 303 stores video data corresponding to a previous dot in response to activation of a fourth control signal CS4. The third computing element 342 calculates a weighted average of an output of the latch 341 and video data of a current dot. Outputs of the one-bit latch 341 and the third computing element 342 are input into the fourth selector circuit 314, which selects one of the outputs according to a fifth control signal CS5 from the video memory controller 320. An output of the fourth switcher circuit 314 is transferred as final video data to the subsequent video circuit.

Figure 17:
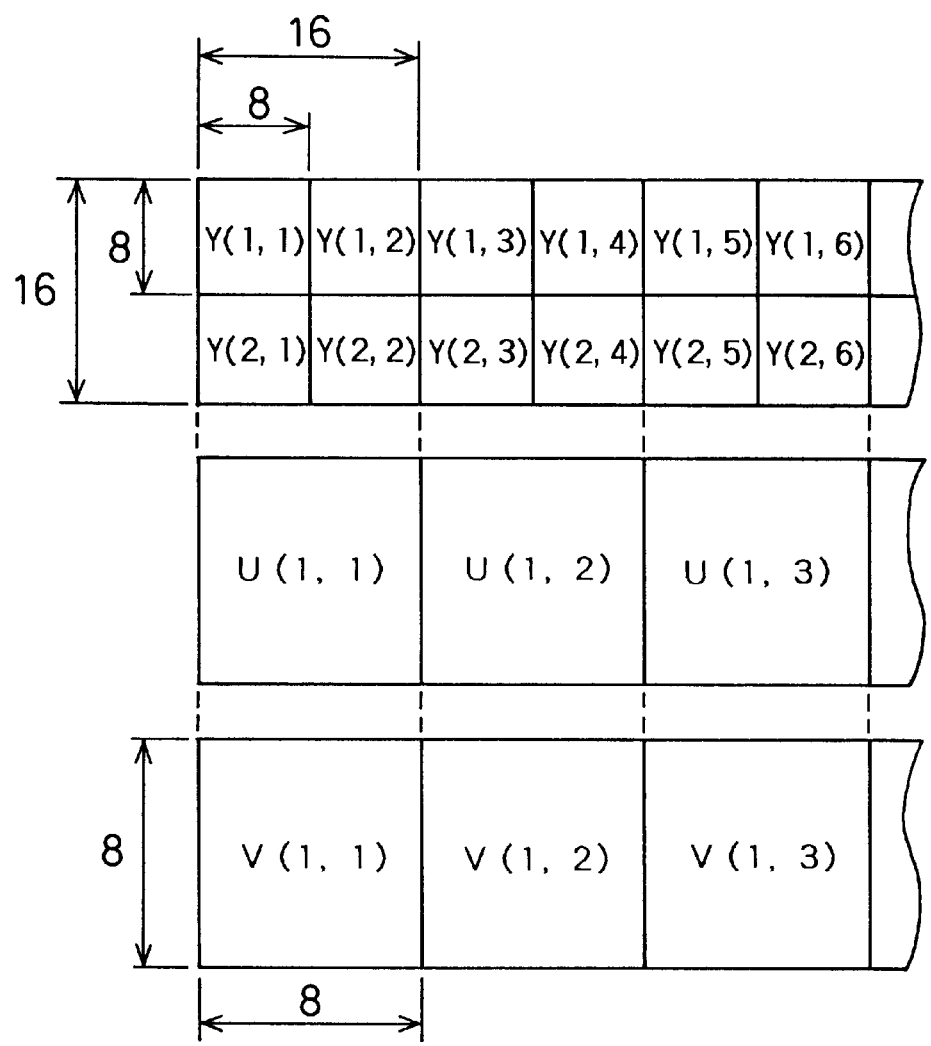
FIG. 17 shows the relationship between Y, U, and V signals.
Figure 18:
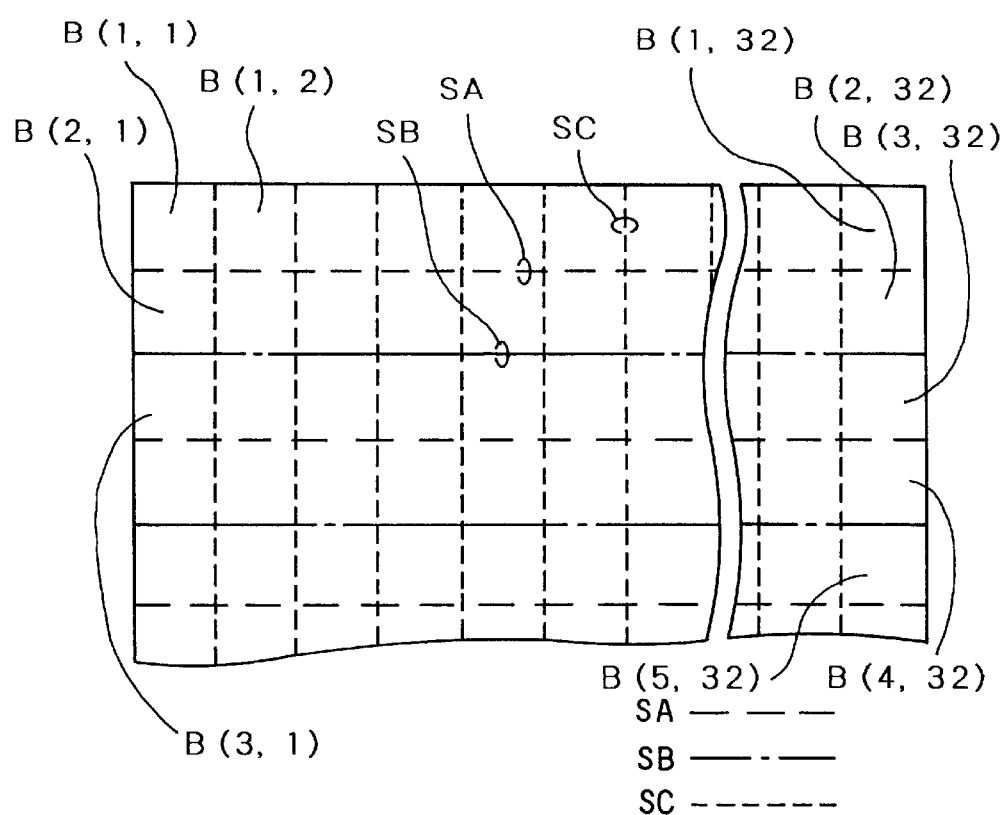
FIG. 18 shows boundaries where interblock distortions are generated.

The interblock distortion removal filter 300 shown in FIG. 16 functions to remove an interblock distortion generated as below. FIG. 17 shows data coded and compressed by the orthogonal transform. Luminance signals Y are coded in the unit of 8×8 pixel blocks, and four 8×8 blocks represent luminance information of a 16×16 -dot image. Color difference signals U and V are sub-sampled to form data of 8×8 pixel blocks. The block image generator unit 200a receives these compression data of the Y, U, and V signals and decodes the compression data to video data shown in FIG. 18, which are alternately stored in the A memory 307a and the B memory 307b. Video data stored in the A memory 307a or the B memory 307b correspond to sixteen scanning lines. Sixty four 8×8 -pixel blocks B(1,1) through B(2,32) correspond to a first data area of the first sixteen scanning lines. Pixel blocks B(3,1) through B(4,32) correspond to a second data area of the next sixteen scanning lines. In the same manner, every sixty four pixel blocks form each data area of sixteen scanning lines. A last data area of the last sixteen scanning lines consists of pixel blocks B(29,1) through B(30,32). A total of fifteen data areas constitute a screen page of 256 pixels by 240 lines.

Figure 19A:
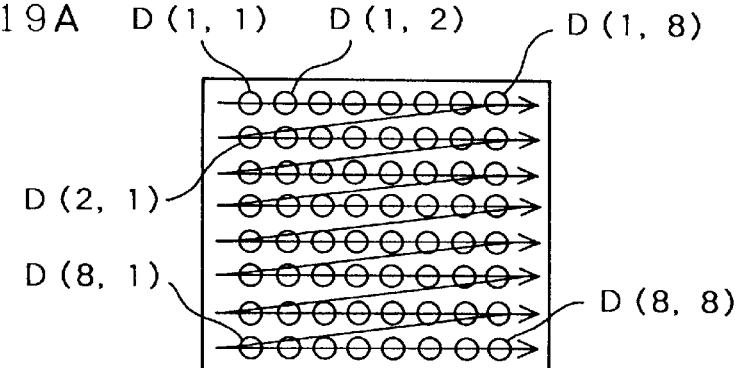
FIGS. 19A through 19C show structure of decoded video data.
Figure 19B:
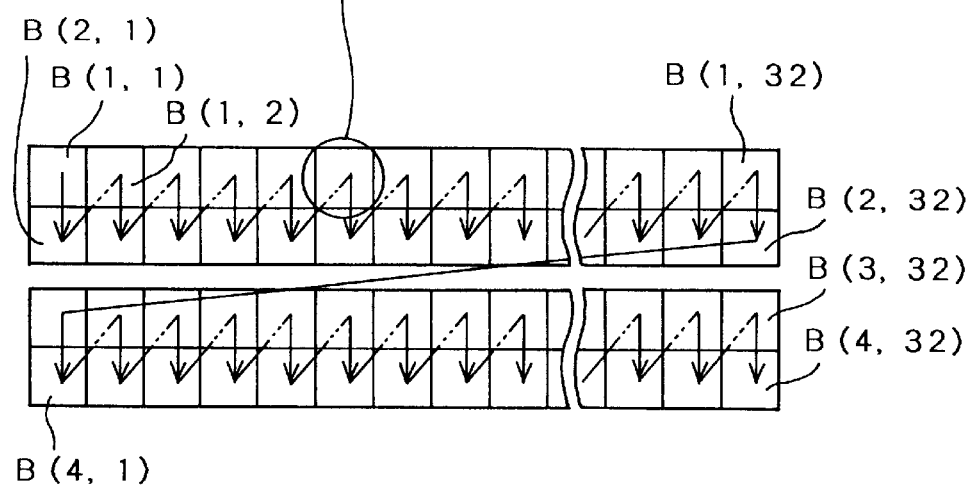
Figure 19C:
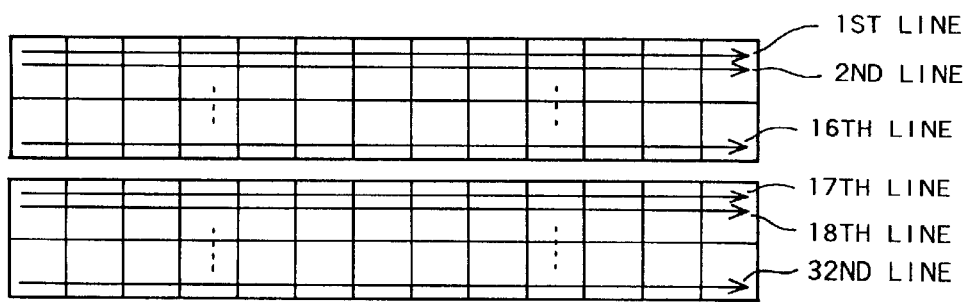

FIGS. 19A through 19C show a detailed structure of decoded video data. Sixty-four dot data from D(1,1) to D(8,8) are arranged inside of each 8×8 pixel block obtained through decoding. In each pixel block, the dot data are read in a horizontal scanning direction as shown in FIG. 19A; that is, in the order of D(1,1), D(1,2) . . . , D(1,8). Each data area of sixteen scanning lines consists of sixteen pixel blocks arranged in the horizontal scanning direction by two pixel blocks arranged in a direction perpendicular to the horizontal scanning direction as clearly seen in FIG. 19B. A sequence of the pixel blocks is B(1,1), B(2,1), B(1,2), B(2,2), . . . , B(1,32), B(2,32) as shown by the arrow in FIG. 19B. This sequence is different from a J-PEG algorithm, an international standard for colored still picture coding. Processing of pixel blocks having a sequence corresponding to the J-PEG algorithm will be described later. Decoded video data have the array shown in FIG. 19B immediately after the decoding process, but have an array along the scanning lines as shown in FIG. 19C after being stored in the A memory 307a or the B memory 307b.

In the embodiment, information corresponding to a high-frequency data component is lost during the process of data compression and coding by discrete cosine transform. A complete original image is accordingly not reconstructed by decoding. There is a distortion between adjacent blocks due to information lost by the coding, which is generally referred to as interblock distortion. As clearly seen in FIG. 18, three different types of interblock distortions are found on boundaries SA, SB, and SC in the embodiment:

Boundary SA: between blocks B(2m−1,n) and B(2m,n)

Boundary SB: between blocks B(2m,n) and B(2m+1, n)

Boundary SC: between blocks B(p,n) and B(p,n+1)

where variables m, n, and p respectively range from 1 to 15, 1 to 32, and 1 to 30.

Removal of the interblock distortion with the interblock distortion removal filter 300 shown in FIG. 16 is described for each of the boundaries SA, SB, and SC. The first filter 301 having the shift register 331 outputs video data DO 1 with a delay of eight dots. The first computing element 332 calculates a weighted average of the 8-dot delayed video data DO1 and current video data, and outputs the weighted average as resultant data DO2. In the following explanation, a boundary SA between blocks B(1,1) and B(2,1) is taken as an example. Referring to FIG. 20, the video memory controller 320 activates the first control signal CS1 at a timing of outputting first eight dot data D(1,1) through D(1,8) in the second block B(2,1) to switch the first switcher circuit 311. During the time period while the first control signal CS1 is active, the first computing element 332 calculates and outputs data DO2 of a weighted average of previous eight dot data, that is, last eight dot data D(8,1) through D(8,8) in the first block B(1,1) read out of the shift register 331 and the current eight dot data, that is, the first eight dot data D(1,1) through D(1,8) in the second block B(2,1). The first filter 301 accordingly outputs the weighted average video data DO2 during that period. In this manner, the first filter 301 effectively eliminates interblock distortions on the boundary SA of two adjacent 8×8 pixel blocks before writing video data of 16 lines in the memory. The same processing is implemented at any boundary SA between blocks B(2m-1,n) and B(2m,n). The first control signal CS1 output from the video memory controller 320 counts reference clock pulses CLK corresponding to pixels, and becomes high during eight clock pulses from the beginning of video data in each block while being maintained at a low level during the other 56 clock pulses.

Figure 21:
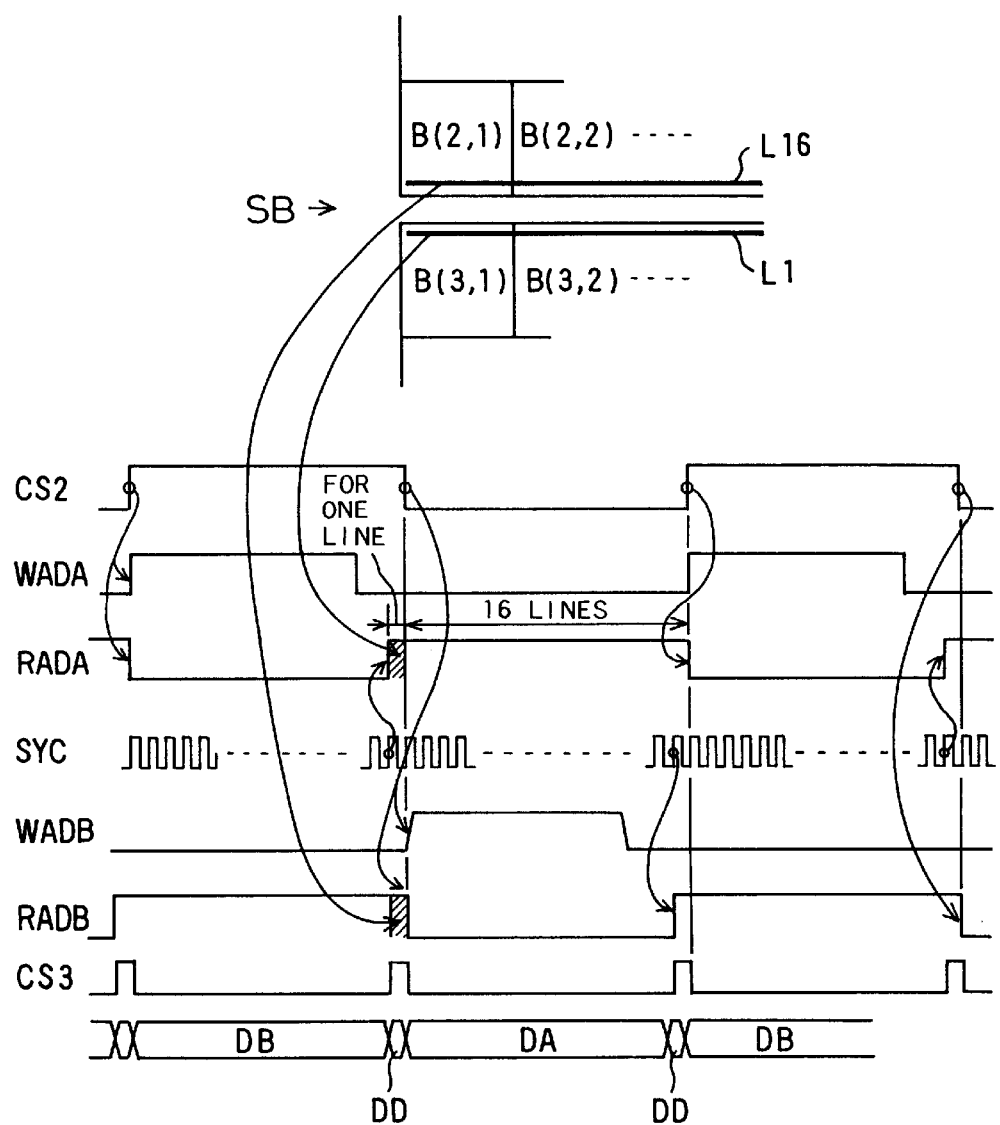
FIG. 21 shows a process of removing an interblock distortion on the boundary SB.

FIG. 21 shows function of the second filter 302. The first filter 301 can eliminate interblock distortions generated in a direction perpendicular to the horizontal scanning direction in the sixteen-line data area, but can not remove interblock distortions on the boundary SB between adjacent sixteen-line data areas. The second filter 302 works to remove the interblock distortions of the latter. The video memory controller 320 outputs the second control signal CS2, which is inverted on every output of sixteen horizontal synchronizing signals SYC. The second control signal CS2 is equivalent to the selection signal SEL in the first embodiment.

The second control signal CS2 switches the second switcher circuit 312 of the second filter 302 to make effective an output of either the A memory 307a or the B memory 307b which video data are currently read out of. The video memory controller 302 outputs a writing address WADA to the A memory 307a and a reading address RADB to the B memory 307b, or alternatively a reading address RADA to the A memory 307a and a writing address WADB to the B memory, synchronously with the second control signal CS2. The writing address and the reading address are alternately output to the A memory 307a and the B memory 307b according to the second control signal CS2.

For the convenience of explanation, it is assumed that video data of blocks B(2,1), B(2,2), ..., are currently read out as shown in FIG. 21. The writing address WADA or WADB is updated on every preparation of video data. Writing of next sixteen line data is completed significantly before completion of reading current sixteen line data, that is, output of sixteen horizontal synchronizing signals SYC. The reading address RADA or RADB is updated to read data from the beginning of a next line on every output of a horizontal synchronizing signal SYC.

The reading address RADB is output to the B memory 307b corresponding to video data of each new line on every output of a horizontal synchronizing signal SYC, and video data of the new line are successively read out of the B memory 307b. When the sixteenth horizontal synchronizing signal SYC is output, video data of a last line L16 in a certain sixteen-line data area are read out of the B memory 307b. The video memory controller 320 generates the third control signal CS3 prior to the second control signal CS2 and outputs the reading address RADA corresponding to an address of a first line L1 of a next sixteen-line data area to the A memory 307a. As a result, video data DA of the first line L1 in the next sixteen-line data area are read out of the A memory 307a while video data DB of the sixteenth line L16 in the certain sixteen-line data area are read out of the B memory 307b.

The second computing element 335 of the second filter 302 calculates and outputs a weighted average of the video data DB and DA as resultant data DD. Since the third control signal CS3 switches the third switcher circuit 313 to make effective an output of the second computing element 335, the average video data DD is output from the second filter 302. In this manner, the second filter 302 effectively eliminates interblock distortions on the boundary SB between adjacent sixteen-line data areas.

Figure 22:
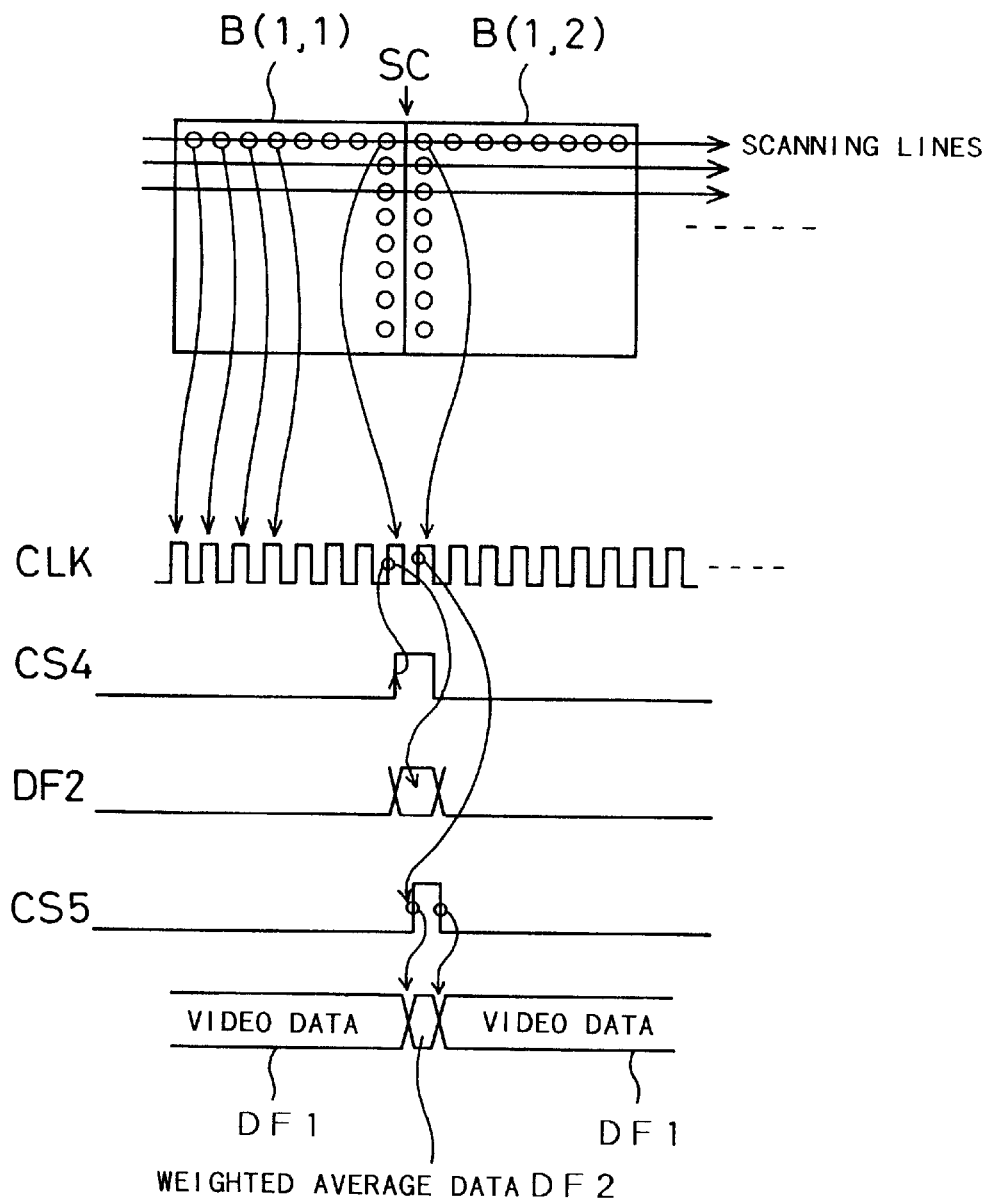
FIG. 22 shows a process of removing an interblock distortion on the boundary SC.

FIG. 22 shows function of the third filter 303. The video memory control 320 outputs to the third filter 303 the fourth control signal CS4, which becomes active on every eighth dot in each line as shown in FIG. 22. The latch 341 in the third filter 303 receives the fourth control signal CS4 and stores video data corresponding to the eighth dot. When data of a next dot, that is, data of a first dot of a next block, is read out, the third computing element 342 calculates a weighted average of the video data of the previous dot stored in the latch 341 and video data of the current dot, and outputs the weighted average as resultant data DF2. In the mean while, the video memory controller 320 generates the fifth control signal CS5 to switch the fourth switcher circuit 314 to make the output DF2 of the third computing element 342 effective. The third filter 303 accordingly outputs the weighted average data DF2 given from the third computing element 342 for video data corresponding to the first dot of each block B, while outputting video data DF1 given from the second filter 302 via the latch 341 for video data corresponding to the other seven dots of the block B. In this manner, the third filter 303 effectively removes interblock distortions on the boundary SC between blocks adjacent to each other along the scanning lines.

In the embodiment, the third filter 303 has the latch 341 for latching data on every eighth dot in response to the fourth control signal CS4. The third filter 303 may, however, have a one-bit shift register, like the shift register 331 of the first filter 301, to output video data with one dot delay. The third computing element 342 then calculates a weighted average of video data of the previous dot and video data of the current dot. This alternative structure does not require the fourth control signal CS4.

The interblock distortion removal filter 300 thus constructed effectively eliminates all interblock distortions generated on boundaries of any adjacent blocks while compression data previously coded by DCT are decoded. The interblock distortion removal filter 300 does not need any specific line buffer but uses the A memory 307a and the B memory 307b for removal of interblock distortions on the boundary SB between adjacent sixteen-line data areas. The filter 300 eliminates interblock distortions in each sixteen-line data area before storing data in the A memory 307a or the B memory 307b, and accordingly only an eight-bit shift register is sufficiently used as a memory.

Figure 23:
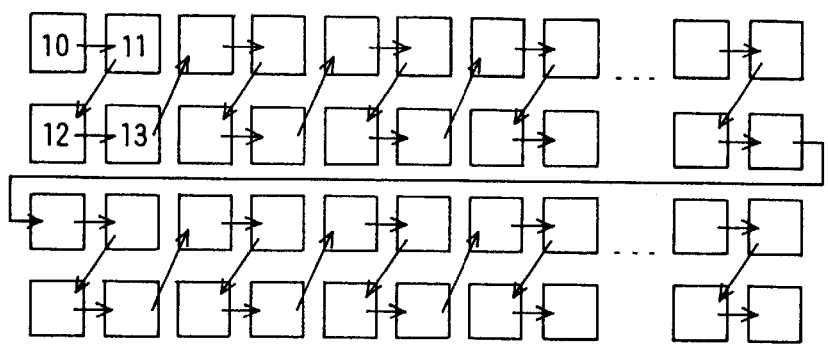
FIG. 23 shows a basic sequence according to the J-PEG algorithm.
Figure 24:
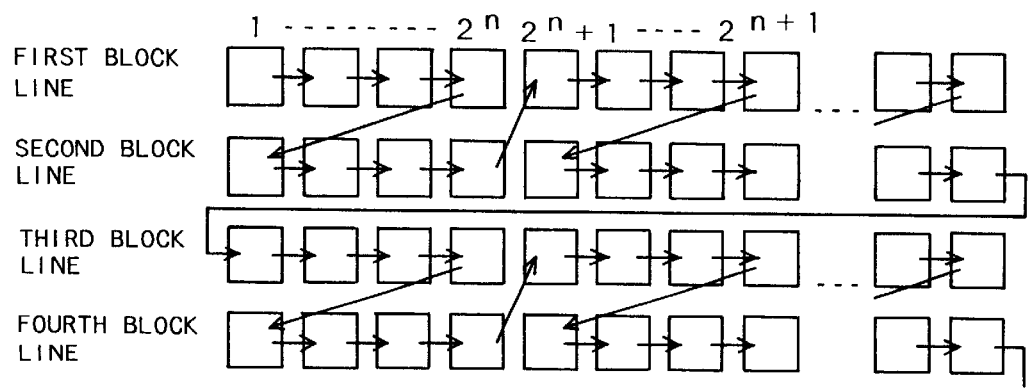
FIG. 24 shows an extended sequence according to the J-PEG algorithm.

In the embodiment, a sequence of blocks is B(1,1), B(2,1), B(1,2), B(2,2), ..., B(1,32), B(2,32) as shown by the arrow of FIG. 19B. This sequence allows the first filter 301 having only the 8-bit shift register 331 as a memory for storing data to effectively eliminate interblock distortions on the boundary SA. The principle of the invention is, however, applicable to other block sequences. FIG. 23 shows a basic sequence of blocks according to the J-PEG algorithm used an international standard for data compression by DCT, and FIG. 24 shows an extended sequence thereof. In the basic sequence, blocks are arranged in the order of B(l, 1), B(1,2), B(2,1), B(2,2), B(1,3), ... as shown by the arrow in FIG. 23.

In the extended sequence, on the other hand, blocks are arranged in the order of B(1,1), B(1,2), B(1,3), ..., B(1,$2^n$), B(2,1), B(2,2), ..., B($2,2^n$), B($1,2^n$+1), B($1,2^n$+2), B($1,2^{(n+1)}$), ... as shown by the arrow in FIG. 24. Blocks are divided into groups by the number $2^n$ along the scanning lines (n represents a natural number), and a certain number of the groups are aligned along the scanning lines. The basic sequence corresponds to the natural number n=1.

Figure 25:
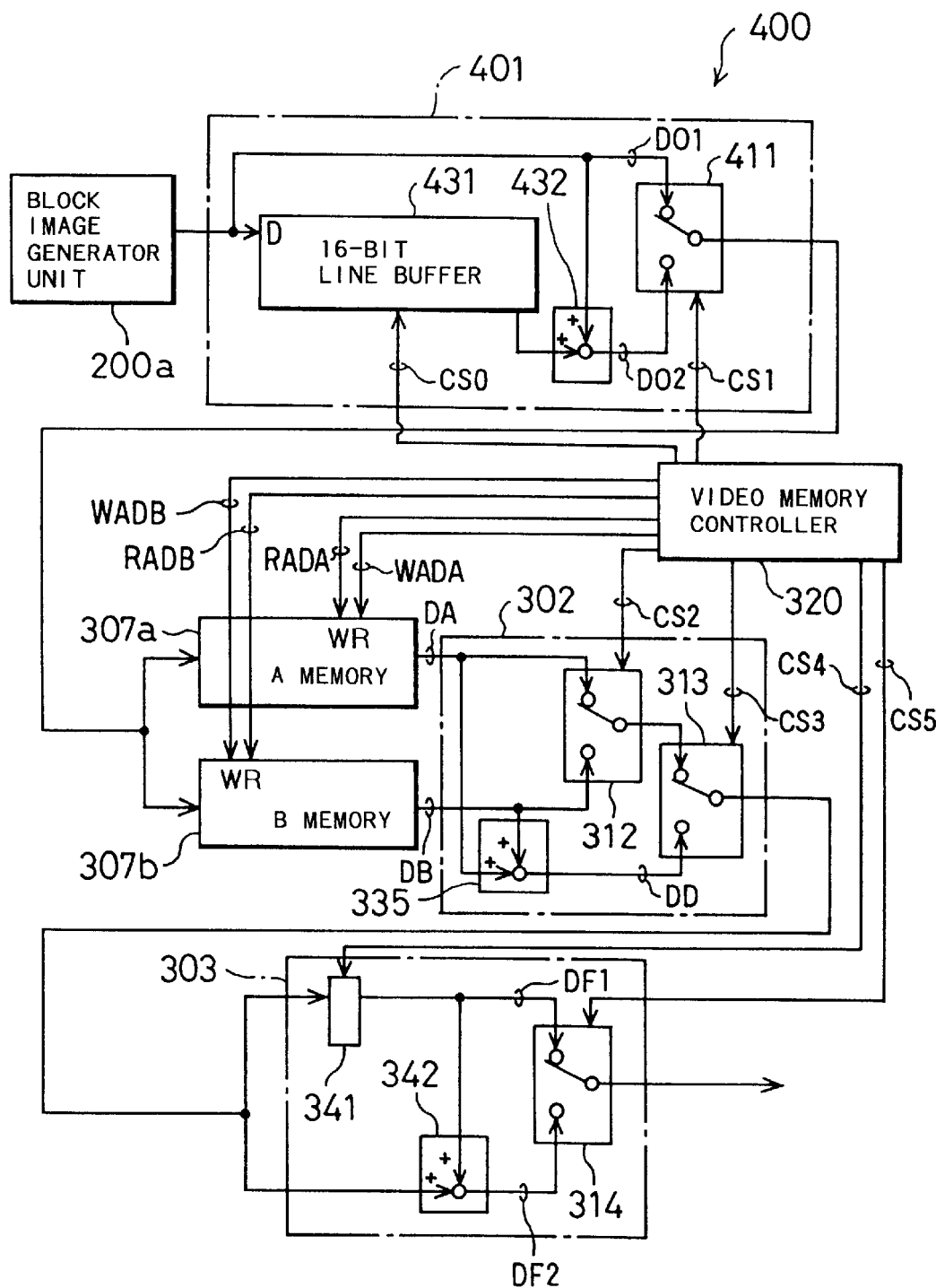
FIG. 25 is a block diagram schematically showing a structure of an interblock distortion removal filter 400.

FIG. 25 is a block diagram showing a structure of an interblock distortion removal filter 400 used for the block sequence according to the J-PEG algorithm. The interblock distortion removal filter 400 includes a fourth filter 401 having a different structure from the first filter 301 of the interblock distortion removal filter 300, in addition to the second filter 302 and the third filter 303 of the interblock distortion removal filter 300 described above. The fourth filter 401 includes a sixteen-bit line buffer 431, a computing element 432 for calculating a weighted average, and a switcher circuit 411 for switching video data.

Figure 26:
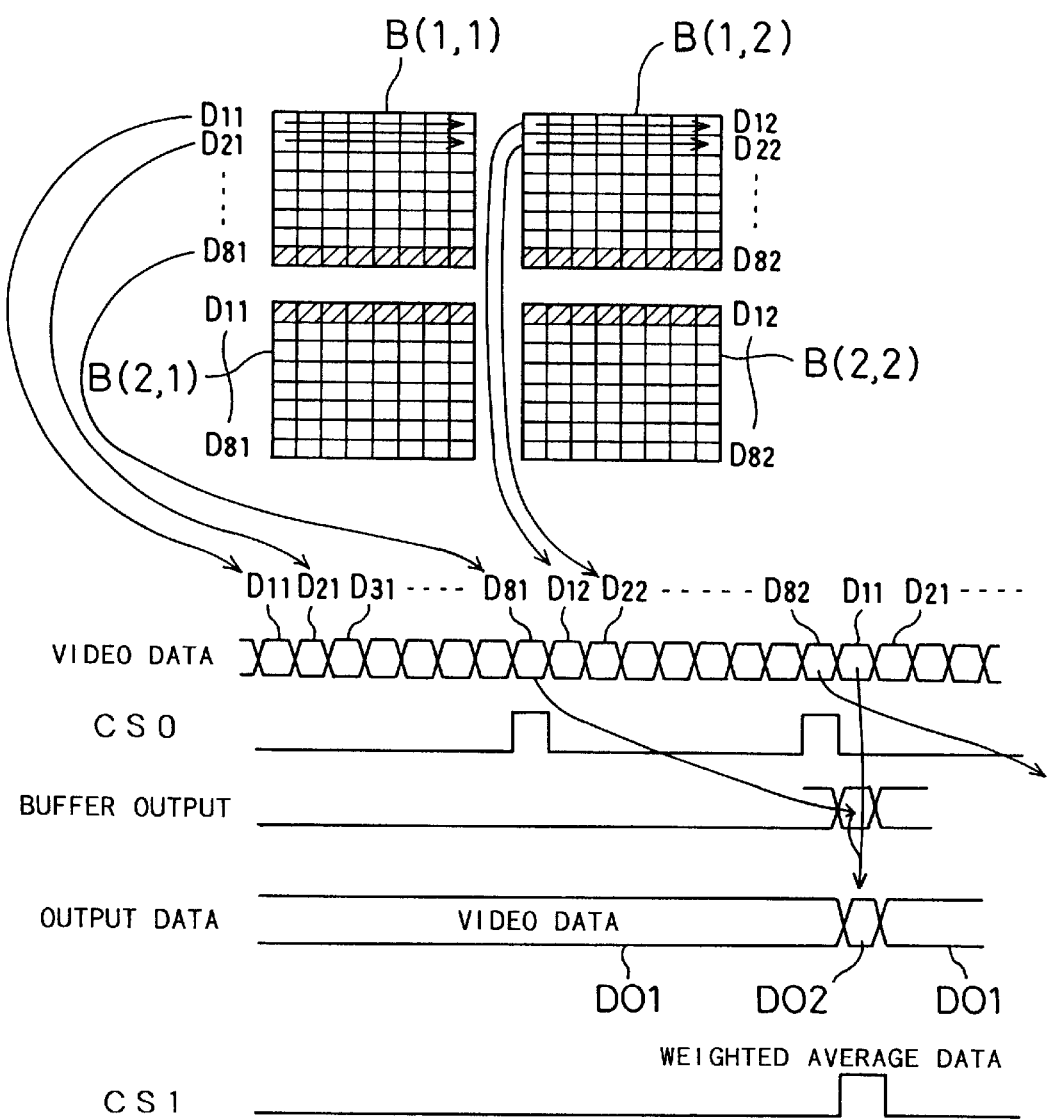
FIG. 26 shows operation of the fourth filter 401.

The switcher circuit 411 is switched in response to the first control signal CS1 output from the video memory controller 320 whereas the line buffer 431 is driven by a control signal CS0 output from the video memory controller 320. FIG. 26 shows operation of the fourth filter 401.

The fourth filter 401 works in place of the first filter 301 of the above embodiment to eliminate interblock distortions in each sixteen-line data area. For the convenience of explanation, it is assumed that video data are compressed according to the basic sequence of the J-PEG algorithm shown in FIG. 23. In the following explanation, blocks B(1,1), B(1,2), B(2,1), and B(2,2) are taken as an example. Video data are output from the block image generator unit 200a in the order of the basic sequence of the J-PEG algorithm. In each block, video data are taken out by eight bits along the scanning lines. In FIG. 26, these 8-bit line data are shown as D11, D21, D31, ..., D81.

The video memory controller 320 outputs the control signal CS0 at such a timing that the block image generator unit 200a outputs the last 8-bit line data D81 of the first 8×8 block B(1,1). The line buffer 431 receives the control signal CS0 and stores the 8-bit video data D81. Video data of the next block B(1,2) are then successively output. The control signal CS0 is activated again when last 8-bit line data D82 of the second 8×8 block B(1,2) is output. The line buffer 431 receives the control signal CS0 and stores the 8-bit video data D82. The line buffer 431 accordingly stores a total of 16-bit data D81 and D82.

The block image generator unit 200a then outputs first line data D11 of the next block B(2,1), when the first control signal CS1 becomes active. The first control signal CS1 switches the switcher circuit 411 to make an output of the computing element 432 effective while activating the line buffer 431 to output 8-bit video data. The computing element 432 calculates a weighted average of the last line data D81 of the first block B(1,1) read out of the line buffer 431 and the first line data D11 currently read out and outputs the weighted average as data DO2.

The weighted average data DO2 is accordingly output from the fourth filter 401 to the subsequent second filter 302. The structure of the interblock distortion removal filter 400 after the second filter 302 is the same as that of the interblock distortion removal filter 300 of the above embodiment. When first line data D12 of the block B(2,2) are read out after line data D11 through D81 of the previous block B(2,1), the video memory controller 320 outputs the first control signal CS1 to activate the line buffer 431 to output the last line data D82 of the block B(1,2) previously stored. The computing element 432 then calculates a weighted average of the first line data D12 of the block B(2,2) and the last line data D82 of the block B(1,2), and outputs the weighted average as data DO2.

The interblock distortion removal filter 400 with the line buffer 431 having a small memory capacity (sixteen bit in the embodiment) can effectively eliminate interblock distortions in each sixteen-line data area when video data are coded and compressed according to the basic sequence of the J-PEG algorithm. In this structure, the second filter 302 and the third filter 303 respectively eliminate interblock distortions on the boundary between adjacent sixteen-line data areas and between blocks adjacent to each other along the scanning lines in the same manner as the above embodiment.

Although the above explanation is focused on the basic sequence of the J-PEG algorithm, the structure of this embodiment is effectively applied to eliminate interblock distortions for blocks arranged according to the extended sequence of the J-PEG algorithm as shown in FIG. 24. In such a case, the line buffer 431 of the second filter 401 should have a memory capacity of 8 bit×$2^n$.

Figure 27:
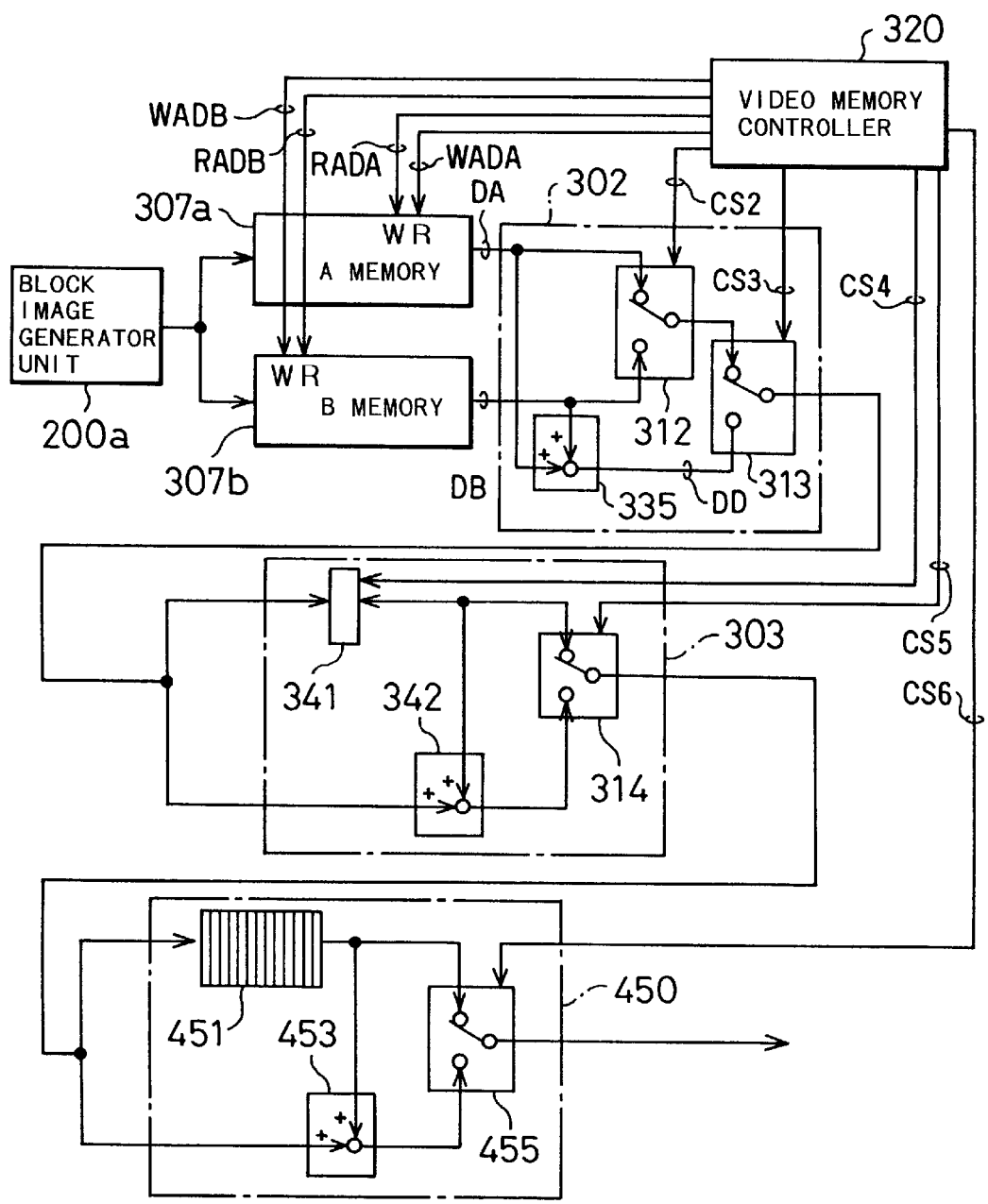
FIG. 27 is a block diagram showing another structure of the interblock distortion removal filter.

When n is equal to eight ($2^n$=256 pixels), there is only one group along the horizontal scanning direction in the extended sequence of the J-PEG algorithm. This requires a line buffer having a memory capacity for one line or 256 pixels. In such a case, a fifth filter 450 is placed after the second filter 302 and the third filter 303 as shown in FIG. 27. The fifth filter 450 includes a line buffer 451 having a memory capacity for one line, a computing element 453 for calculating a weighted average, and a switcher circuit 455 for switching video data. The line buffer 451 is a 256-bit serial input/output shift register, which outputs video data for a previous line simultaneously with input of video data for a current line. The computing element 453 calculates a weighted average of the video data for the previous line read out of the line buffer 451 and the video data for the current line. The switcher circuit 455 selects either the output of the line buffer 451 and the output of the computing element 453 in response to a control signal CS6 output from the video memory controller 320. The control signal CS6 becomes active on every sixteenth scanning line after the eighth scanning line to make the output of the computing element 453 effective. In this manner, the fifth filter 450 effectively eliminates interblock distortions in each 16-line data area.

In this modified structure, the second filter 302 is used to eliminate interblock distortions on the boundary between adjacent sixteen-line data areas while reading video data out of the A memory 307a and the B memory 307b in the same manner as the above embodiment. The second filter 302 except the switcher circuit 312 may, however, be omitted and the fifth filter 450 with the line buffer 451 may be used to eliminate interblock distortions both in the sixteen-line data area and between the adjacent sixteen-line data areas. In such a case, the control signal CS6 is output from the video memory controller 320 on every eight horizontal scanning lines.

Figure 28:
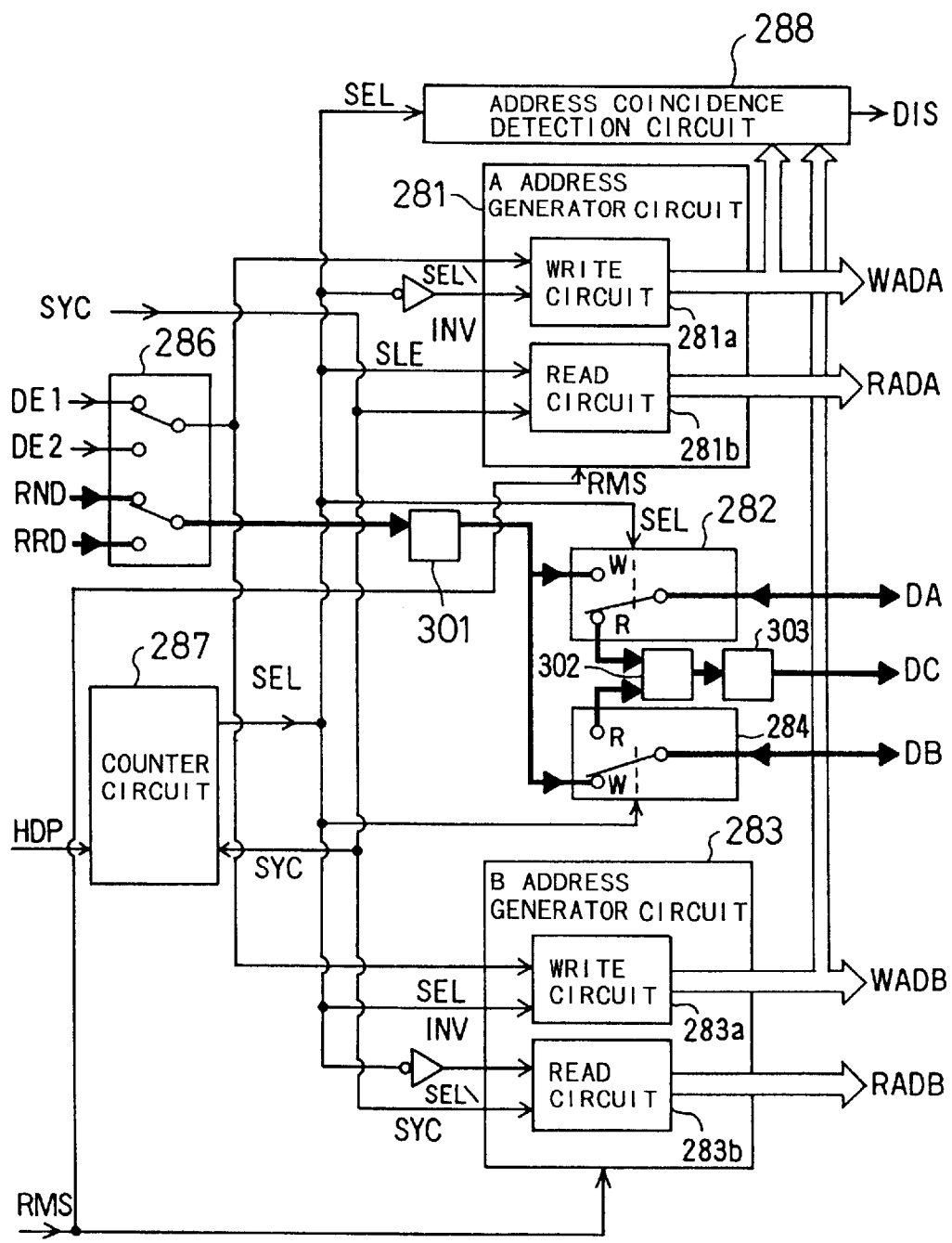
FIG. 28 is a block diagram showing a structure where the interblock distortion removal filter is incorporated in the memory control block 47b of the video data decoding system of the first embodiment.

The interblock distortion removal filter described above can be combined with the image decoding system of the first embodiment. FIG. 28 is a block diagram showing a structure where the interblock distortion removal filter is incorporated in the memory control block 47b of the first embodiment. The first filter 301 is placed on an output signal path from the switcher circuit 286. The second filter 302 receives outputs of the A switcher circuit 282 and the B switcher circuit 284, and transfers the outputs to the video encoder unit 50 via the third filter 303. When reconstructed run length video data RRD are output from the switcher circuit 286, no interblock distortion is generated and the first through the third filters 301, 302, and 303 are accordingly inactivated to make signals pass directly therethrough.

In the interblock distortion removal filter, capacities of buffers and memories are varied according to the size of blocks of decoded video data. The A memory 307a and the B memory 307b are not limited to have the capacity of sixteen lines, but may have other capacities. In a structure that the A memory 307a and the B memory 307b have the capacity of one screen page and are switched for reconstruction of a moving picture, no boundary due to memory switching appears on the screen and no specific filter for eliminating distortions due to the memory switching is required accordingly.

The interblock distortion removal filter of the invention can be applied to three or more consecutive blocks in a vertical direction (perpendicular to scanning lines) as in the case of the two consecutive 8×8 blocks described above. In such application, the same effects are attained only by increasing the capacity of the A memory 307a and the B memory 307b without modifying the structure of FIG. 16.

Explanation of data compression and decompression process

In the embodiments above, video data are compressed by discrete cosine transform (DCT) as mentioned above. An example of such data compression and details of a data decompression process by the video data decompression unit 200 are described hereinafter.

The DCT unit 110 of the compression unit 100 executes two-dimensional discrete cosine transform on original image data with respect to each pixel block PB according to the following Equation (1):

$$F(u, v) = \frac{1}{4}C(u)C(v)\sum_{x=0}^{7}\sum_{y=0}^{7} f(x, y)\cos\frac{\pi(2x+1)u}{16}\cos\frac{\pi(2y+1)v}{16} \quad (1)$$

where:

$$C(u), C(v) = \frac{1}{\sqrt{2}}, \text{ for } u, v = 0$$

C(u),C(v)=1, for u,v≠0
where f(x,y) denotes an 8×8 matrix of image data included in one pixel block PB, (x,y) denotes coordinates of each pixel in each pixel block PB, F(u,v) denotes a 8×8 matrix of discrete cosine transform coefficients, and (u,v) denotes spatial frequency coordinates.

Figure 29:
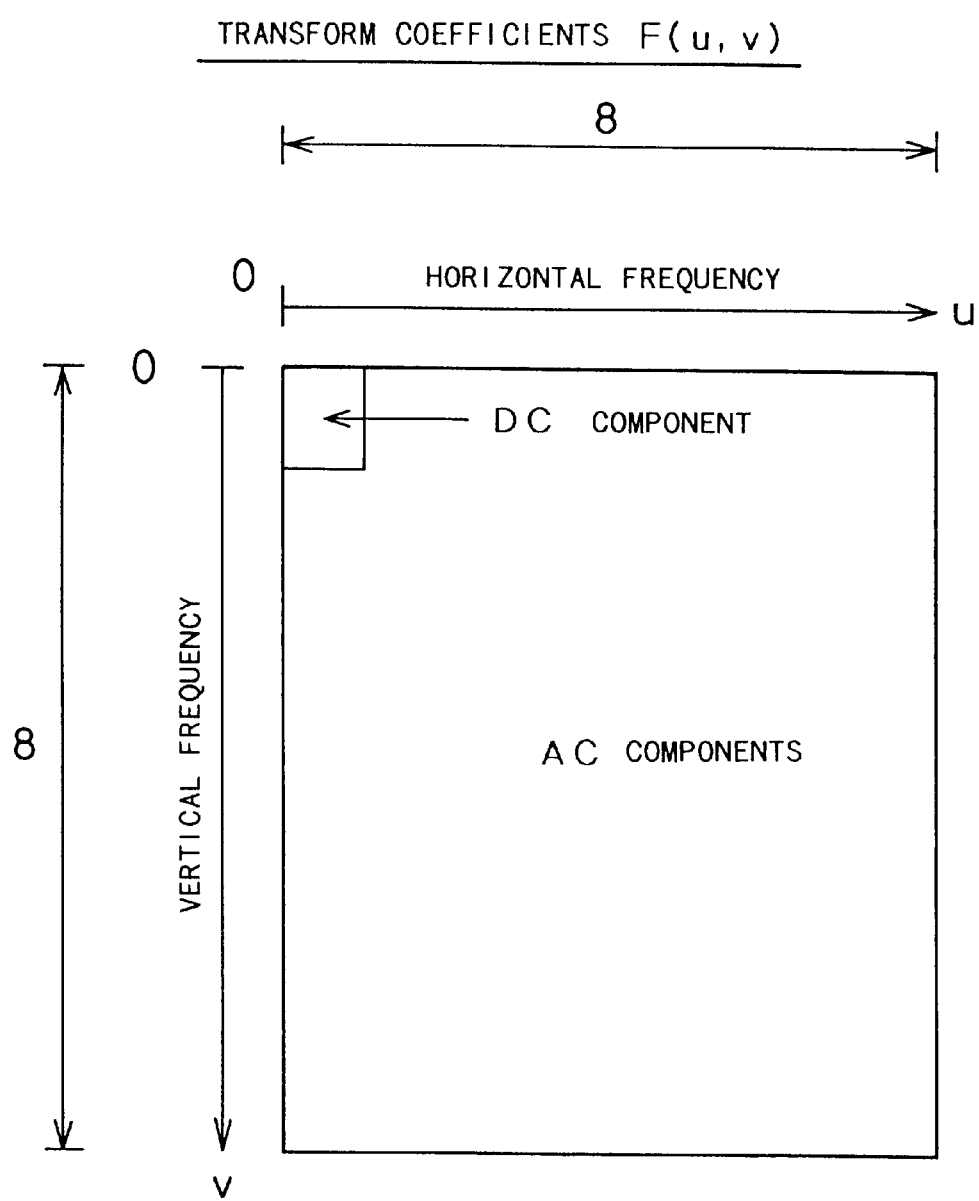
FIG. 29 shows a DCT coefficient matrix F(u,v)

FIG. 29 shows a matrix of transform coefficients F(u,v). The transform coefficients F(u,v) has an 8×8 array as the pixel block PB. A transform coefficient F(0,0) at a left-upper end of the matrix is called a Direct Current component or a DC coefficient, while the other transform coefficients are called Alternate Current components or AC coefficients. The DC component represents a mean value of image data in a pixel block PB whereas the AC components indicate variation of the image data in a pixel block PB. Since there is a certain relation among the image data of adjacent pixels, low-frequency components of the AC coefficients have relatively large values and high-frequency components have relative small values. The high-frequency components have relatively small effects on image quality.

FIGS. 30 shows a basic operation of the image data compression unit 100 and the image data decompression unit 200. The DCT unit 110 generates transform coefficients F(u,v) shown in FIG. 30(a).

The quantization table generator 140 creates a quantization table QT shown in FIG. 30(d) by multiplying quantization levels BQT(u,v) in a basic quantization table BQT shown in FIG. 30(c) by a quantization level coefficient QCx as follows:

$$QT(u,v)=QCx \times BQT(u,v) \qquad (2)$$

In the example of FIGS. 6(a) through 6(g), the quantization level coefficient QCx is set equal to one, and the quantization table QT is thereby the same as the basic quantization table BQT.

The quantization unit 120 produces a quantized transform coefficients QF(u,v) shown in FIG. 30(b) through linear quantization of the transform coefficients F(u,v) with the quantization table QT. The linear quantization includes division of each transform coefficient by a corresponding quantization level and approximation of the quotient to a whole number.

The Huffman coding unit 130 generates compressed image data ZZ shown in FIG. 30(e) by executing Huffman coding on the quantized transform coefficients QF(u,v). Details of Huffman coding will be described later. The compressed image data ZZ includes a first data representing the basic quantization table BQT, and a second data representing the quantization level coefficient QCx and the quantized transform coefficients QF(u,v) as described below.

When the compressed image data ZZ is supplied to the image data decompression unit 200 shown in FIG. 1, the Huffman decoding unit 210 decodes the compressed image data ZZ to produce quantized transform coefficients QF(u,v) shown in FIG. 30(f). Since Huffman coding is a reversible coding process, the quantized transform coefficients QF(u,v) obtained by the Huffman decoding unit 210 is identical with the quantized transform coefficients QF(u,v) of FIG. 30(b) before the Huffman coding in the image data compression unit 100. The Huffman decoding unit 210 decodes the whole compressed image data ZZ to obtain the basic quantization table BQT of FIG. 30(c) and the quantization level coefficient QCx as well as the quantized transform coefficients QF(u,v), and supplies BQT and QCx to the inverse quantization table generator 250.

The inverse quantization table generator 250 creates the quantization table QT shown in FIG. 30(d) by multiplying the quantization levels of the basic quantization table BQT by the quantization level coefficient QCx. The inverse quantization unit 220 multiplies the quantization levels of the quantization table QT by the quantized transform coefficients QF(u,v) to obtain decoded transform coefficients FF(u,v) shown in FIG. 30(g).

The IDCT unit 230 generates reconstructed image data ff(x,y) by executing two-dimensional inverse discrete cosine transform (IDCT) on the decoded transform coefficients FF(u,v) as follows:

$$ff(x, y) = \frac{1}{4} C(u)C(v) \sum_{u=0}^{7} \sum_{v=0}^{7} FF(u, v) \cos\frac{\pi(2x+1)u}{16} \cos\frac{\pi(2y+1)v}{16} \qquad (3)$$

where:

$$C(u), C(v) = \frac{1}{\sqrt{2}}, \text{ for } u, v = 0$$

C(u),C(v)=1, for u,v≠0
Adjustment of the quantization table QT is described hereinafter. Since the quantization table QT is created according to the Equation (2), a greater quantization level coefficient QCx makes greater quantization levels in the quantization table QT. The operator can select a value of the quantization level coefficient QCx out of a plurality of predetermined values, 0 through 15 for example, before image data is compressed in the image data compression unit 100.

The DC component of the transform coefficients F(u,v) represents a mean value of image data in a pixel block PB as mentioned above, and significantly affects the image quality. It is thus preferable to keep a quantization level for the DC component of the transform coefficients F(u,v) equal to the value in the basic quantization table BQT irrespective of the quantization level coefficient QCx.

Figure 31A:
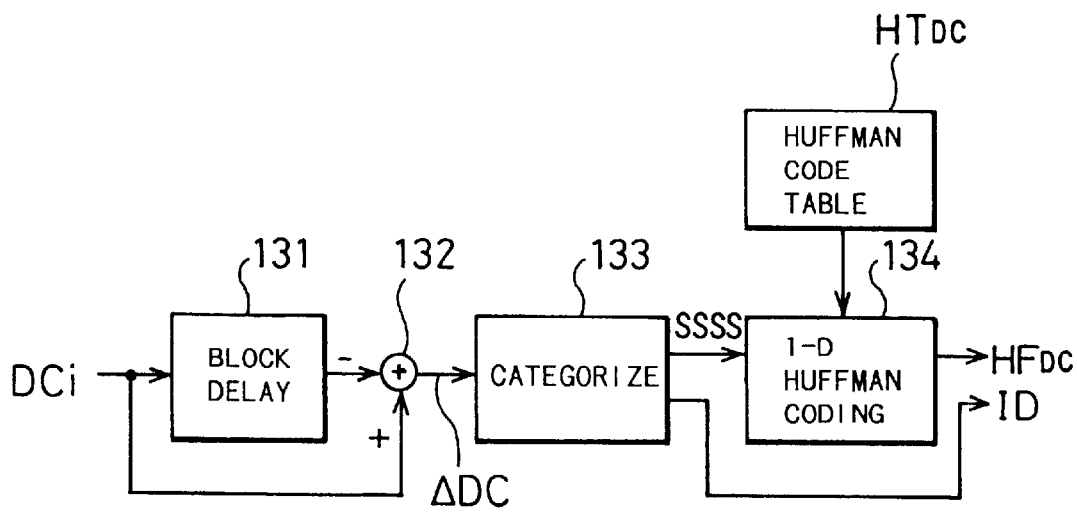
FIG. 31A is a block diagram showing function of a DC coefficient coding section of a Huffman coding element 130 of the video data compression unit 100.
Figure 31B:
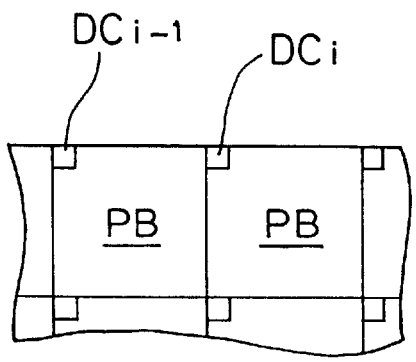
FIG. 31B shows determination of a difference between DC coefficients of two adjacent pixel blocks.

Huffman Coding and Structure of Compressed data are described hereinafter. The Huffman coding unit 130 of the image data compression unit 100 (FIG. 3) has a DC coefficient coding unit and an AC coefficient coding unit. FIG. 31A is a block diagram showing the functional structure of the DC coefficient coding unit. In the DC coefficient coding unit, a block delaying unit 131 and an adder 132 determines a difference DDC between a DC coefficient DCi of a pixel block PB and a DC coefficient DCi−1 for its preceding pixel block PB as shown in FIG. 31B.

A categorizing process unit 133 determines a category SSSS and identification data ID of the difference DDC according to a categorizing table shown in FIG. 32. The category SSSS is a numeral representing a range of the difference DDC. The identification data ID is an ordinal number of the difference DDC in the range specified by the category SSSS.

The category SSSS is converted to a DC coefficient Huffman code word $HF_{DC}$ by a one-dimensional Huffman coding unit 134 shown in FIG. 31A. FIG. 33 shows an example of a Huffman code table $HT_{DC}$ used in the one-dimensional Huffman coding unit 134. The Huffman code table includes a first table for Y signal, and a second table for u and V signals, where Y signal is a luminance signal, and U and V signals are color difference signals. In this embodiment, an original image is represented by Yuv signals, each of which is treated as the original image data f(x,y) in compression and decompression. The DC coefficient Huffman code table for U and V signals includes code words corresponding to categories SSSS=0 through 9. The DC coefficient Huffman code table for Y signals, on the other hand, includes code words corresponding to categories SSSS=15 through 31 as well as those corresponding to SSSS=0 through 9. A Huffman code word for SSSS=15 represents null run data. The null run data represents the number of pixel blocks PB in series having a uniform color. Huffman code words for categories SSSS=16 through 31 represent values of the quantization level coefficient QCx ranging from 0 to 15, respectively. For example, a Huffman code word '111110000' for a category SSSS=16 represents QCX=0, and another Huffman code word '111111111' for a category SSSS=31 represents QCx=15. The Huffman code words shown in FIG. 33 are uniquely and immediately decodable for all the categories SSSS=1 through 9 and 15 through 31.

Figure 34:
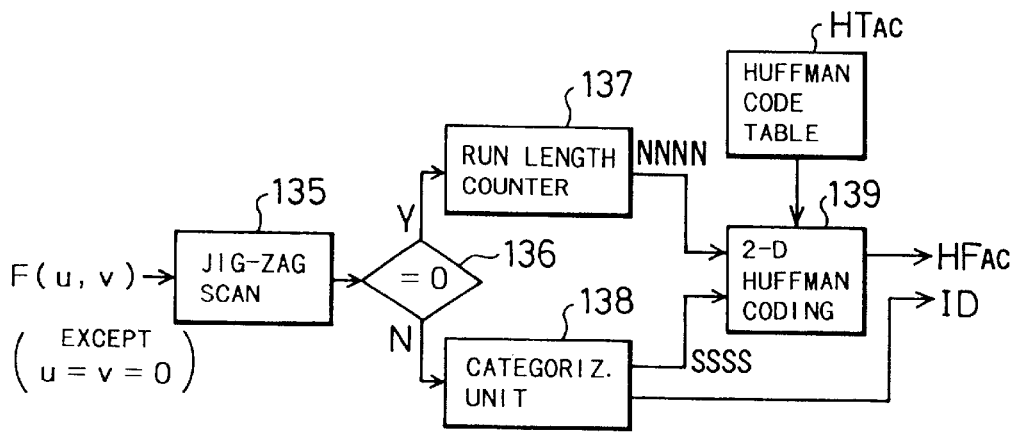
FIG. 34 is a block diagram showing function of an AC coefficient coding section of the Huffman coding element 130.
Figure 35:
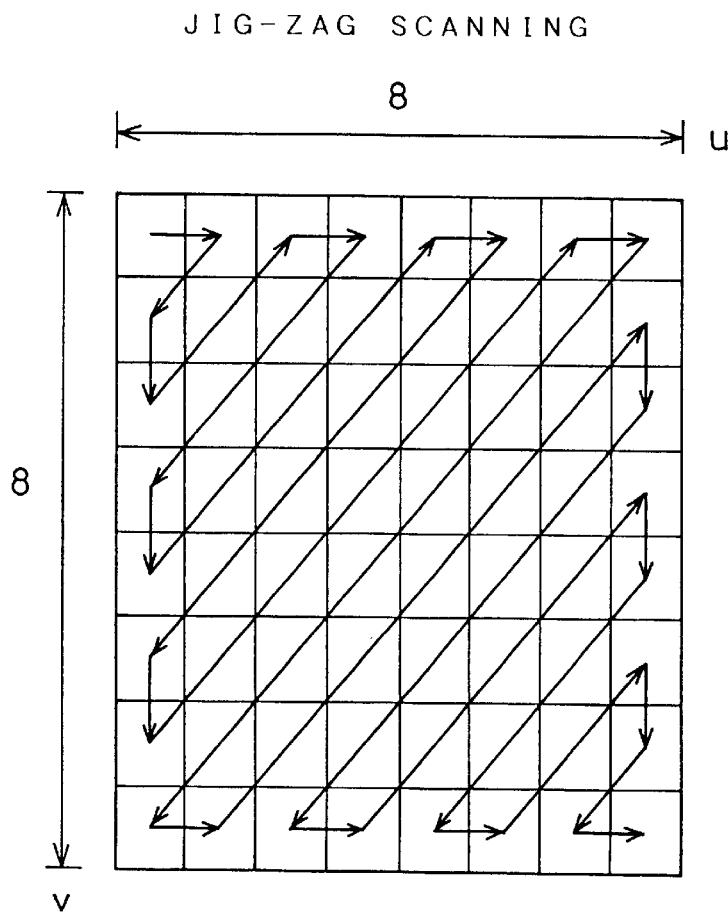
FIG. 35 shows a jig-zag scanning process for AC coefficients.

FIG. 34 is a block diagram showing the functional structure of the AC coefficient coding unit of the Huffman coding unit 130. The matrix of AC coefficients F(u,v) except F(0,0) is rearranged to a one-dimensional array by a jig-zag scanning unit 135. FIG. 35 shows a process of jig-zag scanning.

A judging unit 136 shown in FIG. 34 judging whether each AC coefficient in the one-dimensionally array is equal to zero or not. When the AC coefficient is equal to zero, a run length counter 137 converts the number of zeros in the AC coefficient array to a zero-run length NNNN. When the AC coefficient is not equal to zero, on the contrary, a categorizing unit 138 converts the value of the AC coefficient to a category SSSS and identification data ID by referring to the categorizing table shown in FIG. 32.

Each pair of a zero-run length NNNN and a category SSSS is converted to an AC coefficient Huffman code word $HF_{AC}$ by a two-dimensional Huffman coding unit 139. FIG. 36 shows the structure of a two-dimensional Huffman code table $HT_{AC}$ for AC coefficients. FIG. 37 shows an example of Huffman code words for the zero-run lengths NNNN=0 and NNNN=1 corresponding to two upper-most rows in the Huffman code table $HT_{AC}$ of FIG. 36. A Huffman code word '11111' for NNNN/SSSS=0/0 represents completion of code data for one pixel block.

FIGS. 17A through 17C show an example of Huffman coding process. FIG. 38B shows a process of coding a DC component F(0,0) of the transform coefficients F(u,v) shown in FIG. 38A. Suppose that the value of the DC coefficient for a preceding pixel block is zero, the difference DDC=F(0,0) is equal to 12. According to the categorizing table of FIG. 32, the category SSSS for DDC=12 is four while the identification data ID is equal to '1100'. According to the DC coefficient Huffman code table $HT_{DC}$ for Y signal shown in FIG. 33, the Huffman code word $HF_{DC}$ for the category SSSS=4 is equal to '011'. A Huffman code ($HF_{DC}$+ID) for the DC coefficient is thus equal to '0111100' as shown in FIG. 38B.

FIG. 38C shows a process of coding AC components of the transform coefficients F(u,v) shown in FIG. 38A. The AC coefficients are rearranged to a one-dimensional array through the jig-zag scanning process, and then zero-valued AC coefficients are converted to zero-run lengths NNNN and non-zero AC coefficients to categories SSSS (FIG. 32). Each pair of a zero-run length NNNN and a category SSSS is converted to a Huffman code word $HF_{AC}$ according to the AC coefficient Huffman code table $HT_{AC}$ shown in FIGS. 15 and 16, and combined with identification data ID for the non-zero AC coefficient to constitute a Huffman code ($HF_{AC}$+ID) shown in FIG. 38C.

As shown in FIG. 5F, each code data for one pixel block includes one DC coefficient Huffman code DDC and a plurality of AC coefficient Huffman codes. The DC coefficient Huffman code shown in FIG. 5G includes a Huffman code word $HF_{DC}$ representing a category SSSS and identification data ID as described before. Each AC coefficient Huffman code shown in FIG. 5H includes a Huffman code word $HF_{AC}$ representing a combination of a zero-run length NNNN and a category SSSS, and identification data ID.

As shown in FIG. 5C, the code data representing the quantization level coefficients QCx are inserted at the front end of the compressed data part, and right before a certain unit of block data corresponding to the pixel block to which a new value of the quantization level coefficient QCx is specified. The first value of the quantization level coefficient QCx, which is disposed at the front end of the compressed data part, is applied to at least one pixel block ranging from the first pixel block to the pixel block right before the one to which the second value of the quantization level coefficient QCx is specified. In a similar manner, the second value of the quantization level coefficient QCx is applied to at least one pixel block in series before the third value of the quantization level coefficient QCx is specified.

The first value of the quantization level coefficient QCx is not necessarily inserted at the front end of the compressed data part. If the first value is not inserted at the front end, the first value of the coefficient QCx is set equal to one in decompression process. Insertion of only one quantization level coefficient QCx in the middle of the compressed data part is therefore equivalent to specification of two quantization level coefficients QCx.

Since a Huffman code representing a newly specified quantization level coefficient QCx is inserted between block data units, the new quantization level coefficient QCx is readily applied to the block data unit right after the new coefficient QCx. Code data of the quantization level coefficient QCx is expressed by a DC coefficient Huffman code word $HF_{DC}$ as shown in FIG. 33. This allows immediate decoding of the code data placed at the front end of each block data unit, that is, whether the code data represents DC coefficient Huffman code of the pixel block Y1 or the quantization level coefficient QCx. Null run data included in the compressed data part includes a DC coefficient code word of 'NRL', which indicates that the data unit is null run data, and identification data ID as shown in FIG. 5E.

FIGS. 20A through 20C show an exemplified structure of null run data and an image expressed by the null run data. A background BG of an original image shown in FIG. 39A is uniformly painted with a predetermined color. An elliptic portion shown in FIG. 39A includes a series of eighteen pixel blocks where all pixels have an identical value of image data f(x,y))=12 as shown in FIG. 39B. FIG. 39C shows null run data representing these pixel blocks. The null run data includes first null run data NRD1 representing 16 pixel blocks and second null run data NRD2 representing 2 pixel blocks.

Each of the first and second null run data NRD1 and NRD2 includes a DC coefficient code word 'NRL' indicating that each data unit is null run data at a beginning thereof: the code word 'NRL' is '1111011' as shown in FIG. 33. Since each block data unit has a DC coefficient Huffman code at its front end as shown in FIG. 5F, null run data, block data, and code data of the quantization level coefficient QCx are uniquely and immediately identified through decoding of a DC coefficient code word placed at the front end of each data unit.

As shown in FIG. 39C, the number of pixel blocks is expressed by an AC coefficient Huffman code word. FIG. 40 shows part of the AC coefficient Huffman code table $HT_{AC}$ of FIG. 36, which is applicable to null run data. When the Huffman code table $HT_{AC}$ is applied to null run data, the zero-run length NNNN is set equal to the number of pixel blocks minus one, and the AC coefficient is set equal to one so that Huffman code words for the null run data are in the category SSSS=1. As shown in FIG. 39C, a data segment representing the number of pixel blocks (NNNN/SSSS=15/1) in the first null run data NRD1 shows a series of 16 pixel blocks having a uniform color while data segment representing the number of pixel blocks (NNNN/SSSS=1/1) in the second null run data NRD2 represents a series of 2 pixel blocks having the uniform color.

Each of the first and second null run data NRD1 and NRD2 has identification data ID at a rear end thereof; the identification data ID is fixed equal to one in this example. the null run data requires only about 20 bits to represent a series of pixel blocks having a uniform color. On the contrary, normal block data unit requires approximately 300 through 400 bits to show a set of blocks painted with a uniform color, where one set of blocks consist of four Y-signal pixel blocks, one U-signal pixel block, and one V-signal pixel block as shown in FIG. 7C. Even if there exist a plural sets of pixel blocks in series which are painted with a uniform color, each block data unit for each set of pixel blocks requires about 300 through 400 bits. Use of the null run data thus effectively reduces required bits of compressed data representing a series of pixel blocks having a uniform color.

The values of a luminance signal Y and color difference signals U and V for a series of pixel blocks having a uniform color expressed by the null run data are not included in the compressed data, but are specified in a software program defining a video game. When making a software program for a video game, the operator defines an area of pixel blocks having a uniform color (the background BG in the example of FIG. 39A) with the mouse, and specifies luminance and color tone of the pixel blocks through operation of the keyboard and the mouse. This gives special visual effects on the video game; for example, the color of a background BG is gradually varied when a certain event occurs in the middle of a video game executed by the video game machine 20 (FIG. 1).

Although preferred embodiments of the image decoding system and the interblock distortion removal filter according to the invention are described above in detail, the invention is not limited to the above embodiments. There may be many modifications, changes, and alterations without departing from the scope or spirit of essential characteristics of the invention. Examples of such modification include a structure suitably modified for orthogonal transform other than discrete cosine transform and a structure with only one dual port memory having a capacity of storing data of n lines and allowing simultaneous reading and writing. The principle of the invention is applicable to CAD systems, 3 D model generators, computer graphics, and other similar systems other than the video game machine 20 of the embodiment.

What is claimed is:

1. An interblock distortion removal filter used in a process of decoding compression data to video data, said compression data being generated by dividing original video data constituting one screen page into a plurality of M×N-pixel blocks and coding said video data by each block according to an irreversible coding method, M and N representing integers greater than one but less than the number of pixels along the least pixel dimension of said screen page, said filter comprising:

a first memory for storing first video data of M lines decoded along a predetermined direction of an image;

a second memory for storing second video data of another M lines adjacent to said first video data, said first and second memory having a combined memory capacity that is less than what is required for storing an image of the entire screen page; and a computing element for reading out video data of a first line in said second memory or said first memory while reading out video data of a last line in said first memory or said second memory and executing a predetermined filtering process between said video data of the first line and said video data of the last line.

2. An interblock distortion removal filter used in a process of decoding compression data to video data, said compression data being generated by dividing original video data constituting one screen page into a plurality of M×N-pixel blocks and coding said video data by each block according to an irreversible coding method, M and N representing integers greater than one but less than the number of pixels along the least pixel dimension of said screen page;

decoded video data being treated in a standard unit of m blocks along a predetermined direction of an image by at least two lines, m representing an integer equal to or greater than one;

said filter comprising:

reading means for reading said video data by each block where a columnar direction perpendicular to said predetermined direction is determined as a preferential reading direction;

last line data memory means for, while said reading means reading video data corresponding to a certain block and a next block adjacent to each other along said columnar direction, storing data of a last line of said certain block; and a computing element for, while said reading means reading data of a first line of said next block, executing a predetermined filter operation in a pixel unit between said data of the first line of said next block and said data of the last line of said certain block stored in said last line data memory means.

3. An interblock distortion removal filter used in a process of decoding compression data to video data, said compression data being generated by dividing original video data constituting one screen page into a plurality of M×N-pixel blocks and coding said video data by each block according to an irreversible coding method, M and N representing integers greater than one but less than the number of pixels along the least pixel dimension of said screen page;

decoded video data being treated in a standard unit of m blocks along a predetermined direction of an image by at least two lines, m representing an integer equal to or greater than one;

said filter comprising:

reading means for reading said video data by each block where a columnar direction perpendicular to said predetermined direction is determined as a preferential reading direction;

last line data memory means for, while said reading means reading video data corresponding to a certain block and a next block adjacent to each other along said columnar direction, storing data of a last line of said certain block; and a computing element for, while said reading means reading data of a first line of said next block, executing a predetermined filter operation in a pixel unit between said data of the first line of said next block and said data of the last line of said certain block stored in said last line data memory means;

said filter further comprising:

a first memory for storing first video data of at least 2×M lines generated by repeating the process by said reading means, said last line data memory means, and said first computing element in the direction of alignment of said m blocks in said standard unit of at least 2 lines×m blocks;

a second memory for storing second video data of next at least 2×M lines adjacent to said first video data; and a second computing element for reading out video data of a first line in said second memory or said first memory while reading out data of a last line in said first memory or second memory, and executing a predetermined filtering process between said video data of the first line and said video data of the last line.

4. An interblock distortion removal filter in accordance with claim 3 said filter further comprising:

terminal data memory means for, while reading video data of each line successively out of said first memory or said second memory, storing terminal data of each line of N pixels within each of said M×N-pixel blocks in a direction of said m blocks; and a third computing element for, while reading video data of each line successively out of said first memory or said second memory, reading start data of each line of N pixels within each of said M×N-pixel blocks of data in a direction of said m blocks, executing a predetermined filter operation between said start data and said terminal data stored in said terminal data memory means.

5. A method of decoding compression data to video data, said compression data being generated by dividing original video data constituting one screen page into a plurality of M×N-pixel blocks and coding said video data by each block according to an irreversible coding method, said method comprising the steps of:

reading decoded video data of at least two consecutive blocks in a direction different from an image scanning direction;

executing a filter process for removing an interblock distortion generated on a boundary between said two consecutive blocks;

storing video data after said filter process successively in said image scanning direction; and executing a filter process for removing an interblock distortion generated on a boundary between blocks adjacent to each other in said image scanning direction while reading out said video data stored in the previous step.

6. An interblock distortion removal filter in accordance with claim 2, said filter further comprising:

terminal data memory means for, while reading video data of each line successively out of said first memory or said second memory, storing terminal data of each line of N pixels within each of said M×N-pixel blocks in a direction of said m blocks; and a third computing element for, while reading video data of each line successively out of said first memory or said second memory, reading start data of each line of N pixels within each of said M×N-pixel blocks of data in a direction of said m blocks, executing a predetermined filter operation between said start data and said terminal data stored in said terminal data memory means.

7. An interblock distortion removal filter in accordance with claim 2, wherein m is equal to one.

8. An interblock distortion removal filter in accordance with claim 3, wherein m is equal to one.

9. An interblock distortion removal filter in accordance with claim 4, wherein m is equal to one.

10. An interblock distortion removal filter used in a process of decoding compression data to video data, said compression data being generated by dividing original video data constituting one screen page into a plurality of M×N-pixel blocks and coding said video data by each block according to an irreversible coding method, M and N representing integers greater than one but less than the number of pixels along the least pixel dimension of said screen page, said filter comprising:

a first memory for storing first video data of M lines decoded along a predetermined direction of an image;

a second memory for storing second video data of another M lines adjacent to said first video data, said first and second memory having a combined capacity that is less than what is required for storing an image of the entire screen page;

means for storing said first video data read from the decoded image data into said first memory if a counter is zero, said counter representing an integer equal to a number of units of M lines that have previously been written to either the first or second memory;

means for reading all except a last line of said first video data from said first memory while simultaneously storing said second video data into said second memory if the counter is odd and less than a predetermined number;

means for reading all except a last line of said second video data from said second memory while simultaneously storing said first video data in said first memory if the counter is even, greater than zero, and less than the predetermined number;

means for reading said first video data from said first memory when the counter is equal to the predetermined number and the predetermined number is odd;

means for reading said second video data from said second memory when the counter is equal to the predetermined number and the predetermined number is even; and a computing element for reading out video data of a first line in said second memory or said first memory while reading out video data of a last line in said first memory or said second memory and executing a predetermined filtering process between said video data of the first line and said video data of the last line.

11. A method for removing interblock distortion in a process of decoding compression data to video data, said compression data being generated by dividing original video data constituting one screen page into a plurality of M×N- pixel blocks and coding said video data by each block according to an irreversible coding method, M and N representing integers greater that one but less than the number of pixels along the least pixel dimension of said screen page, said method comprising the steps of:

storing first video data of M lines decoded along a predetermined direction of an image into a first memory if a counter is zero, said counter representing an integer equal to a number of units of M lines that have previously been written to either said first memory or a second memory, said first and second memory having a combined capacity that is less than what is required for storing an image of the entire screen page;

reading all except the last line of said first video data from said first memory while simultaneously storing a second video data, said second video data being video data of another M lines adjacent to said first video data, into a second memory if the counter is odd and less than a predetermined number;

reading all except the last line of said second video data from said second memory while simultaneously storing said first video data in said first memory if counter is even, greater than zero, and less than the predetermined number;

reading said first video data from said first memory if counter is equal to the predetermined number and the predetermined number is odd;

reading said second video data from said second memory if counter is equal to the predetermined number and the predetermined number is even; and reading out video data of a first line in said second memory or said first memory while reading out video data of a last line in said first memory or said second memory and executing a predetermined filtering process between said video data of the first line and said video data of the last line.

* * * * *